US012695773B2

(12) United States Patent
Cunningham et al.

(10) Patent No.: US 12,695,773 B2
(45) Date of Patent: Jul. 28, 2026

(54) BEHAVIORAL RISK SCORING FRAMEWORK FOR PERFORMING SECURITY ANALYTICS

(71) Applicant: Forcepoint LLC, Austin, TX (US)

(72) Inventors: Margaret Cunningham, Austin, TX (US); Peter Lochlan Stewart, Rowlett, TX (US)

(73) Assignee: Everfox Holdings LLC, Herndon, VA (US)

( * ) Notice: Subject to any disclaimer, the term of this patent is extended or adjusted under 35 U.S.C. 154(b) by 175 days.

(21) Appl. No.: 17/991,016

(22) Filed: Nov. 21, 2022

(65) Prior Publication Data

US 2023/0388332 A1     Nov. 30, 2023

Related U.S. Application Data

(60) Provisional application No. 63/347,334, filed on May 31, 2022.

(51) Int. Cl.
| | |
|---|---|
| *H04L 9/40* | (2022.01) |
| *G06F 21/55* | (2013.01) |
| *G06F 21/56* | (2013.01) |

(52) U.S. Cl.
CPC ........ *H04L 63/1433* (2013.01); *G06F 21/552* (2013.01); *G06F 21/566* (2013.01); *H04L 63/1441* (2013.01); *H04L 63/20* (2013.01)

(58) Field of Classification Search
CPC . H04L 63/1433; H04L 63/1441; H04L 63/20; G06F 21/552; G06F 21/566
See application file for complete search history.

(56) References Cited

U.S. PATENT DOCUMENTS

| | | | | |
|---|---|---|---|---|
| 9,930,062 | B1 * | 3/2018 | Alkemper | H04L 63/1433 |
| 2013/0097709 | A1 * | 4/2013 | Basavapatna | H04L 63/1441 |
| | | | | 726/25 |
| 2015/0286819 | A1 * | 10/2015 | Coden | G06F 21/554 |
| | | | | 726/23 |
| 2017/0230417 | A1 * | 8/2017 | Amar | H04L 63/20 |
| 2017/0251007 | A1 * | 8/2017 | Fujisawa | H04L 63/0272 |
| 2017/0257358 | A1 * | 9/2017 | Ebrahimi | H04L 9/3236 |
| 2017/0272472 | A1 * | 9/2017 | Adhar | G06F 21/602 |
| 2017/0279801 | A1 * | 9/2017 | Andrade | G06F 21/31 |
| 2018/0375890 | A1 * | 12/2018 | Alkemper | H04L 63/1433 |
| 2019/0044963 | A1 * | 2/2019 | Rajasekharan | H04W 12/67 |
| 2019/0044965 | A1 * | 2/2019 | Pilkington | H04L 63/1416 |
| 2019/0312886 | A1 * | 10/2019 | Ford | H04L 63/14 |
| 2021/0194924 | A1 * | 6/2021 | Heinemeyer | G06F 21/577 |
| 2021/0336982 | A1 * | 10/2021 | Akella | H04L 63/1425 |
| 2022/0224711 | A1 * | 7/2022 | Singh | H04L 63/1425 |
| 2022/0255959 | A1 * | 8/2022 | Viswanathan | G06F 21/60 |

* cited by examiner

*Primary Examiner* — Cheng-Feng Huang
(74) *Attorney, Agent, or Firm* — Terrile, Cannatti & Chambers, LLP; Stephen A. Terrile

(57) ABSTRACT

A system, method, and computer-readable medium are disclosed for performing behavioral risk analysis operation. The behavior risk analysis operation includes: monitoring an entity, the monitoring observing an electronically-observable data source; observing a behavior of the entity based upon the monitoring; identifying a standardized risk factor associated with the entity; analyzing the behavior and the standardized risk factor associated with the entity; and, performing a security operation in response to the analyzing the behavior and the standardized risk factor.

20 Claims, 22 Drawing Sheets

|  | User Activity Monitoring (UAM) 1202 | Continuous Evaluation (CE) 1204 |
|---|---|---|
| Purpose 1206 | Assess risk based upon electronic observables – cyber activity and behaviors | Ongoing verification of eligibility for sensitive positions based upon personal behavior and observed life events |
| Evaluation Frequency 1208 | Continuous processing of daily risk scores, possibly thousands of events per minute | Batch processing of monthly risk scores, possibly tens, hundreds, or thousands of operations per month |
| Source Examples 1210 | DLP, SIEM, Facility access | Partner organization data exports (e.g., spreadsheets) |
| Monitoring 1212 | All network users are monitored with analytics, both for normal and negative behavior | Out of the entire employee population ingested (on and off network): less than 5% mentioned in a life event and monitored with analytics |
| Data Retention 1214 | High volume, 60-180 day window of data stored in analytic cache | Low volume, five year retention requirement in order to observe behavior profile based upon life events |

FIGURE 12

| | Normalized Risk Score 1302 | | Standardized Risk Score 1322 | | SOFIT Standardized Risk Factor 1318 |
|---|---|---|---|---|---|
| | User 'A' 1314 | User 'B' 1316 | User 'A' 1324 | User 'B' 1326 | |
| Mon. 1304 | 99 | 0 | 67 | 0 | Credit Problems |
| Tue. 1306 | 50 | 0 | 33 | 0 | . . . |
| Wed. 1308 | 25 | 99 | 17 | 52 | HR Corrective Action |
| Thur. 1310 | 0 | 50 | 0 | 26 | . . . |
| Fri. 1312 | 99 | 25 | 84 | 13 | Routine Security Violation |

FIGURE 13

| Risk Scoring Options 1402 | |
|---|---|
| Comparative 1404 | Direct 1406 |
| Lexicon Lists | Lexicon Lists |
| Features | Features |
| Models | |
| Scenarios | |
| Risk Scores | Risk Scores |

FIGURE 14

| User Entity 1702 | Interval 1704 | Event Model 1 1706 | Event Model 2 1708 | Event Model 3 1710 | Average Perplexity 1712 | Composite Risk Score 1714 |
|---|---|---|---|---|---|---|
| User '1' | May 16 | 1.0 | 0.34 | 0.45 | $-1.87 = (\ln(1-0.99) + \ln(1-0.34) + \ln(1-0.45)) / 3$ | $85 = (1 - e^{-1.87}) * 100$ |
| User '1' | May 17 | 0 | 1.0 | 0.45 | $-1.73 = (\ln(1-0) + \ln(1-0.99) + \ln(1-0.45))/3$ | $82 = (1 - e^{-1.73}) * 100$ |
| User '2' | May 16 | 0 | 1.0 | 0 | $-1.53 = (\ln(1-0) + \ln(1-0.99) + \ln(1-0)) / 3$ | $78 = (1 - e^{-1.53}) * 100$ |
| User '2' | May 17 | 0.51 | 0.47 | 0 | $-0.45 = (\ln(1-0.51) + \ln(1-0.47) + \ln(1-0))/3$ | $36 = (1 - e^{-1.45}) * 100$ |

*FIGURE 17*

| Entity ID 1802 | Scenario Risk Score 1804 | Occurrence 1806 |
|---|---|---|
| 292-68-9742 | 95 | 2020-03-21 00:00:00+00 |
| 292-68-9742 | 71.25 | 2020-03-22 00:00:00+00 |
| 292-68-9742 | 53.4375 | 2020-03-23 00:00:00+00 |
| 292-68-9742 | 40.078125 | 2020-03-24 00:00:00+00 |
| 292-68-9742 | 30.05859375 | 2020-03-25 00:00:00+00 |
| 292-68-9742 | 22.5439453125 | 2020-03-26 00:00:00+00 |
| 292-68-9742 | 16.907958984375 | 2020-03-27 00:00:00+00 |
| 292-68-9742 | 12.68069692382812 | 2020-03-28 00:00:00+00 |
| 292-68-9742 | 9.5107269287871094 | 2020-03-29 00:00:00+00 |
| 292-68-9742 | 9 | 2020-03-30 00:00:00+00 |
| ... | ... | ... |
| 292-68-9742 | 9 | 2020-04-07 00:00:00+00 |
| 292-68-9742 | 95 | 2020-04-08 00:00:00+00 |

1808
Risk Score Decay Over Time

BEHAVIORAL RISK SCORING FRAMEWORK FOR PERFORMING SECURITY ANALYTICS

BACKGROUND OF THE INVENTION

Field of the Invention

The present invention relates in general to the field of computers and similar technologies, and in particular to software utilized in this field. Still more particularly, it relates to a method, system and computer-usable medium for performing a behavioral risk analysis operation.

Description of the Related Art

Users interact with physical, system, data, and services resources of all kinds, as well as each other, on a daily basis. Each of these interactions, whether accidental or intended, poses some degree of security risk. However, not all behavior poses the same risk. Furthermore, determining the extent of risk corresponding to individual events can be difficult. In particular, ensuring that an entity is who they claim to be can be challenging.

As an example, a first user may attempt to pose as a second user to gain access to certain confidential information. In this example, the first user may be prevented from accessing the confidential information if it can be determined that they are illegitimately posing as the second user. More particularly, access to the confidential information may be prevented if the identity of the first user is resolved prior to the confidential information actually being accessed. Likewise, the first user's access to the confidential information may be prevented if their identity cannot be resolved to the identity of the second user.

SUMMARY OF THE INVENTION

In one embodiment the invention relates to a method for performing behavioral risk analysis operation, comprising: monitoring an entity, the monitoring observing an electronically-observable data source; observing a behavior of the entity based upon the monitoring; identifying a standardized risk factor associated with the entity; analyzing the behavior and the standardized risk factor associated with the entity; and, performing a security operation in response to the analyzing the behavior and the standardized risk factor.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: monitoring an entity, the monitoring observing an electronically-observable data source; observing a behavior of the entity based upon the monitoring; identifying a standardized risk factor associated with the entity; analyzing the behavior and the standardized risk factor associated with the entity; and, performing a security operation in response to the analyzing the behavior and the standardized risk factor.

In another embodiment the invention relates to a computer-readable storage medium embodying computer program code, the computer program code comprising computer executable instructions configured for: monitoring an entity, the monitoring observing an electronically-observable data source; observing a behavior of the entity based upon the monitoring; identifying a standardized risk factor associated with the entity; analyzing the behavior and the standardized risk factor associated with the entity; and, performing a security operation in response to the analyzing the behavior and the standardized risk factor.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 12 is a table summarizing the difference between various aspects of user activity monitoring (UAM) and CE operations;

FIG. 13 is a table showing the effect of using normalized risk factors versus direct risk factors when performing a CE operation;

FIG. 14 is a table showing comparative and direct risk scoring options;

FIG. 17 is a table showing the use of average perplexity to generate a scenario risk score;

FIG. 18 is a table showing the decay of example scenario risk scores over an interval of time 18;

FIG. 24 is a simplified block diagram of the performance of operations to identify an enduring behavioral pattern corresponding to a particular user entity;

DETAILED DESCRIPTION

A method, system and computer-usable medium are disclosed for performing a behavioral risk analysis operation. Certain aspects of the invention reflect an appreciation that the existence of any entity, whether it is an individual user, a group of users, an organization, a device, a system, a network, an account, a domain, an operation, a process, a software application, a service, or a collection of information, represents some degree of security risk. Various aspects of the invention likewise reflect an appreciation that observation of certain entity interactions can often provide an indication of possible anomalous, abnormal, unexpected, or suspicious behavior, any or all of which may represent a security risk.

Likewise, various aspects of the invention reflect an appreciation that certain entity interactions can be characterized as concerning, and as such, their occurrence may likewise provide an indication of potential security risk. Accordingly, certain aspects of the invention reflect an appreciation that a particular entity can be assigned a measure of risk according to its respective interactions with various entities, whether they are a user entity, a non-user entity, or an information entity. Furthermore, certain aspects of the invention can appreciation that such interactions may be assigned an additional measure of risk if they are not sanctioned by an organization with which the entity is associated.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
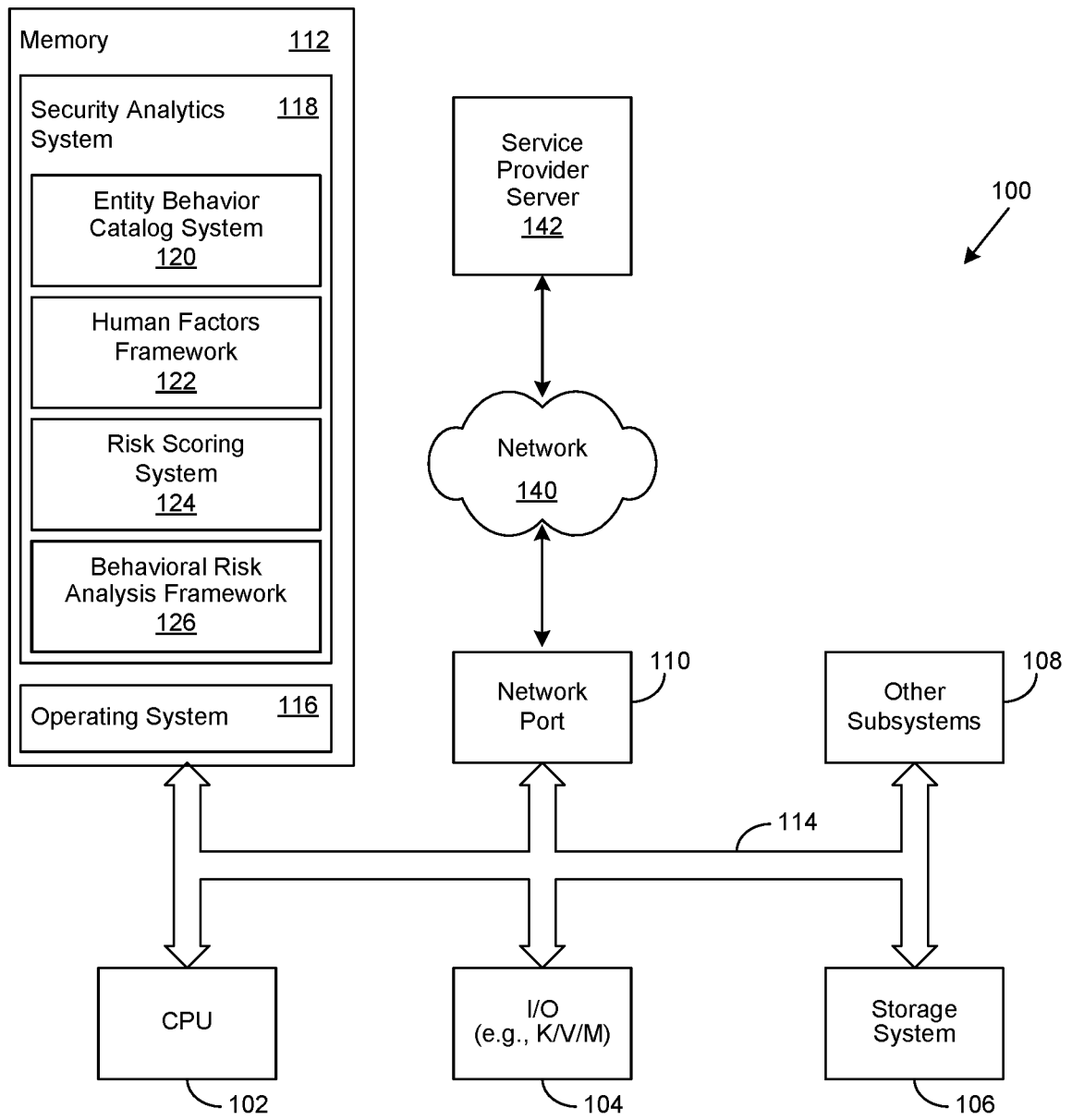
FIG. 1 depicts an exemplary client computer in which the present invention may be implemented.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a security analytics system 118. In one embodiment, the information handling system 100 is able to download the security analytics system 118 from the service provider server 142. In another embodiment, the security analytics system 118 is provided as a service from the service provider server 142.

In various embodiments, the security analytics system 118 may be implemented to perform a security analytics operation, described in greater detail herein. In certain embodiments, the security analytics operation improves processor efficiency, and thus the efficiency of the information handling system 100, by facilitating security analytics functions. As will be appreciated, once the information handling system 100 is configured to perform the security analytics operation, the information handling system 100 becomes a specialized computing device specifically configured to perform the security analytics operation and is not a general purpose computing device. Moreover, the implementation of the security analytics system 118 on the information handling system 100 improves the functionality of the information handling system 100 and provides a useful and concrete result of performing security analytics functions to mitigate security risk.

In certain embodiments, the security analytics system 118 may be implemented to include an entity behavior catalog (EBC) system 120, a human factors framework 122, a risk scoring system 124, and a behavioral risk analysis framework 126, or a combination thereof. In certain embodiments, the EBC system 120 may be implemented to catalog entity behavior, as described in greater detail herein. In certain embodiments, the human factors framework 122 may be implemented to perform a human factors risk operation, as likewise described in greater detail herein. Likewise, as described in greater detail herein, the security risk scoring system 124 may be implemented in various embodiments to perform certain security risk scoring operations. In certain embodiments, as likewise described in greater detail herein, the behavioral risk analysis framework 126 may be implemented to perform a behavioral risk analysis operation.

Figure 2:
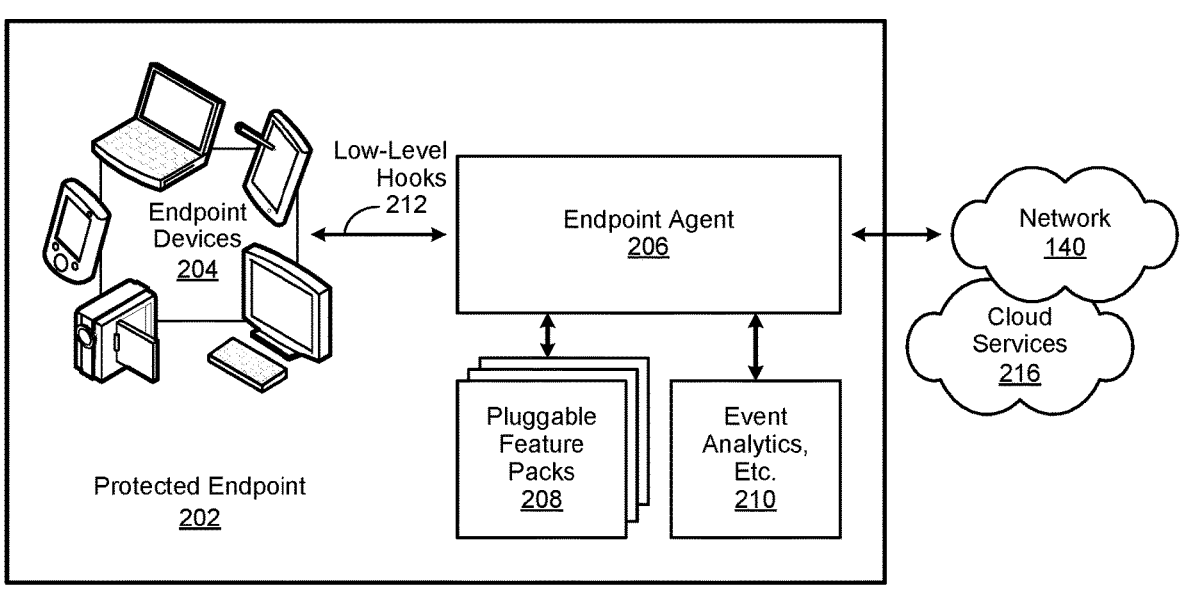
FIG. 2 is a simplified block diagram of an endpoint agent.

FIG. 2 is a simplified block diagram of an endpoint agent implemented in accordance with an embodiment of the invention. As used herein, an endpoint agent 206 broadly refers to a software agent used in combination with an endpoint device 204 to establish a protected endpoint 202. Skilled practitioners of the art will be familiar with software agents, which are computer programs that perform actions on behalf of an entity. As likewise used herein, an entity broadly refers to something that exists as itself, whether physically or abstractly.

In certain embodiments, an entity may be a user entity, a non-user entity, an information entity, or a combination thereof. As used herein, a user entity broadly refers to an animate entity whose identity can be described by certain attributes and is capable of exhibiting or enacting certain user entity behaviors, as described in greater detail herein, but is incapable of exhibiting or enacting a non-user entity or information entity behavior. Examples of a user entity include an individual person, a group of people, an organization, or a government.

In various embodiments, a particular user entity may be associated with a corresponding class of user entities. In certain of these embodiments, a particular class of user entities may be segmented into two or more sub-classes of user entities. In certain embodiments, a sub-class of user entities may be further segmented into yet other sub-classes of user entities. As an example, a corporation may have an organization hierarchy. In this example, the corporation may be designated as a class of user entities, with the class being defined as user entities associated with the corporation. To continue the example, the class of user entities associated with the corporation may be segmented into subclasses of user entities corresponding to their respective departments, roles, titles, locations, and so forth.

As likewise used herein, a non-user entity broadly refers to an inanimate entity whose identity can be described by certain attributes and is capable of exhibiting or enacting certain non-user entity behaviors, as described in greater detail herein, but is incapable of exhibiting or enacting a user entity or information entity behavior. In certain embodiments, a non-user entity may embody a physical form. Examples of a non-user entity include an item, a device, such as endpoint 204 and edge devices, a network, a system, an operation, and a process. Other examples of a non-user entity include a resource, such as a geographical location or formation, a physical facility, a venue, a software application, and a service, such as a service operating in a cloud environment.

In various embodiments, a particular non-user entity may be associated with a corresponding class of non-user entities. In certain of these embodiments, a particular class of non-user entities may be segmented into two or more sub-classes of user entities. In certain embodiments, a sub-class of non-user entities may be further segmented into yet other sub-classes of non-user entities. As an example, an organization may have an extensive information technology (IT) infrastructure. In this example, the IT infrastructure may be segmented into classes of non-user entities, such as computers, networks, mobile devices, and so forth. To continue the example, the class of non-user entities that are computers may in turn be segmented into subclasses of non-user entities corresponding to servers, desktop computers, laptops, and so forth.

An information entity, as used herein, broadly refers to an inanimate entity that is a collection of data that can be described by certain attributes and is capable of exhibiting or enacting certain information entity behaviors, as described in greater detail herein, but is incapable of enacting a user entity or non-user entity behavior. In certain embodiments, an information entity may include some form of a digital instantiation of information. Examples of an information entity include an account, a user identifier (ID), a cryptographic key, a computer file, a text or email message, a web page or web page element, a social media post, an audio or video recording, a network address, and a domain. In certain embodiments, the identity of a particular entity may be known or unknown. An entity behavior, as likewise used herein, broadly refers to any behavior exhibited or enacted by an entity that can be electronically observed during the occurrence of an entity interaction. As used herein, an entity interaction broadly refers to the occurrence of an action associated with a first entity being influenced by another action associated with a second entity.

In various embodiments, an information entity may be associated with a corresponding class of information entities. In certain of these embodiments, a particular class of information entities may be segmented into two or more sub-classes of information entities. In certain embodiments, a sub-class of information entities may be further segmented into yet other sub-classes of information entities. As an example, a user entity associated with a corporation may have access to a variety of information entities. In this example, the class of information entities may be segmented into classes of information entities, such as corporate databases, email systems, external websites, social media platforms, and so forth. To continue the example, the class of information entities that are websites may in turn be segmented into subclasses of information entities corresponding to internal websites, competitor websites, news websites, search engines, and so forth.

In various embodiments, a particular entity interaction may have certain associated attributes, such as cadence, frequency, group characteristics, participants, duration, participation, access, sharing, attachments, content, and so forth. In certain of these embodiments, the values used to describe the cadence attribute of an entity interaction may include "impromptu," and "planned." In certain embodiments, the values used to describe the frequency attribute of an entity interaction may include "first occurrence," "occasional," "daily," "weekly," "monthly," and so on. Likewise, in certain embodiments, the values used to describe the group characteristics attribute of an entity interaction may include "one-on-one," "small," "large," "carbon copy," "blind copy," and so on.

In certain embodiments, the values used to describe the participants attribute of an entity interaction may include "internal-only," "external only," "mixed," "collaborative," "first," "last," and so on. In certain embodiments, the values used to describe the duration attribute of an entity interaction may include "short," "medium," and "long," and so on, while the values used to describe the participation attribute of an entity interaction may include "passive" and "active." Likewise, in certain embodiments, the values used to describe the access attribute of an entity interaction may include "private" (e.g., "invite-only," "locked," etc.).

In certain embodiments, the values used to describe the sharing or attachments attributes of an entity interaction may include "number," "size," "classification," "type," and so on. In various embodiments, the values used to describe the content attribute of an entity interaction may likewise include "personal," "professional," or by certain keywords, or a combination thereof. Those of skill in the art will recognize that many such entity interaction attributes are possible. Accordingly, the foregoing is not intended to limit the spirit, scope or intent of the invention.

In certain embodiments, an entity interaction may include the occurrence of at least one event enacted by one entity when interacting with another. In certain embodiments, an event associated with an entity interaction may include at least one entity attribute, described in greater detail herein, and at least one entity behavior, likewise described in greater detail herein. As an example, a user entity may perform an action, such as sending a text message to some other user entity who in turn replies with a response. In this example, the other user entity's action of responding is influenced by the user entity's action of sending the text message.

As another example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable.

In various approaches, a software agent may be autonomous or work in concert with another agent, or an entity, or a combination of the two, as described in greater detail herein. In certain of these approaches, the software agent may be implemented to autonomously decide if a particular action is appropriate for a particular event, or an observed entity behavior, or a combination of the two, as likewise described in greater detail herein. As used herein, an event broadly refers to the occurrence of at least one action performed by an entity. In certain embodiments, the action may be directly, or indirectly, associated with an entity behavior, described in greater detail herein. In certain embodiments, the entity behavior may include an entity's physical behavior, cyber behavior, or a combination thereof, as likewise described in greater detail herein.

As an example, a first user may attach a binary file infected with a virus to an email that is subsequently sent to a second user. In this example, the act of attaching the binary file to the email is directly associated with an entity behavior enacted by the first user. In certain embodiments, the action may be indirectly associated with an entity behavior. To continue the example, the recipient of the email may open the infected binary file, and as a result, infect their computer with malware. To further continue the example, the act of opening the infected binary file is directly associated with an entity behavior enacted by the second user. However, the infection of the email recipient's computer by the infected binary file is indirectly associated with the described entity behavior enacted by the second user.

An endpoint device 204, as likewise used herein, refers to an information processing system such as a personal computer, a laptop computer, a tablet computer, a personal digital assistant (PDA), a smart phone, a mobile telephone, a digital camera, a video camera, or other device that is capable of storing, processing and communicating data. In certain embodiments, such an endpoint device 204 may be implemented as a non-user entity. In certain embodiments, the communication of the data may take place in real-time or near-real-time. As used herein, real-time broadly refers to processing and providing information within a time interval brief enough to not be discernable by a user entity, described in greater detail herein. As an example, a cellular phone conversation may be used to communicate information in real-time, while an instant message (IM) exchange may be used to communicate information in near real-time.

In certain embodiments, the communication of the information may take place asynchronously. For example, an email message may be stored on an endpoint device 204 when it is offline. In this example, the information may be communicated to its intended recipient once the endpoint device 204 gains access to a network 140. In certain embodiments, the network 140 may be a private network (e.g., an enterprise network), a semi-public network (e.g., a service provider core network), or a public network (e.g., the Internet).

A protected endpoint 202, as likewise used herein, broadly refers to a policy-based approach to network security that typically requires an endpoint device 204 to comply with particular criteria before it is granted access to network resources. As an example, an endpoint device 204 may be required to have a particular operating system (OS), or version thereof, a Virtual Private Network (VPN) client, anti-virus software with current updates, and so forth. In certain embodiments, the protected endpoint 202 may be implemented to perform operations associated with providing real-time resolution of the identity of an entity at a particular point in time, as described in greater detail herein.

In certain embodiments, the protected endpoint 202 may be implemented to provide temporal information associated with such operations.

As used herein, temporal information broadly refers to a measure of time (e.g., a date, timestamp, etc.), a measure of an interval of time (e.g., a minute, hour, day, etc.), or a measure of an interval of time (e.g., two consecutive weekdays days, or between Jun. 3, 2017 and Mar. 4, 2018, etc.). In certain embodiments, the temporal information may be associated with an event associated with a particular point in time. As used herein, such a temporal event broadly refers to an occurrence of an action enacted by, or associated with, an entity at a particular point in time.

Examples of such temporal events include making a phone call, sending a text or an email, using a device, such as an endpoint device 204, accessing a system, and entering a physical facility. Other examples of temporal events include uploading, transferring, downloading, modifying, or deleting data, such as data stored in a datastore, or accessing a service. Yet other examples of temporal events include entity interactions between two or more users, entity interactions between a user and a device, entity interactions between a user and a network, and entity interactions between a user and a resource, whether physical or otherwise. Yet still other examples of temporal events include a change in name, address, physical location, occupation, position, role, marital status, gender, association, affiliation, or assignment.

As likewise used herein, temporal event information broadly refers to temporal information associated with a particular event. In various embodiments, the temporal event information may include certain types of content. In certain embodiments, such types of content may include text, unstructured data, structured data, graphical images, photographs, audio recordings, video recordings, and so forth. In certain embodiments, the temporal event information may include metadata. In various embodiments, the metadata may include temporal event attributes, which in turn may include certain entity identifier types or classifications, described in greater detail herein.

In certain embodiments, the real-time resolution of the identity of an entity at a particular point in time may be based upon contextual information associated with a particular entity behavior. As used herein, contextual information broadly refers to any information, directly or indirectly, individually or in combination, related to a particular entity behavior. In certain embodiments, entity behavior may include an entity's physical behavior, cyber behavior, or a combination thereof. As likewise used herein, physical behavior broadly refers to any entity behavior occurring within a physical realm. More particularly, physical behavior may include any action enacted by an entity that can be objectively observed, or indirectly inferred, within a physical realm.

Cyber behavior, as used herein, broadly refers to any behavior occurring in cyberspace, whether enacted by an individual entity, a group of entities, or a system acting at the behest of an individual entity, or a group of entities, as described in greater detail herein. More particularly, cyber behavior may include physical, social, or mental actions enacted by a user entity that can be objectively observed, or indirectly inferred, within cyberspace. As an example, a user may use an endpoint device 204 to access and browse a particular website on the Internet. In this example, the individual actions performed by the user to access and browse the website constitute a cyber behavior.

As another example, a user may use an endpoint device 204 to download a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, makes them electronically-observable.

As likewise used herein, cyberspace broadly refers to a network 140 environment capable of supporting communication between two or more entities. In certain embodiments, the entity may be a user, an endpoint device 204, or various resources, described in greater detail herein. In certain embodiments, the entities may include various endpoint devices 204 or resources operating at the behest of an entity, such as a user. In certain embodiments, the communication between the entities may include audio, image, video, text, or binary data.

As described in greater detail herein, the contextual information may include an entity's authentication factors. Contextual information may likewise include various temporal identity resolution factors, such as identification factors associated with the entity, the date/time/frequency of various entity behaviors, the entity's location, a user entity's role or position in an organization, their associated access rights, and certain user gestures employed by a user in the enactment of a user entity behavior. Other contextual information may likewise include various user entity interactions, whether the interactions are with a non-user entity, an information entity, or another user entity. In certain embodiments, user entity behaviors, and their related contextual information, may be collected at particular points of observation, and at particular points in time, described in greater detail herein. In certain embodiments, a protected endpoint 202 may be implemented as a point of observation for the collection of entity behavior and contextual information.

In certain embodiments, the endpoint agent 206 may be implemented to universally support a variety of operating systems, such as Apple Macintosh®, Microsoft Windows®, Linux®, Android® and so forth. In certain embodiments, the endpoint agent 206 may be implemented to interact with the endpoint device 204 through the use of low-level hooks 212 at the operating system level. It will be appreciated that the use of low-level hooks 212 allows the endpoint agent 206 to subscribe to multiple events through a single hook. Consequently, multiple functionalities provided by the endpoint agent 206 can share a single data stream, using only those portions of the data stream they may individually need. Accordingly, system efficiency can be improved and operational overhead reduced.

In certain embodiments, the endpoint agent 206 may be implemented to provide a common infrastructure for pluggable feature packs 208. In various embodiments, the pluggable feature packs 208 may provide certain security management functionalities. Examples of such functionalities may include various anti-virus and malware detection, data loss protection (DLP), insider threat detection, and so forth. In certain embodiments, the security management functionalities may include one or more functionalities associated with providing real-time resolution of the identity of an entity at a particular point in time, as described in greater detail herein.

In certain embodiments, a particular pluggable feature pack 208 may be invoked as needed by the endpoint agent 206 to provide a given functionality. In certain embodiments, individual features of a particular pluggable feature pack 208 are invoked as needed. In certain embodiments, the individual features of a pluggable feature pack 208 may be invoked by the endpoint agent 206 according to the occurrence of a particular entity behavior. In certain embodiments, the individual features of a pluggable feature pack 208 may be invoked by the endpoint agent 206 according to the occurrence of a particular temporal event, described in greater detail herein. In certain embodiments, the individual features of a pluggable feature pack 208 may be invoked by the endpoint agent 206 at a particular point in time. In these embodiments, the method by which a particular entity behavior, temporal event, or point in time is selected is a matter of design choice.

In certain embodiments, the individual features of a pluggable feature pack 208 may be invoked by the endpoint agent 206 according to the context of a particular entity behavior. As an example, the context may be a user enacting a particular user entity behavior, their associated risk classification, which resource they may be requesting, the point in time the user entity behavior is enacted, and so forth. In certain embodiments, the pluggable feature packs 208 may be sourced from various cloud services 216. In certain embodiments, the pluggable feature packs 208 may be dynamically sourced from various cloud services 216 by the endpoint agent 206 on an as-needed basis.

In certain embodiments, the endpoint agent 206 may be implemented with additional functionalities, such as event analytics 210. In various embodiments, the event analytics 210 functionality may include analysis of certain entity behaviors, described in greater detail herein. Those of skill in the art will recognize that many such embodiments and examples are possible. Accordingly, the foregoing is not intended to limit the spirit, scope or intent of the invention.

Figure 3:
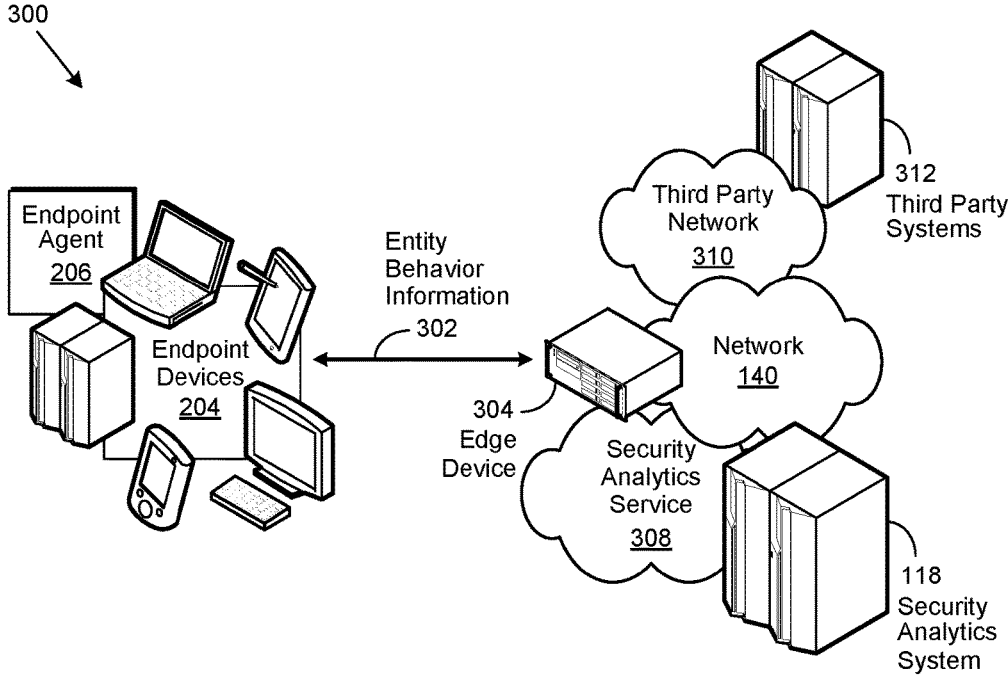
FIG. 3 is a simplified block diagram showing reference architecture components of a security analytics environment.

FIG. 3 is a simplified block diagram showing reference architecture components of a security analytics environment. In certain embodiments, the security analytics environment 300 may be implemented to include a security analytics system 118, an internal 306 network, one or more endpoint devices 204, and one or more edge devices 304. In various embodiments, the security analytics system 118 may be implemented to perform certain security analytics operations. As used herein, a security analytics operation broadly refers to any operation performed to determine a security risk corresponding to a particular event, or an entity behavior enacted by an associated entity, or a combination thereof.

In certain embodiments, the security analytics system 118 may be implemented as both a source and a sink of entity behavior information 302. As used herein, entity behavior information 302 broadly refers to any information related to the enactment of a behavior by an associated entity. In various embodiments, the security analytics system 118 may be implemented to serve requests for certain entity behavior information 302. In certain embodiments, the edge device 304 and the endpoint agent 206, individually or in combination, may provide certain entity behavior information 302 to the security analytics system 118, respectively using push or pull approaches familiar to skilled practitioners of the art.

As used herein, an edge device 304 broadly refers to a device providing an entry point into a network 140. Examples of such edge devices 304 include routers, routing switches, integrated access devices (IADs), multiplexers, wide-area network (WAN) access devices, network security appliances, and so forth. In certain embodiments, the edge device 304 may be implemented in a bridge, a firewall, or a passive monitoring configuration. In certain embodiments, the edge device 304 may be implemented as software running on an information processing system.

In certain embodiments, the edge device 304 may be implemented to provide access to the security analytics system 118 via a network 140. In certain embodiments, the edge device 304 may be implemented to provide access to and from the network 140, a third party 310 network, and a security analytics service 308, or a combination thereof. In certain embodiments, the network 140 and third party 310 networks may respectively be a private network (e.g., an enterprise network), a semi-public network (e.g., a service provider core network), or a public network (e.g., the Internet). In certain embodiments, the edge device 304 may be implemented to provide access to a third party system 312 via the third party network 310.

In certain embodiments, the edge device 304 may be implemented to provide support for a variety of generic services, such as directory integration, logging interfaces, update services, and bidirectional risk/context flows associated with various security analytics operations, described in greater detail herein. In certain embodiments, the edge device 304 may be implemented to provide temporal information, likewise described in greater detail herein, associated with the provision of such services. In certain embodiments, the edge device 304 may be implemented as a generic device configured to host various network communications, data processing, and security management capabilities. In certain embodiments, such capabilities may include the performance of operations associated with providing real-time resolution of the identity of an entity at a particular point in time. In certain embodiments, such operations may likewise include the provision of associated temporal information (e.g., time stamps).

In certain embodiments, the edge device 304 may be implemented to receive network requests and context-sensitive entity behavior information 302, described in greater detail herein, from an endpoint agent 206. The edge device 304 may be implemented in certain embodiments to receive enriched entity behavior information 302 from the endpoint agent 206. In various embodiments, certain entity behavior information 302 may be enriched by an associated endpoint agent 206 attaching contextual information to a request.

In various embodiments, the contextual information may be embedded within a network request, which is then provided as enriched entity behavior information 302. In various embodiments, the contextual information may be concatenated, or appended, to a request, which in turn is provided as enriched entity behavior information 302. In certain of these embodiments, the enriched entity behavior information 302 may be unpacked upon receipt by the edge device 304 and parsed to separate the request and its associated contextual information. Those of skill in the art will recognize that one possible disadvantage of such an approach is that it may perturb certain Intrusion Detection System and/or Intrusion Detection Prevention (IDS/IDP) systems implemented on the network 140 or third party 310 network.

In various embodiments, new flow requests may be accompanied by a contextual information packet sent to the edge device 304. In certain of these embodiments, the new flow requests may be provided as enriched entity behavior information 302. In certain embodiments, the endpoint agent 206 may also send updated contextual information to the edge device 304 once it becomes available. As an example, an endpoint agent 206 may share a list of files that have been read by a current process at any point in time once the information has been collected. To continue the example, such a list of files may be used to determine which data the endpoint agent 206 may be attempting to exfiltrate.

In certain embodiments, such service requests may be associated with temporal event information, described in greater detail herein. Consequently, such requests can be enriched by the addition of contextual entity information (e.g., UserAccount, interactive/automated, data-touched, etc.). Accordingly, the edge device 304 can then use this information to manage the appropriate response to submitted requests. In certain embodiments, such requests may be associated with providing real-time resolution of the identity of an entity at a particular point in time.

In certain embodiments, point analytics processes executing on the edge device 304 may request a particular service. As an example, risk scores on a per-entity basis may be requested. In certain embodiments, the service may be requested from the security analytics system 118. In certain embodiments, the service may be requested from a security analytics service 308. In certain embodiments, the security analytics system 118 may be implemented to provide the security analytics service 308. In certain embodiments, hosting of the security analytics service 308 may be provided by a cloud infrastructure familiar to those of skill in the art.

In certain embodiments, the endpoint agent 206 may be implemented to update the security analytics system 118 with entity behavior information 302 and associated contextual information, thereby allowing an offload of certain analytics processing overhead. In various embodiments, this approach may be implemented to provide longitudinal risk scoring, which assesses security risk associated with certain entity behavior during a particular interval of time. In certain embodiments, the security analytics system 118 may be implemented to perform risk-adaptive operations to access risk scores associated with the same user entity, but accrued on different endpoint devices 204. Certain embodiments of the invention reflect an appreciation that such an approach may prove advantageous when an adversary is "moving sideways" through a network environment, using different endpoint devices 204 to collect information.

Certain embodiments of the invention reflect an appreciation that enriched entity behavior information 302 will likely not be available for provision to the edge device 304 if an endpoint agent 206 is not implemented for a corresponding endpoint device 204. However, the lack of such enriched entity behavior information 302 may be accommodated in various embodiments, albeit with reduced functionality associated with certain security analytics operations.

In certain embodiments, the edge device 304 may be implemented as a generic device configured to host various network communications, data processing, and security management capabilities. In certain embodiments, such capabilities may include the performance of operations associated with providing real-time resolution of the identity of an entity at a particular point in time. In certain embodiments, such operations may likewise include the provision of associated temporal information (e.g., time stamps).

In certain embodiments, the security analytics system 118 may be implemented in different operational configurations. In various embodiments, the security analytics system 118 may be implemented for use by the endpoint agent 206. In various embodiments, the security analytics system 118 may be implemented for use by the endpoint agent 206 and the edge device 304 in combination. In various embodiments, the security analytics service 308 may likewise be implemented for use by the endpoint agent 206, the edge device 304, and the security analytics system 118, individually or in combination. In certain of these embodiments, the security analytics system 118 may be primarily oriented to performing security risk assessment operations related to one or more entity's associated entity behaviors.

In certain embodiments, the security analytics system 118 may be primarily oriented to applying risk mitigations in a way that maximizes security effort return-on-investment (ROI). In certain embodiments, such approaches may be accomplished by providing additional contextual and entity behavior information associated with entity requests. As an example, a web gateway may not concern itself with why a particular file is being requested by a certain entity at a particular point in time. Accordingly, if the file cannot be identified as malicious or harmless, there is no context available to determine how, or if, to proceed.

To extend the example, the edge device 304 and security analytics system 118 may be coupled such that requests can be contextualized and fitted into a framework that evaluates their associated risk. Certain embodiments of the invention reflect an appreciation that such an approach works well with web-based data loss protection (DLP) approaches, as each transfer is no longer examined in isolation, but in the broader context of an identified user entity's actions, at a particular time.

In certain embodiments, the security analytics system 118 may be primarily oriented to maximally leverage contextual information associated with various entity behaviors within the system. In certain embodiments, data flow tracking is performed by one or more endpoint agents 206, which allows the quantity and type of information associated with particular entities to be measured. In turn, this information may be used to determine how a particular edge device 304 handles requests. Skilled practitioners of the art will recognize that many such embodiments and examples are possible. Accordingly, the foregoing is not intended to limit the spirit, scope or intent of the invention.

Figure 4:
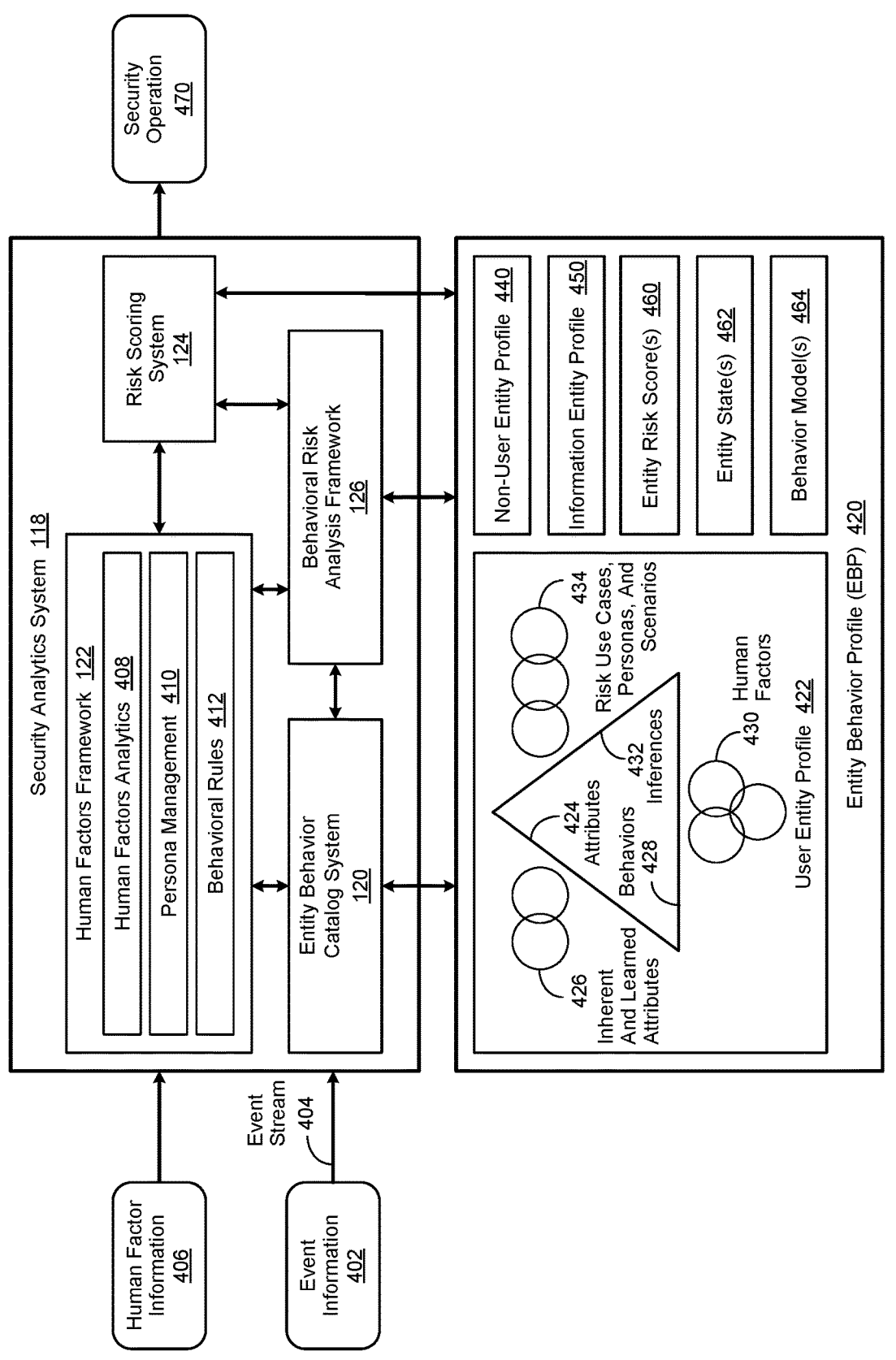
FIG. 4 is a simplified block diagram of the operation of a security analytics system used to process information stored in an entity behavior profile (EBP).

FIG. 4 is a simplified block diagram of the operation of a security analytics system implemented in accordance with an embodiment of the invention to process information stored in an entity behavior profile (EBP). In various embodiments, a security analytics system 118 may be implemented to use certain information stored in an EBP 420 to perform a security analytics operation, described in greater detail herein. As used herein, an entity behavior profile 420 broadly refers to a collection of information that uniquely describes a particular entity's identity and their associated behavior, whether the behavior occurs within a physical realm or cyberspace. In certain embodiments, the security analytics system 118 may be implemented to use certain event 402 and human factor 406 information in the performance of a particular security analytics operation.

In certain embodiments, the security analytics system 118 may be implemented with an entity behavior catalog (EBC) system 120, a human factors framework 122, a risk scoring system 124, and a behavioral risk analysis framework 126, or a combination thereof. In various embodiments, the human factors framework 122 may be implemented to receive and process certain human factor 406 information to generate one or more human factors 430. In certain embodiments, the EBC system 120 may be implemented to store the resulting human factors 430 in a user entity profile 422, described in greater detail herein.

As used herein, human factors 430 broadly refer to certain cardinal traits, emotional stressors, and organizational dynamics that individually, or in combination, may influence, one way or another, the entity behavior of an associated user entity. As an example, an employee experiencing financial stress may attempt to exfiltrate proprietary data in exchange for compensation from a competitor. As used herein, cardinal traits broadly refers to a user entity's consistent and enduring observed entity behavioral patterns. As likewise used herein, an emotional stressor broadly refers to any event involving an end user entity such that it may have an emotional influence upon, or otherwise affect, a user entity's behavior. An organizational dynamic, as likewise used herein, broadly refers to any event that occurs within an organization, or large group, that may have an operational influence upon, or otherwise affect, a user entity's behavior.

In various embodiments, the human factors framework 122 may be implemented with a human factors analytics 408 module, a contextual security risk persona management 410 module, and certain user entity behavioral rules 412, or a combination thereof. In certain embodiments, the human factors analytics 408 module may be implemented to perform a human factors analytics operation. As used herein, a human factors analytics operation broadly refers to any operation performed to analyze the effect that certain human factors, individually or in combination, may have on the security risk corresponding to an entity behavior enacted by an associated user entity. In certain embodiments, the security risk persona management 410 module may be implemented to create, revise, update, or otherwise manage a particular security risk persona, described in greater detail herein, associated with a particular user entity.

In various embodiments, the human factors framework 122 may be implemented to create, revise, update, or otherwise manage certain user behavioral rules 412 associated with a particular user entity. In certain embodiments, the user behavioral rules 412 may be implemented to determine whether a particular user entity behavior is anomalous, abnormal, unexpected, suspicious, or some combination thereof. In certain embodiments, the human factors framework 122 may be implemented to use the user behavioral rules 412 to determine whether certain user entity behaviors that are determined to be anomalous, abnormal, unexpected, suspicious, or some combination thereof, may likewise be considered to be a concerning behavior within a particular context.

In various embodiments, the EBC system 120 may be implemented to process a stream 404 of event 402 information to generate, revise, and otherwise manage certain information contained in an EBP 420. In certain embodiments, the EBP 420 may be implemented to include a user entity profile 422, a non-user entity profile 440, an information entity profile 450, one or more entity risk scores 460, one or more entity states 462, and one or more entity behavior models 464, or a combination thereof. As used herein, a user entity profile 422 broadly refers to a collection of information that uniquely identifies and describes a particular user entity identity and their associated entity behavior, whether the behavior occurs within a physical realm or cyberspace. As likewise used herein, a non-user entity profile 440 broadly refers to a collection of information that uniquely identifies and describes a particular non-user entity identity and its associated entity behavior, whether the behavior occurs within a physical realm or cyberspace. An information entity profile 450, as likewise used herein, broadly refers to a collection of information that uniquely identifies and describes a particular information entity, described in greater detail herein, and its associated entity behavior, whether the behavior occurs within a physical realm or cyberspace.

In various embodiments, the user entity profile 422 may be implemented to contain certain attribute 424, behavior 426, and inference 430 data related to a particular user entity.

In certain embodiments, the attribute 424 data may include information associated with a particular user entity's inherent and learned 426 attributes. In certain embodiments, the attribute 424 data may be used by the human factors framework 122 to gain knowledge or insights about a particular user entity and their associated user entity behavior.

In certain embodiments, a user entity's inherent and learned attributes 426 may include known facts, such as their location and contact information, their job title and responsibilities, their peers and manager, and so forth. In certain embodiments, a user entity's inherent and learned attributes 426 may be derived through observation, as described in greater detail herein. Examples of such derived inherent and learned attributes 426 include which devices a user entity may typically use, their usual work hours and habits, their interactions with other entities, and so forth.

In certain embodiments, the behavior 428 data may include information associated with a particular user entity's human factors 430, described in greater detail herein. In certain embodiments, the behavior 428 data may include information associated with a particular user entity's interactions with other entities, likewise described in greater detail herein. In certain embodiments, the behavior 428 data may include information associated with a particular user entity's social behavior. As used herein, social behavior broadly refers to behavior exhibited by a user entity when interacting with another user entity during a user entity-to-user entity interaction, described in greater detail herein.

Various embodiments of the invention reflect an appreciation that a user entity's social behavior may reveal certain aspects of the closeness and appropriateness of a particular user entity's relationship with another user entity, including when such a relationship deteriorates. In certain embodiments, the analysis of a user entity's social behavior may assist in understanding when a user entity's behavior is anomalous, abnormal, unexpected, suspicious, or some combination thereof. In certain embodiments, a user entity's social behavior may be enacted over multiple channels, such as chat, email, phone calls, meetings, collaboration tools, and so forth.

In various embodiments, certain data associated with the enactment of a particular user entity's social behavior over such channels may be collected and then used by the entity interaction analysis system 126 in the performance of one or more entity interaction risk analysis operations. As used herein, an entity interaction risk analysis operation broadly refers to any operation performed to analyze certain entity behavior information associated with a particular interaction to determine its associated risk. In various embodiments, an entity interaction risk analysis operation may be performed to analyze the content of certain user entity communications, such as email messages, text messages, and videoconference recordings, associated with a particular user entity-to-user entity interaction. In certain of these embodiments, the content of such user entity communications may be analyzed for its sentiment and tone, as well whether the communication is classified as being associated with an organizational entity interaction or a personal entity interaction, both of which are described in greater detail herein.

In various embodiments, an entity interaction risk analysis operation may be performed to analyze certain structural characteristics of a particular user entity's social behavior. In certain embodiments, such structural characteristics may include the cadence and frequency of the user entity's interactions with other user entities. In various embodiments, such structural characteristics may likewise include the characteristics of certain groups of user entities that a particular user entity interacts with. Likewise, in certain of these embodiments, such structural characteristics may include whether the members of such a group are related professionally, or non-professionally, or a combination thereof. In various embodiments, such structural characteristics may include the duration of individual user entity-to-user entity interactions, whether the interaction is passive or active, public or active, and whether information is shared, such as in attachments to an email message.

In certain embodiments, the inference 432 data may include information associated with certain security risk use cases, security risk personas, and security vulnerability scenarios 434, or a combination thereof, related to a particular user entity. As used herein, a security risk use case broadly refers to a set of indicators of behavior that create a security risk narrative that can be used to adaptively draw inferences, described in greater detail herein, from entity behavior enacted by a particular entity. As used herein, an indicator of behavior (IOB) broadly refers to an abstracted description of the inferred intent of the enactment of one or more entity behaviors, described in greater detail herein, by an associated entity. In certain embodiments, information related to the enactment of a particular entity behavior may be stored in the form of an observable. As used herein, an observable broadly refers to certain event information corresponding to an electronically-observable behavior enacted by an entity. In certain embodiments, an IOB is derived from a group of associated observables corresponding to the enactment of a particular entity behavior.

As an example, a user entity may enact certain entity behavior that results in the occurrence of one or more operating system (OS) events, a cloud access security broker (CASB) event, a firewall access event, and a data file download event. In this example, the events are observables. To continue the example, an IOB of "user downloaded document" can be inferred from the observables.

Skilled practitioners of the art will be familiar with the concept of an indicator of compromise (IOC), which is an artifact on a system or network that indicate a malicious activity has occurred. Known examples of IOCs include file hashes, network addresses, domain names, and so forth. As such, IOCs are useful in identifying and preventing adversary attacks based upon unique signatures of malware or other tools used by an attacker. However, IOCs are less effective against insider threats, such as data exfiltration. Accordingly, certain embodiments of the invention reflect an appreciation that IOBs can provide a description of the approach an attack is taking as it is occurring, unlike an IOC, which provides evidence of an attack after it has taken place.

As likewise used herein, a security risk persona broadly refers to a descriptor characterizing an entity behavioral pattern exhibited by a user entity during the enactment of certain user entity behaviors. In certain embodiments, the security risk persona may directly or indirectly characterize, or otherwise reference, one or more user entity behaviors. As an example, a user entity may exhibit user entity behaviors typically associated with data stockpiling. In this example, the security risk persona for the user entity might be "Data Stockpiler," or "Stockpiler." Likewise, as used herein, a security vulnerability scenario broadly refers to a grouping of one or more security risk use cases that represent a particular class of security vulnerability.

In various embodiments, the human factors framework 122 may be implemented in combination with the EBC system 122 to store certain human factors information in the EBP 420 and retrieve it therefrom. In certain embodiments, the attribute 424, behavior 428, and inference 432 data stored in the user entity profile 422 may be used individually, or in combination, by the human factors framework 122 to perform a human factors risk operation. As used herein, a human factors risk operation broadly refers to any operation performed to identify a human factor 430, classify it into a corresponding human factor class, or determine the effect it may have on the security risk represented by an associated JOB, or a combination thereof.

In various embodiments, the security analytics system 118 may be implemented to use certain information stored in the EBP 420 to draw inferences 432 regarding the trustworthiness of a particular entity. In certain embodiments, as described in greater detail herein, the drawing of the inferences may involve comparing a new entity behavior to known past behaviors enacted by the entity. In certain embodiments, new entity behavior that is different from known past behaviors may represent entity behavior signifying an associated security risk.

In certain embodiments, the risk scoring system 124 may be implemented to use such inferences 432, and other information stored in the EBP 420 to generate one or more entity risk scores 460. In certain embodiments, the resulting entity risk scores 460 may be quantitative, qualitative, or combination of the two. In certain embodiments, the EBC system 120 may be implemented to manage information associated with such risk scores 460 in the EBP 420.

As used herein, entity state 462 broadly refers to the context of a particular event as it relates to an associated entity behavior. In certain embodiments, the entity state 462 may be a long-term entity state or a short-term entity state. As used herein, a long-term entity state 462 broadly relates to an entity state 462 that persists for an extended interval of time, such as six months or a year. As likewise used herein, a short-term entity state 462 broadly relates to an entity state 462 that occurs for a brief interval of time, such as a few minutes or a day. In various embodiments, the method by which an entity state's 462 associated interval of time is considered to be long-term or short-term is a matter of design choice.

As an example, a particular user entity may have a primary work location, such as a branch office, and a secondary work location, such as their company's corporate office. In this example, the user's primary and secondary offices respectively correspond to the user's location, whereas the presence of the user at either office corresponds to an entity state 462. To continue the example, the user may consistently work at their primary office Monday through Thursday, but at their company's corporate office on Fridays. To further continue the example, the user's presence at their primary work location may be a long-term entity state 462, while their presence at their secondary work location may be a short-term entity state 462. Consequently, the long-term user entity state 462 on Monday through Thursday will typically be "working at the branch office" and the short-term entity state 462 on Friday will likely be "working at the corporate office."

As used herein, an entity behavior model 464 broadly refers to a collection of information related to an entity's historical entity behavior over a particular period of time. In certain embodiments, an entity behavior model 464 may be used by the security analytics system 118 to gain insight into how unexpected a set of events may be. As an example, an entity behavior model 464 may include information related to where a particular user entity works, which devices they may use and locations they may login from, who they may communicate with, and so forth. Certain embodiments of the invention reflect an appreciation that such entity behavior models 464 can be useful when comparing currently observed entity behaviors to past observations in order to determine how unusual a particular entity behavior may be.

For example, a user may have multiple entity behavior models 464, each associated with a particular channel, which as used herein broadly refers to a medium capable of supporting the electronic observation of entity behavior, such as a keyboard, a network, a video stream, and so forth. To continue the example, the user may have a particular set of people he sends emails to from his desktop computer, and does so in an orderly and methodical manner, carefully choosing his words, and writing longer than average messages compared to his peers. Consequently, analysis of such an email message will likely indicate it was authored by the user and not someone else.

In various embodiments, the security analytics system 118 may be implemented to perform a security operation 470. As used herein, a security operation 470 broadly refers to any action performed to mitigate an identified security risk. In certain embodiments, the security analytics system 118 may be implemented to identify the security risk. In various embodiments, the security analytics system 118 may be implemented to use certain information contained in the EBP 420 to either identify the security risk, or perform the security operation 470, or a combination of the two. In certain embodiments, the security system 118 may be implemented to perform the security operation 470 automatically or semi-automatically. Those of skill in the art will recognize that many such embodiments are possible. Accordingly, the foregoing is not intended to limit the spirit, scope, or intent of the invention.

Figure 5:
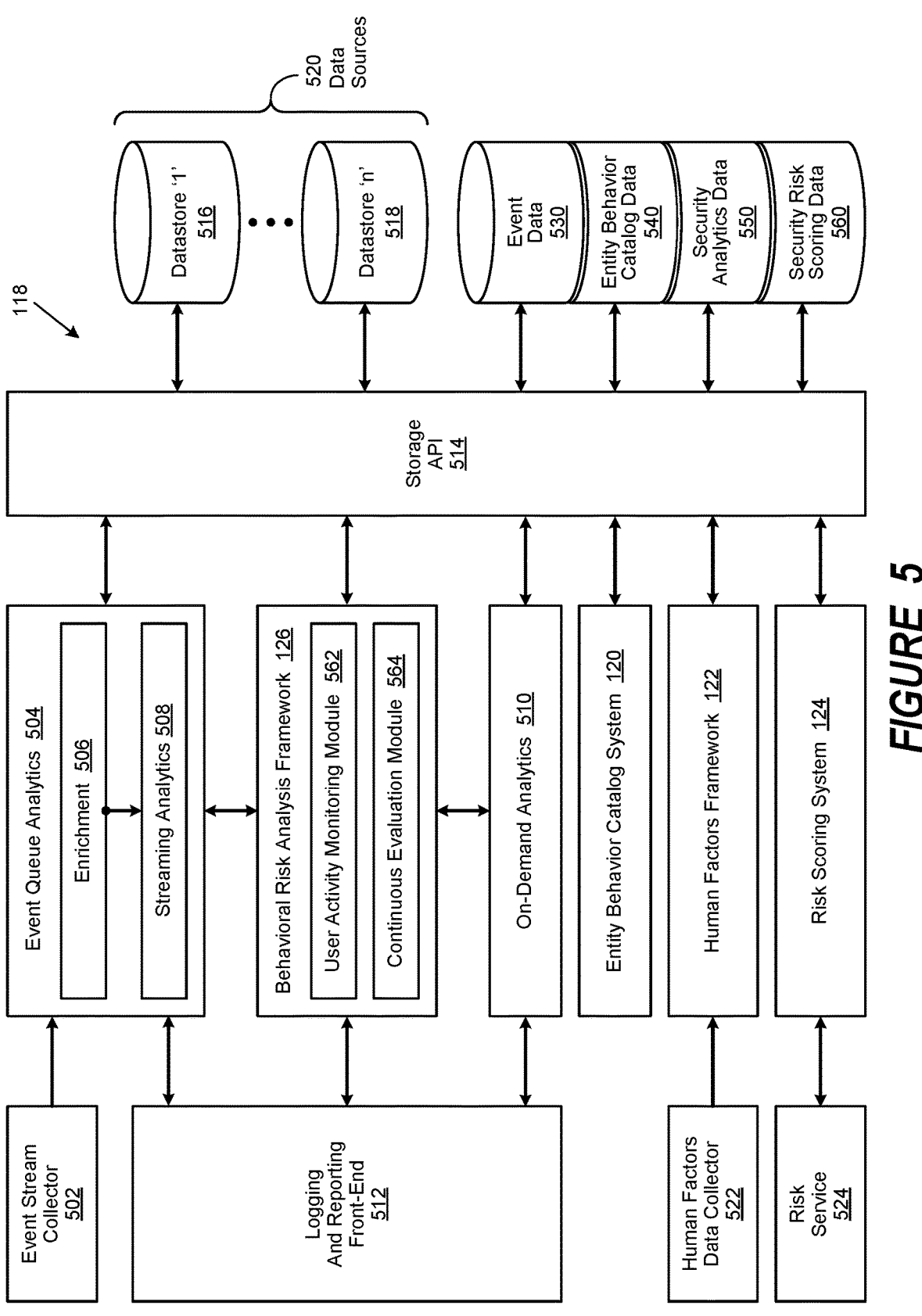
FIG. 5 is a simplified block diagram showing certain components of a security analytics system.

FIG. 5 is a simplified block diagram showing certain components of a security analytics system implemented in accordance with an embodiment of the invention. In certain embodiments, the security analytics system 118 shown in FIG. 5 may include an event queue analytics 504 sub-system, a behavioral risk analysis framework 126, an on-demand analytics 510 sub-system, an entity behavior catalog (EBC) system 120, a human factors framework 122, and a risk scoring system 124, or a combination thereof. In certain embodiments, the event queue analytics 504 sub-system may be implemented to include an enrichment 506 module and a streaming analytics 508 module.

In certain embodiments, the behavioral risk analysis framework 126 may be implemented to include a user activity monitoring (UAM) 562 module, or a continuous evaluation (CE) 564 module, or both. In certain embodiments, the behavioral risk analysis framework 126 may be implemented to perform a behavioral risk analysis operation. As used herein, a behavioral risk analysis operation broadly refers to any operation performed, directly or indirectly, to analyze the risk associated with certain behaviors exhibited or enacted by a particular user entity, as described in greater detail herein. In certain embodiments, a behavioral risk analysis operation may include one or more UAM operations, or one or more CE operations, or a combination thereof.

In certain embodiments, the UAM 562 module may be implemented to perform a UAM operation. As used herein, a UAM operation broadly refers to any operation performed, directly or indirectly, to observe, and record, certain entity behaviors, described in greater detail herein, associated with a particular user entity, likewise described in greater detail herein, to detect insider security threats and to support associated investigations. Examples of such a UAM operation include monitoring a particular user entity's behavior on a network, such as their interaction with certain websites, processes, files, and peripherals, such as their keyboard, a printer, and so forth. Other examples of UAM operations include monitoring certain information associated with text and email messages, removable storage devices, firewall and proxy alerts, badging, and events monitored by a security information and event management (SIEM) systems.

In certain embodiments, one or more UAM operations may be performed to assess risk based upon a particular user entity's cyber activity and behavior, described in greater detail herein. In certain embodiments, one or more UAM operations may be performed on a continuous, frequent basis (e.g., thousands of operations per second) to generate one or more associated risk scores for a particular user entity, as described in greater detail herein. In certain embodiments, examples of the information source used in the performance of one or more UAM operations may include a data loss protection (DLP) system, a security information and event management (SIEM) system, or a facility access system, and so forth. In certain embodiments, one or more UAM operations may be performed to monitor a particular user entity's network usage behavior, whether it is normal or negative. In certain embodiments, the data used to perform one or more UAM operations may be generated over a prolonged window of time, such as 60-180 days.

In various embodiments, the CE 564 module may be implemented to perform a CE operation. As used herein, a CE operation broadly refers to any operation performed to review, and assess, certain personal behaviors, professional behaviors, or life events, or a combination thereof, associated with a particular user entity to determine whether that entity meets certain prerequisites for accessing certain proprietary, confidential, or sensitive information. Examples of data used in the performance of a CE operation include data acquired from a human resource (HR) department of an organization associated with the user entity.

Other examples of data used in the performance of a CE operation include open source data, such as public records, and data acquired from law enforcement agencies, consumer credit bureaus, and government data sources (e.g., border travel, financial, etc.). In certain of these embodiments, such data may be implemented as a standardized risk factor, described in greater detail herein. In various embodiments, certain information associated with such standardized risk factors, may be used to generate an associated standardized risk score, likewise described in greater detail herein.

In certain embodiments, one or more CE operations may be performed to provide ongoing verification of a user entity's eligibility for sensitive positions within an organization. In certain embodiments, one or more CE operations may be performed on a recurring batch basis (e.g., tens, or hundreds, or thousands of operations per month) to generate one or more standardized risk scores for a particular user entity, as described in greater detail herein. In certain embodiments, examples of the information source used in the performance of one or more CE operations may include data exports (e.g., spreadsheets) from one or more partner organizations. In certain embodiments, one or more CE operations may be performed to assess risk by reviewing all, or a portion of, a particular organization's user entities. In certain embodiments, the data used to perform one or more CE operations may be collected over a prolonged window of time, such as the past three to five years.

In certain embodiments, one or more CE operations may be performed between standard Periodic Reinvestigation (PRI) cycles to provide early indicators of certain personnel issues that may impact the clearance status of a particular user entity. Certain embodiments of the invention reflect an appreciation that while risk factors considered during PRI cycles may be relatively static, the data used to identify issues aligning with such risk factors may not be as consistent. For example, data used in the performance of a CE operation may be provided in a spreadsheet format, with significant field and content variation between different data sources. Various embodiments of the invention likewise reflect an appreciation that data sources used in the performance of certain CE operations may change over time, which may in turn present additional challenges. Accordingly, building effective risk analytic strategies and capabilities may be an ongoing and customized process for each organization.

In various embodiments, one or more CE operations may be performed to identify certain behavioral risks associated with a particular user entity. In certain embodiments, such behavioral risks may include certain professional events, such as change in status, transitions from one position or set of responsibilities to another, negative behaviors in the workplace, or interpersonal factors, or a combination thereof. In certain embodiments, such behavioral risks may likewise include certain personal or life events, such as marriage, divorce, a death in family, injury or illness, pregnancy, adoption, and so forth.

Likewise, in certain embodiments, such behavioral risks may include association with other high risk individuals, social network interactions, or other factors, such as having foreign contacts or substance abuse issues. In certain embodiments, such behavioral risks may include a violent criminal record, a non-violent criminal record, or litigious behavior, or a combination thereof. In various embodiments, such behavioral risks may likewise include certain financial lifestyle factors, such as a high debt-to-income (DTI) ratio, poor credit, bankruptcy, foreclosure, unexplained affluence, or gambling, and so forth.

In various embodiments, a combination of data sources and personal narrative categories may be used in the performance of certain CE operations to raise confidence that potential risky user entity behavior is actually occurring. Accordingly, the identification of certain narrative categories, and correlating findings across those narrative categories, may reduce false positives and provide more accurate risk scores. Likewise, in various embodiments, certain user entity behaviors across multiple categories may be assessed and analyzed, the results of which may assist in producing a comprehensive, timeline-based framework for understanding risky user entity behaviors, which in turn may assist in deriving a comprehensive risk value for a particular user entity.

In certain embodiments, the security analytics system 118 may be implemented to provide log storage, reporting, and analytics capable of performing streaming 508 or on-demand 510 behavioral risk analytics operations, or both. In certain embodiments, such operations may be associated with defining and managing an entity behavior profile (EBP), described in greater detail herein. In certain embodiments, as likewise described in greater detail herein, an EBP may be implemented to detect entity behavior that may be anomalous, abnormal, unexpected, or suspicious, or a combination thereof.

In certain embodiments, the security analytics system 118 may be implemented to provide a uniform platform for storing events and contextual information associated with various entity behaviors and performing longitudinal analytics. As used herein, longitudinal analytics broadly refers to performing analytics of entity behaviors occurring over a particular period of time. As an example, an entity may iteratively attempt to access certain proprietary information stored in various locations. In addition, the attempts may occur over a brief period of time.

To continue the example, the fact that the information the user is attempting to access is proprietary, that it is stored in various locations, and the attempts are occurring in a brief period of time, in combination, may indicate the user entity behavior enacted by the user is suspicious. As another example, certain entity identifier information (e.g., a user name) associated with an entity may change over time. In this example, a change in the entity's user name, during a particular time period or at a particular point in time, may represent suspicious entity behavior.

In certain embodiments, the security analytics system 118 may be implemented to be scalable. In various embodiments, the security analytics system 118 may be implemented in a centralized location, such as a corporate data center. In certain of these embodiments, additional resources may be added to the security analytics system 118 as needs grow. In various embodiments, the security analytics system 118 may be implemented as a distributed system. In certain of these embodiments, the security analytics system 118 may span multiple information handling systems. In certain embodiments, the security analytics system 118 may be implemented in a cloud environment. In certain embodiments, the security analytics system 118 may be implemented in a virtual machine (VM) environment. In such embodiments, the VM environment may be configured to dynamically and seamlessly scale the security analytics system 118 as needed. Skilled practitioners of the art will recognize that many such embodiments are possible. Accordingly, the foregoing is not intended to limit the spirit, scope or intent of the invention.

In certain embodiments, an event stream collector 502 may be implemented to collect event and related contextual information, described in greater detail herein, associated with various entity behaviors. In these embodiments, the method by which the event and contextual information is selected to be collected by the event stream collector 502 is a matter of design choice. In certain embodiments, the event and contextual information collected by the event stream collector 502 may be processed by an enrichment module 506 to generate enriched entity behavior information. In certain embodiments, the enrichment may include certain contextual information related to a particular entity behavior or event. In various embodiments, the enrichment may include certain temporal information, such as timestamp information, related to a particular entity behavior or event.

In certain embodiments, enriched entity behavior information may be provided by the enrichment module 506 to a streaming analytics 508 module. As used herein, streaming analytics 508 broadly refers to analytics performed in near real-time on enriched entity behavior information as it is received. In certain embodiments, the streaming analytics 508 module may provide some or all of the enriched entity behavior information to the behavioral risk analysis framework 126.

In various embodiments, the streaming analytics 508 module may be implemented to identify behavioral patterns, and their associated risks, through analysis of certain events enacted by their associated user entities. In certain of these embodiments, artificial intelligence (AI) and machine learning (ML) approaches familiar to skilled practitioners of the art may be used to analyze certain events, and the behavior of their associated user entities, to identify behavioral patterns and assess their associated risk. In certain embodiments, the behavioral risk analysis framework 126 may be implemented to provide the enriched entity behavior information to the UAM 562 module, or the CE 564 module, or both. In various embodiments, the UAM 562 module may be implemented to use the enriched entity behavior information it receives to monitor certain user entity activities, as described in greater detail herein. Likewise, in various embodiments, the CE 564 module may be implemented to use the enriched entity behavior information it receives to evaluate certain user entity activities on a continual basis, as likewise described in greater detail herein.

In various embodiments, the behavioral risk analysis framework 126 may be implemented to provide certain user entity behavior risk analysis information to the on-demand analytics 510 module. As likewise used herein, on-demand analytics 510 broadly refers herein to analytics performed, as they are requested, on enriched entity behavior information after it has been received. In certain embodiments, the enriched entity behavior information may be associated with a particular event. In certain embodiments, the enrichment 506 module, the behavioral risk analysis framework 126, and the streaming analytics modules, or a combination thereof, may be implemented to perform event queue analytics 504 operations, as described in greater detail herein.

In certain embodiments, the on-demand 510 analytics may be performed on enriched entity behavior associated with a particular interval of, or point in, time. In certain embodiments, the streaming 508, behavioral risk analysis 126, or on-demand 510 analytics may be performed on enriched entity behavior associated with a particular user, group of users, one or more non-user entities, or a combination thereof. In certain embodiments, the streaming 408 or on-demand 510 analytics may be performed on enriched entity behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming analytics 508 module, the behavioral risk analysis framework 126, and the or on-demand analytics 510 subsystem, or a combination thereof, may be provided to a storage Application Program Interface (API) 514. In turn, the storage API 514 may be implemented to provide access to certain data sources 520, such as datastores '1' 516 through 'n' 518. In certain embodiments, the datastores '1' 516 through 'n' 518 may variously include a datastore of entity identifiers, temporal events, or a combination thereof. In certain embodiments, the storage API 514 may be implemented to provide access to repositories of event 530, entity behavior catalog (EBC) 540, security analytics 550, and security risk scoring 560 data, or a combination thereof. In various embodiments, the data stores '1' 516 through 'n' 518 may be implemented to store the results of certain security analytics operations.

In various embodiments, the security analytics system 118 may be implemented with a logging and reporting front-end 512, which in certain embodiments may be used to receive the results of analytics operations performed by the streaming analytics 508 module, the behavioral risk analysis framework 126, and the on-demand analytics 510 subsystem, or a combination thereof. In certain embodiments, the human factors framework 122 may be implemented to receive human factors information, described in greater detail herein, from a human factors data collector 522. In various embodiments, the entity behavior catalog system 120 and the human factors framework 122 may respectively be implemented to use the storage API 514 to access certain data stored in the data sources 520, the repositories of event 530, entity behavior catalog (EBC) 540, security analytics 550, and security risk scoring 560 data, or a combination thereof.

In certain embodiments, the security analytics system 118 may include a risk scoring system 124 implemented to perform risk scoring operations, described in greater detail herein. In certain embodiments, functionalities of the risk scoring system 124 may be provided in the form of a risk management service 524. In various embodiments, the risk management service 524 may be implemented to perform certain operations associated with defining and managing an entity behavior profile (EBP), as described in greater detail herein. In certain embodiments, the risk management service 524 may be implemented to perform operations associated with detecting entity behavior that may be of analytic utility and adaptively responding to mitigate risk, as described in greater detail herein.

In certain embodiments, the risk management service 524 may be implemented to provide the results of various analytics operations performed by the streaming 506 or on-demand 508 analytics modules. In certain embodiments, the risk management service 524 may be implemented to use the storage API 514 to access various enhanced cyber behavior and analytics information stored on the data sources 520, the repositories of event 530, EBC 540, security analytics 550, and security risk scoring 560 data, or a combination thereof. Skilled practitioners of the art will recognize that many such embodiments are possible. Accordingly, the foregoing is not intended to limit the spirit, scope or intent of the invention.

Figure 6:
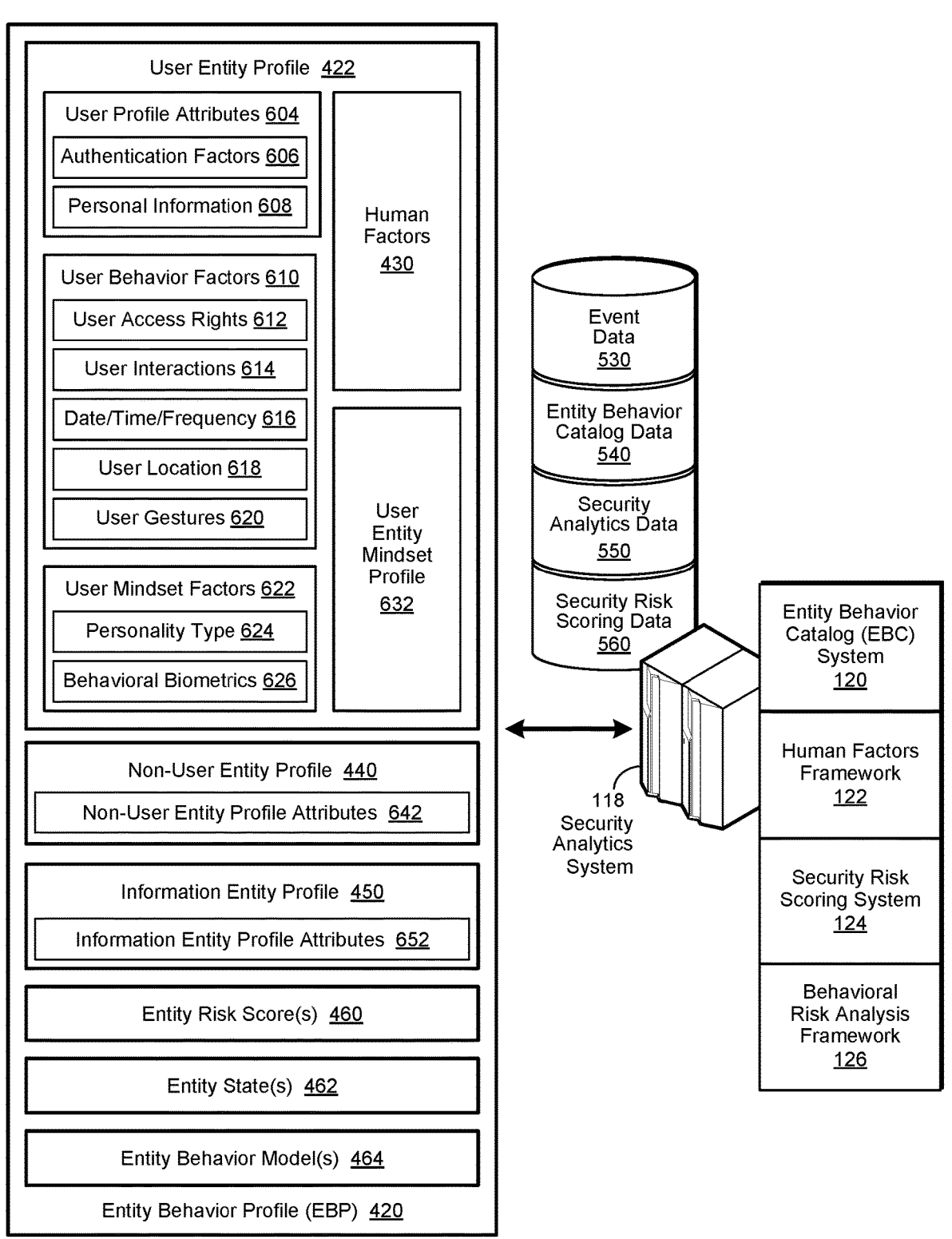
FIG. 6 shows a simplified block diagram of an entity behavior profile (EBP)

FIG. 6 shows a simplified block diagram of an entity behavior profile (EBP) implemented in accordance with an embodiment of the invention. In certain embodiments, a security analytics system 118, described in greater detail herein, may be implemented to include an entity behavior catalog (EBC) system 120, a human factors framework 122, a security risk scoring system 124, and a behavioral risk analysis framework 126, or a combination thereof. In certain embodiments, the security analytics system 118 may be implemented to access a repository of event 530, EBC 540, security analytics 550, and security risk scoring 560 data, or a combination thereof. In various embodiments, the security analytics system 118 may be implemented to use certain information stored in the repository of event 530, EBC 540, security analytics 550, and security risk scoring 560 data, or a combination thereof, to perform a security analytics operation, described in greater detail herein. In certain embodiments, the results of a particular security analytics operation may be stored in the repository of security analytics 550 data.

In certain embodiments, the EBC system 120 may be implemented to generate, manage, store, or some combination thereof, information related to the behavior of an associated entity. In certain embodiments, the information related to the behavior of a particular entity may be stored in the form of an entity behavior profile (EBP) 420. In certain embodiments, the EBC system 120 may be implemented to store the information related to the behavior of a particular entity in the repository of EBC 540 data. In various embodiments, the EBC system 120 may be implemented to generate certain information related to the behavior of a particular entity from event information associated with the entity, as described in greater detail herein. In certain embodiments, event information associated with a particular entity may be stored in the repository of event 530 data.

In various embodiments, the EBC system 120 may be implemented as a cyber behavior catalog. In certain of these embodiments, the cyber behavior catalog may be implemented to generate, manage, store, or some combination thereof, information related to cyber behavior, described in greater detail herein, enacted by an associated entity. In various embodiments, as likewise described in greater detail herein, the information generated, managed, stored, or some combination thereof, by such a cyber behavior catalog may be related to cyber behavior enacted by a user entity, a non-user entity, or an information entity, or a combination thereof.

In various embodiments, the EBC system 120 may be implemented to perform EBP 420 management operations to process certain entity behavior information, described in greater detail herein, and entity attribute information associated, with defining and managing an EBP 420. As used herein, entity attribute information broadly refers to information associated with a particular entity that can be used to uniquely identify the entity, and describe certain associated properties, or a combination thereof. In various embodiments, the entity attribute information may include certain types of content. In certain embodiments, such content may include text, unstructured data, structured data, graphical images, photographs, audio recordings, video recordings, biometric information, and so forth. In certain embodiments, the entity attribute information may include metadata. In certain embodiments, the metadata may include entity attributes, which in turn may include certain entity identifier types or classifications.

In certain embodiments, the entity attribute information may include entity identifier information. In various embodiments, the EBC system 120 may be implemented to use certain entity identifier information to ascertain the identity of an associated entity at a particular point in time. As used herein, entity identifier information broadly refers to an information element associated with an entity that can be used to ascertain or corroborate the identity of its corresponding entity at a particular point in time. In various embodiments, the entity identifier information may include certain user entity 422, non-user entity 440, and information entity 450 profile attributes, or a combination thereof.

In certain embodiments, the entity identifier information may include temporal information, described in greater detail herein. In various embodiments, the security analytics system 118 may be implemented to use certain aspects of the EBC system 120 and such temporal information to assess the risk associated with a particular entity, at a particular point in time, and respond with a corresponding security operation, likewise described in greater detail herein. In certain embodiments, the security analytics system 118 may be implemented to respond to such assessments in order to reduce operational overhead and improve system efficiency while maintaining associated security and integrity. In certain embodiments, the response to such assessments may be performed by a security administrator. Accordingly, certain embodiments of the invention may be directed towards assessing the risk associated with the affirmative resolution of the identity of an entity at a particular point in time in combination with its behavior and associated contextual information, such as human factors 430 information, described in greater detail herein. Consequently, the EBC system 120 may be more oriented in various embodiments to risk adaptation than to security administration.

In certain embodiments, an EBP 420 may be implemented to include a user entity profile 422, a non-user entity profile 440, an information entity profile 450, one or more entity risk scores 460, one or more entity states 462, and one or more entity behavior models 464, or a combination thereof. In various embodiments, the user entity profile 422 may include user entity profile attributes 604, user entity behavior factors 610, user entity mindset factors 622, certain human factors 430, and a user entity mindset profile 632, or a combination thereof. In various embodiments, the user entity profile attributes 604 may include certain user entity authentication factors 606, described in greater detail herein, and personal information 608.

As used herein, a user entity profile attribute 604 broadly refers to data or metadata that can be used, individually or in combination with other user entity profile attributes 604, user entity behavior factors 610, or user entity mindset factors 622, to ascertain the identity of a user entity. In various embodiments, certain user entity profile attributes 604 may be uniquely associated with a particular user entity. In certain embodiments, the personal information 608 may include non-sensitive personal information associated with a user entity, such as their name, title, position, role, and responsibilities.

In certain embodiments, the personal information 608 may likewise include technical skill level information, peer information, expense account information, paid time off (PTO) information, data analysis information, insider information, misconfiguration information, third party information, or a combination thereof. In certain embodiments, the personal information 608 may contain sensitive personal information associated with a user entity. As used herein, sensitive personal information (SPI), also commonly referred to as personally identifiable information (PII), broadly refers to any information usable to ascertain the identity of a user entity, either by itself, or in combination with other information, such as contextual information described in greater detail herein.

Examples of SPI may include the full or legal name of a user entity, initials or nicknames, place and date of birth, home and business addresses, personal and business telephone numbers, their gender, and other genetic information. Additional examples of SPI may include government-issued identifiers, such as a Social Security Number (SSN) or a passport number, vehicle registration plate and serial numbers, and driver's license numbers. Other examples of SPI may include certain email addresses and social media identifiers, credit and debit card numbers, and other digital identity information. Yet other examples of SPI may include employer-issued identifiers, financial transaction information, credit scores, electronic medical records (EMRs), insurance claim information, personal correspondence, and so forth. Further examples of SPI may include user entity authentication factors 606, such as biometrics, user identifiers and passwords, and personal identification numbers (PINs). In certain embodiments, the SPI may include information considered by an individual user, a group of users, or an organization (e.g., a company, a government or non-government organization, etc.), to be confidential or proprietary.

As used herein, a user entity behavior factor 610 broadly refers to information associated with a user entity's behavior, whether the behavior occurs within a physical realm or cyberspace. In certain embodiments, user behavior factors entity 610 may include the user entity's access rights 612, the user entity's interactions 614, and the date/time/frequency 616 of when the interactions 614 are enacted. In certain embodiments, the user entity behavior factors 610 may likewise include the user entity's location 618, and the gestures 620 used by the user entity to enact the interactions 614.

In certain embodiments, the user entity gestures 620 may include key strokes on a keypad, a cursor movement, a mouse movement or click, a finger swipe, tap, or other hand gesture, an eye movement, or some combination thereof. In certain embodiments, the user entity gestures 620 may likewise include the cadence of the user's keystrokes, the motion, force and duration of a hand or finger gesture, the rapidity and direction of various eye movements, or some combination thereof. In certain embodiments, the user entity gestures 620 may include various audio or verbal commands performed by the user.

As used herein, user entity mindset factors 622 broadly refer to information used to make inferences regarding the mental state of a user entity at a particular point in time, during the occurrence of an event, or an enactment of a user behavior, or a combination thereof. Certain embodiments of the invention reflect an appreciation that human attitudes are generally considered to have three primary components. The first of these is affect, which as used herein, broadly refers to human feelings, emotions, moods, and so forth. The second is behavior, which as used herein, broadly refers to goal-directed and other types of behavior familiar to skilled practitioners of the art. The third is cognition, which as used herein, broadly refers to human beliefs and knowledge, which forms the way in which a human thinks.

Skilled practitioners of the art will be aware that human attitudes vary in importance, with some of the most important linked to social identification, group membership, self interest, and personal value. Furthermore, strongly held attitudes, especially those with personal relevance, drive human behaviors. These behaviors may be positive, such as those related to maintaining a person's health, or negative, such as engaging in violent protests, retaliating against an employer or co-workers, and so forth. Accordingly, certain embodiments of the invention reflect an appreciation that understanding strongly held attitudes may provide an avenue for identifying individuals who may pose a behavioral risk to an organization.

Certain embodiments of the invention likewise reflect an appreciation that the words people use to communicate with one another, especially about personal topics of interest, can provide a rich source of data for identifying both attitude and attitude strength. Likewise, the words that people read, engage with, and share can be representative of topics of interest, or belief systems, or both. Certain embodiments of the invention likewise reflect an appreciation that individuals tend to create, seek out, and consume information that aligns with their existing beliefs. Likewise, certain embodiments of the invention reflect an appreciation that communication data exchanged between individuals may also be used to determine peer groups, or group membership, which can indicate a person's social alignment and strongly held beliefs.

In various embodiments, as described in greater detail herein, these human behaviors may be electronically observable, as described in greater detail herein. In certain of these embodiments, electronically observable behaviors may be processed to identify the mindset of a particular user entity, at a particular point in time. In various embodiments, the mindset of a user entity, at a particular point in time, may be inferred from the correlation of certain associated events, likewise described in greater detail herein. In certain embodiments, the electronically observed behavior of a particular user entity may be used to infer the mindset of a group of other user entities associated with the user entity.

As likewise used herein, mental state broadly refers to a hypothetical state corresponding to the way a user entity may be thinking or feeling. In certain embodiments, the user entity mindset factors 622 may include a personality type 624. Examples of known approaches for determining a personality type 624 include Jungian types, Myers-Briggs type indicators, Keirsey Temperament Sorter, Socionics, Enneagram of Personality, and Eyseneck's three-factor model.

In certain embodiments, the user entity mindset factors 622 may include various behavioral biometrics 626. As used herein, a behavioral biometric 628 broadly refers to a physiological indication of a user entity's mental state. Examples of behavioral biometrics 626 may include a user entity's blood pressure, heart rate, respiratory rate, eye movements and iris dilation, facial expressions, body language, tone and pitch of voice, speech patterns, and so forth.

Certain embodiments of the invention reflect an appreciation that certain user entity behavior factors 610, such as user entity gestures 620, may provide additional information related to inferring a user entity's mental state. As an example, a user entering text at a quick pace with a rhythmic cadence may indicate intense focus. Likewise, an individual user intermittently entering text with forceful keystrokes may indicate the user is in an agitated state. As another example, the user may intermittently enter text somewhat languorously, which may indicate being in a thoughtful or reflective state of mind. As yet another example, the user may enter text with a light touch with an uneven cadence, which may indicate the user is hesitant or unsure of what is being entered.

Certain embodiments of the invention likewise reflect an appreciation that while the user entity gestures 620 may provide certain indications of the mental state of a particular user entity, they may not provide the reason for the user entity to be in a particular mental state. As an example, aggressive, forceful keystrokes combined with an increased heart rate may indicate normal behavior for a particular user when composing end-of-month performance reviews. In various embodiments, certain user entity behavior factors 610, such as user entity gestures 620, may be correlated with certain contextual information, as described in greater detail herein.

Likewise, certain embodiments of the invention include an appreciation that certain user entity gestures 620 and behavioral biometrics 626 are reflective of an individual user's personality type 624. In various embodiments, the EBC system 120 may be implemented to use certain human factors 430, described in greater detail herein, in combination with other information contained in the user entity profile 422, and a particular entity state 462, described in greater detail herein, to generate an associated user entity mindset profile 632. As used herein, a user entity mindset profile 632 broadly refers to a collection of information that reflects an inferred mental state of a user entity at a particular time during the occurrence of an event, an enactment of an associated user entity behavior, or a combination of the two. As an example, certain information may be known about a user entity, such as their name, their title and position, and so forth, all of which are user entity profile attributes 604. Likewise, it may be possible to observe a user entity's associated user entity behavior factors 610, such as their interactions with various systems, when they log-in and log-out, when they are active at the keyboard, the rhythm of their keystrokes, and which files they typically use.

Certain embodiments of the invention reflect an appreciation these user entity behavior factors 610 may change, a little or a lot, from day to day. These changes may be benign, such as when a user entity begins a new project and accesses new data, or they may indicate something more concerning, such as a user entity who is actively preparing to steal data from their employer. In certain embodiments, the user entity behavior factors 610 may be implemented to ascertain the identity of a user entity. In certain embodiments, the user entity behavior factors 610 may be uniquely associated with a particular user entity.

In certain embodiments, observed user entity behaviors may be used to build a user entity profile 422 for a particular user entity. In addition to creating a model of a user entity's various attributes and observed behaviors, these observations can likewise be used to infer things that are not necessarily explicit. Accordingly, in certain embodiments, observed user entity behaviors may be used in combination with an EBP 420 to generate an inference regarding an associated user entity. As an example, a particular user may be observed eating a meal, which may or may not indicate the user is hungry. However, if it is also known that the user worked at their desk throughout lunchtime and is now eating a snack during a mid-afternoon break, then it can be inferred they are indeed hungry that afternoon.

In various embodiments, the non-user entity profile 440 may be implemented to include certain non-user entity profile attributes 642. As used herein, a non-user profile attribute 642 broadly refers to data or metadata that can be used, individually or in combination with other non-user entity profile attributes 642, to ascertain the identity of a non-user entity. In various embodiments, certain non-user entity profile attributes 642 may be uniquely associated with a particular non-user entity, described in greater detail herein.

In certain embodiments, the non-user profile attributes 642 may be implemented to include certain identity information, such as a non-user entity's associated network, Media Access Control (MAC), physical address, serial number, associated configuration information, and so forth. In various embodiments, the non-user profile attributes 642 may be implemented to include non-user entity behavior information associated with interactions between certain user entities, non-user entities, and data entities, the type of those interactions, the data exchanged during the interactions, the date/time/frequency of such interactions, and certain services accessed or provided.

In various embodiments, the information entity profile 450 may be implemented to include certain information entity profile attributes 652. As used herein, an information profile attribute broadly refers to data or metadata that can be used, individually or in combination with other information entity profile attributes 652, to ascertain the identity of an information entity. In various embodiments, certain information entity profile attributes 652 may be uniquely associated with a particular information entity, described in greater detail herein.

In certain embodiments, the information entity profile attributes 652 may be implemented to include certain identity information, such as a file name, a hash value, time and date stamps, size and type of the data (e.g., structured, binary, etc.), a digital watermark familiar to those of skill in the art, and so forth. In various embodiments, the information entity profile attributes 652 may be implemented to include information behavior information associated with entity interactions between the information entity and certain user and non-user entities, the type of those interactions, modifications to data during a particular interaction, and the date/time/frequency of such interactions.

In various embodiments, the EBC system 120 may be implemented to use certain data associated with an EBP 420 to provide a probabilistic measure of whether a particular electronically-observable event is of analytic utility. As used herein, an event of analytic utility broadly refers to any information associated with a particular event deemed to be relevant in the performance of a security analytics operation, described in greater detail herein. In certain embodiments, an electronically-observable event that is of analytic utility may be determined to be anomalous, abnormal, unexpected, or suspicious. In certain embodiments, an electronically-observable event determined to be anomalous, abnormal, unexpected, or suspicious may be associated with an operation performed by a particular entity that is likewise considered to be concerning, as described in greater detail herein.

To continue the prior example, a user may typically work out of their company's corporate office on Fridays. Furthermore, various user entity mindset factors 622 within their associated user entity profile 422 may indicate that the user is typically relaxed and methodical when working with customer data. Moreover, the user's associated user entity profile 422 indicates that such user entity interactions 614 with customer data typically occur on Monday mornings and the user rarely, if ever, copies or downloads customer data. However, the user may decide to interact with certain customer data late at night, on a Friday, while in their company's corporate office. As they do so, they exhibit an increased heart rate, rapid breathing, and furtive keystrokes while downloading a subset of customer data to a flash drive.

Consequently, their user entity mindset profile 632 may reflect a nervous, fearful, or guilty mindset, which is inconsistent with the entity state 462 of dealing with customer data in general. More particularly, downloading customer data late at night on a day the user is generally not in their primary office results in an entity state 462 that is likewise inconsistent with the user's typical user behavior. As a result, the EBC system 120 may infer that the user's behavior may represent a security threat. Those of skill in the art will recognize that many such embodiments and examples are possible. Accordingly, the foregoing is not intended to limit the spirit, scope or intent of the invention.

Certain embodiments of the invention reflect an appreciation that the quantity, and relevancy, of information contained in a particular EBP 420 may have a direct bearing on its analytic utility when attempting to determine the trustworthiness of an associated entity and whether or not they represent a security risk. As used herein, the quantity of information contained in a particular EBP 420 broadly refers to the variety and volume of EBP elements it may contain, and the frequency of their respective instances, or occurrences, related to certain aspects of an associated entity's identity and behavior. As likewise used herein, information of analytic utility contained in an EBP 420 broadly refers to any information deemed to be relevant in the performance of a security analytics operation, described in greater detail herein. Likewise, as used herein, an EBP element broadly refers to any data element stored in an EBP 420, as described in greater detail herein. In various embodiments, an EBP element may be used to describe a particular aspect of an EBP, such as certain user entity profile attributes 604, user entity behavior factors 610, user entity mindset factors 622, user entity mindset profile 632, non-user entity profile attributes 642, information entity profile attributes 652, an entity risk score 460, an entity state 462, and an entity behavior model 464.

In certain embodiments, statistical analysis may be performed on the information contained in a particular EBP 420 to determine the trustworthiness of its associated entity and whether or not they represent a security risk. For example, a particular user entity authentication factor 606, such as a biometric, may be consistently used by a user entity for authenticating their identity to their endpoint device. To continue the example, a user ID and password may be used by the same, or a different user entity, in an attempt to access the endpoint device. As a result, the use of a user ID and password may indicate a security risk due to its statistical infrequency. As another example, a user entity may consistently access three different systems on a daily basis in their role as a procurement agent. In this example, the three systems may include a financial accounting system, a procurement system, and an inventory control system. To continue the example, an attempt by the procurement agent to access a sales forecast system may appear suspicious if never attempted before, even if the purpose for accessing the system is legitimate.

As likewise used herein, the relevancy of information contained in a particular EBP 420 broadly refers to the pertinence of the EBP elements it may contain to certain aspects of an associated entity's identity and behavior. To continue the prior example, an EBP 420 associated with the procurement agent may contain certain user entity profile attributes 604 related to their title, position, role, and responsibilities, all or which may be pertinent to whether or not they have a legitimate need to access the sales forecast system. In certain embodiments, the user entity profile attributes 604 may be implemented to include certain job description information. To further continue the example, such job description information may have relevance when attempting to determine whether or not the associated entity's behavior is suspicious. In further continuance of the example, job description information related to the procurement agent may include their responsibility to check sales forecast data, as needed, to ascertain whether or not to procure certain items. In these embodiments, the method by which it is determined whether the information contained in a particular EBP 420 is of sufficient quantity and relevancy is a matter of design choice.

Various embodiments of the invention likewise reflect an appreciation that accumulating sufficient information in an EBP 420 to make such a determination may take a certain amount of time. Likewise, various embodiments of the invention reflect an appreciation that the effectiveness or accuracy of such a determination may rely upon certain entity behaviors occurring with sufficient frequency, or in identifiable patterns, or a combination thereof, during a particular period of time. As an example, there may not be sufficient occurrences of a particular type of entity behavior to determine if a new entity behavior is inconsistent with known past occurrences of the same type of entity behavior. Accordingly, various embodiments of the invention reflect an appreciation that a sparsely-populated EBP 420 may result in exposure to certain security vulnerabilities.

In certain embodiments, the human factors framework 122 may be implemented to perform a human factors risk operation, likewise described in greater detail herein. In various embodiments, as likewise described in greater detail herein, the human factors framework 122 may be implemented to use certain event information stored in the repositories of event 530, EBC 540, security analytics 550, and security risk scoring 560 data, or a combination thereof, to perform the human factors risk operation. In certain embodiments, the human factors risk operation may be performed to assess the risk of an event associated with a particular user entity.

Figures 7, 8, 9:
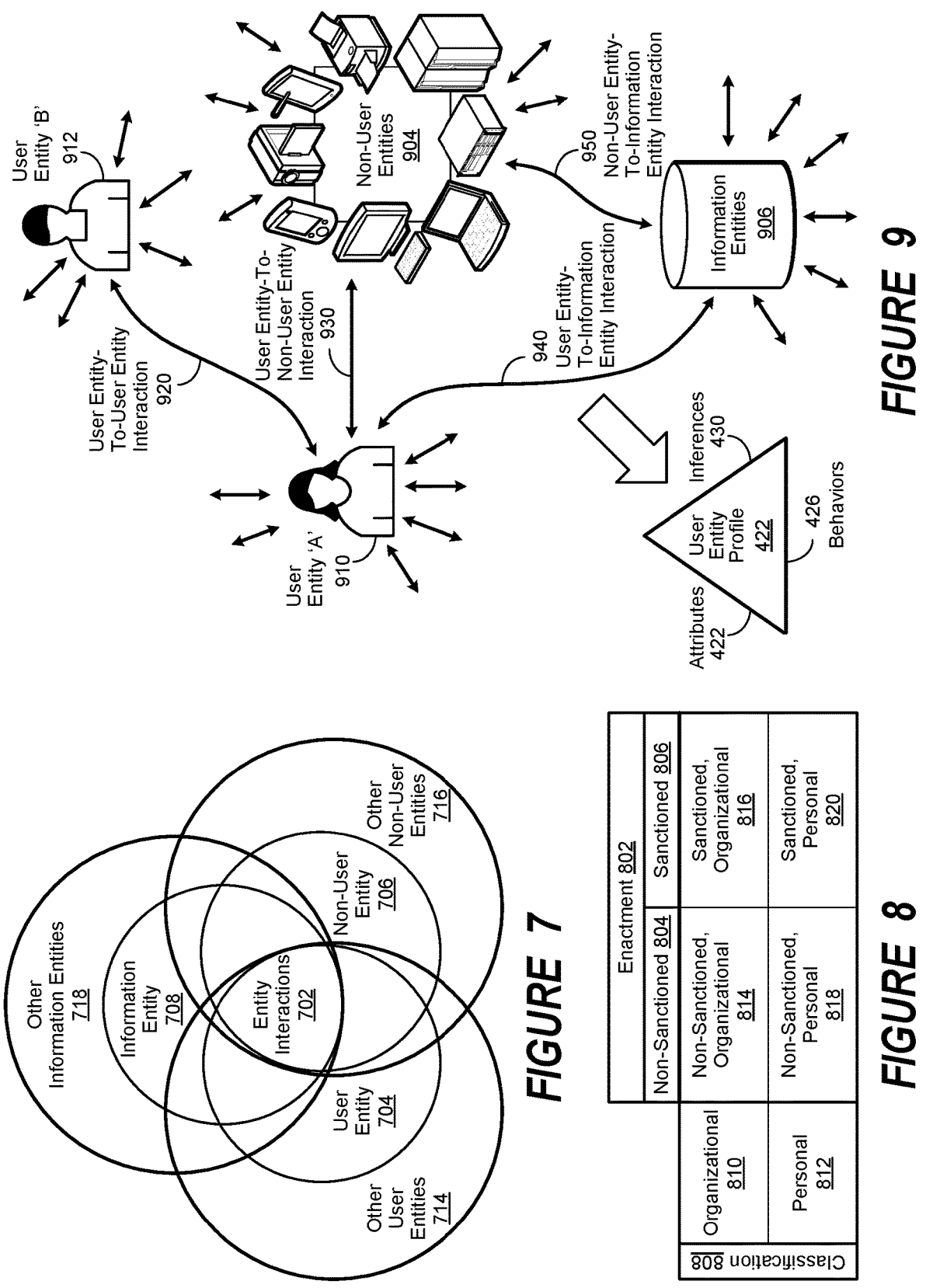
FIG. 7 is a simplified Venn diagram showing entity interactions between a user entity, a non-user entity, and an information entity.
FIG. 8 is a table showing certain entity interaction classifications.
FIG. 9 shows the enactment of entity interactions between user entities, non-user entities, and information entities.

FIG. 7 is a simplified Venn diagram showing entity interactions implemented in accordance with an embodiment of the invention between a user entity, a non-user entity, and an information entity. As shown in FIG. 7, entity interactions 702, described in greater detail herein, may occur in certain embodiments between a user entity 704, a non-user entity 706, or an information entity 708. Likewise, entity interactions 702 may respectively occur in certain embodiments between a user entity 704, a non-user entity 706, or an information entity 708 and other user entities 714, other non-user entities 716, or other information entities 718. Skilled practitioners of the art will recognize that many such examples of entity interactions 702 are possible. Accordingly, the foregoing is not intended to limit the spirit, scope, or intent of the invention.

FIG. 8 is a table showing certain entity interaction classifications implemented in accordance with an embodiment of the invention. In various embodiments, one or more entity interaction classification operations, described in greater detail herein, may be performed to classify 808 a particular entity interaction, likewise described in greater detail herein, as an organizational 810 entity interaction or a personal 812 entity interaction. As used herein, an organizational 810 entity interaction broadly refers to an entity interaction enacted by an entity in furtherance of, or relating to, one or more objectives of an organization with which they are associated. As likewise used herein, a personal 812 entity interaction broadly refers to an entity interaction enacted by an entity in furtherance of, or relating to, one or more private objectives, and is not related to any organization with which the entity may be associated.

In various embodiments, one or more entity interaction classification operations, may be performed to determine whether the enactment 802 of a particular entity interaction is non-sanctioned 804 or sanctioned 806. As used herein, a non-sanctioned 804 entity interaction broadly refers to an entity interaction whose enactment does not comply with one or more policies instituted by an organization associated with an entity involved in the enactment of the entity interaction. Conversely, as likewise used herein, a sanctioned entity interaction broadly refers to an entity interaction whose enactment complies with one or more policies instituted by an organization associated with an entity involved in the enactment of the entity interaction.

In various embodiments, a particular entity interaction between two entities may be deemed to be a non-sanctioned 804 entity interaction by the organization associated with one of the entities, but deemed a sanctioned 806 entity interaction by the organization associated with the other entity. Accordingly, in certain of these embodiments, the determination of what is considered to be a non-sanctioned 804, or sanctioned 806, entity interaction by an organization associated with a particular entity involved in the enactment of the entity interaction, and the method by which such a determination is made, is a matter of design choice. Certain embodiments of the invention reflect an appreciation that a particular non-sanctioned 804 entity interaction may be enacted with malicious intent, or innocently, by an associated entity.

In various embodiments, as shown in FIG. 8, a particular entity interaction may be a non-sanctioned, organizational 814 entity interaction, a sanctioned, organizational 816 entity interaction, a non-sanctioned, personal 818 entity interaction, or a sanctioned, personal 820 entity interaction. One example of a non-sanctioned, organizational 814 entity interaction would be an employee posting a derogatory comment about their employer on a social media site during working hours. Another example of a non-sanctioned, organizational 814 entity interaction would be a member of an organization accessing a web site the organization believes contains content that may include misinformation, or disinformation, or both. Yet another example of a non-sanctioned, organizational 814 entity interaction would be a sales manager sharing sensitive sales forecast information with another employee that is not authorized to receive it.

One example of a sanctioned, organizational 816 entity interaction would be an employee responding to a meeting request from another employee via an email message. Another example of a sanctioned, organizational 816 entity interaction would be an employee in the marketing department of an organization reading an article published by an online industry news agency. Yet another example of a sanctioned, organizational 816 entity interaction would be a member of an organization updating certain content on the organization's web site if that is one of their responsibilities. One example of a non-sanctioned, personal 818 entity interaction would be a member of an organization using objectionable profanity in a personal text message to another member of the organization. Another example of a non-sanctioned, personal 818 entity interaction would be an employee posting a racist comment on a social media site. Yet another example of a non-sanctioned, personal 818 entity interaction would be an employee browsing a web site deemed inappropriate by their employer during work hours.

One example of a sanctioned, personal 820 entity interaction would be an employee sending an email message during work hours to a group of co-workers inviting them to a dinner party at their home. Another example of a sanctioned, personal 820 entity interaction would be a member of an organization reading an article related to current events in the world from a reputable online news source. Yet another example of a sanctioned, personal 820 entity interaction would be an employee receiving an email containing the results of a fantasy football pool from another employee. Skilled practitioners of the art will recognize that many such examples of non-sanctioned, organizational 814, sanctioned, organizational 816, non-sanctioned, personal 818, and sanctioned, personal 820 entity interactions are possible. Accordingly, the foregoing is not intended to limit the spirit, scope, or intent of the invention.

FIG. 9 shows the enactment of entity interactions implemented in accordance with embodiment of the invention between user entities, non-user entities, and data entities. In various embodiments, a user entity-to-user entity 920 interaction may occur between a first user entity, such as user entity 'A' 910, and a second user entity, such as user entity 'B' 912. In various embodiments, a user entity-to-non-user entity 930 interaction may occur between a user entity, such as user entity 'A' 910 and certain non-user entities 904, described in greater detail herein. In various embodiments, a user entity-to-information entity 940 interaction may occur between a user entity, such as user entity 'A' 910, and certain information entities 906. In various embodiments, a non-user entity-to-information entity 950 interaction may occur between certain non-user entities 904 and certain information entities 906. In certain embodiments (not shown), a non-user entity-to-non-user entity interaction may occur between certain non-user entities 904.

In various embodiments, certain information associated with user entity-to-user entity 920, user entity-to-non-user entity, and user entity-to-information entity 940 interactions may be stored within a user entity profile 420, described in greater detail herein. In various embodiments, such information stored in the user entity profile 422 may include certain attribute 422, behavior 426, and inference 430, or a combination thereof, as likewise described in greater detail herein. Those of skill in the art will recognize that many such embodiments are possible. Accordingly, the foregoing is not intended to limit the spirit, scope, or intent of the invention.

Figures 10, 11:
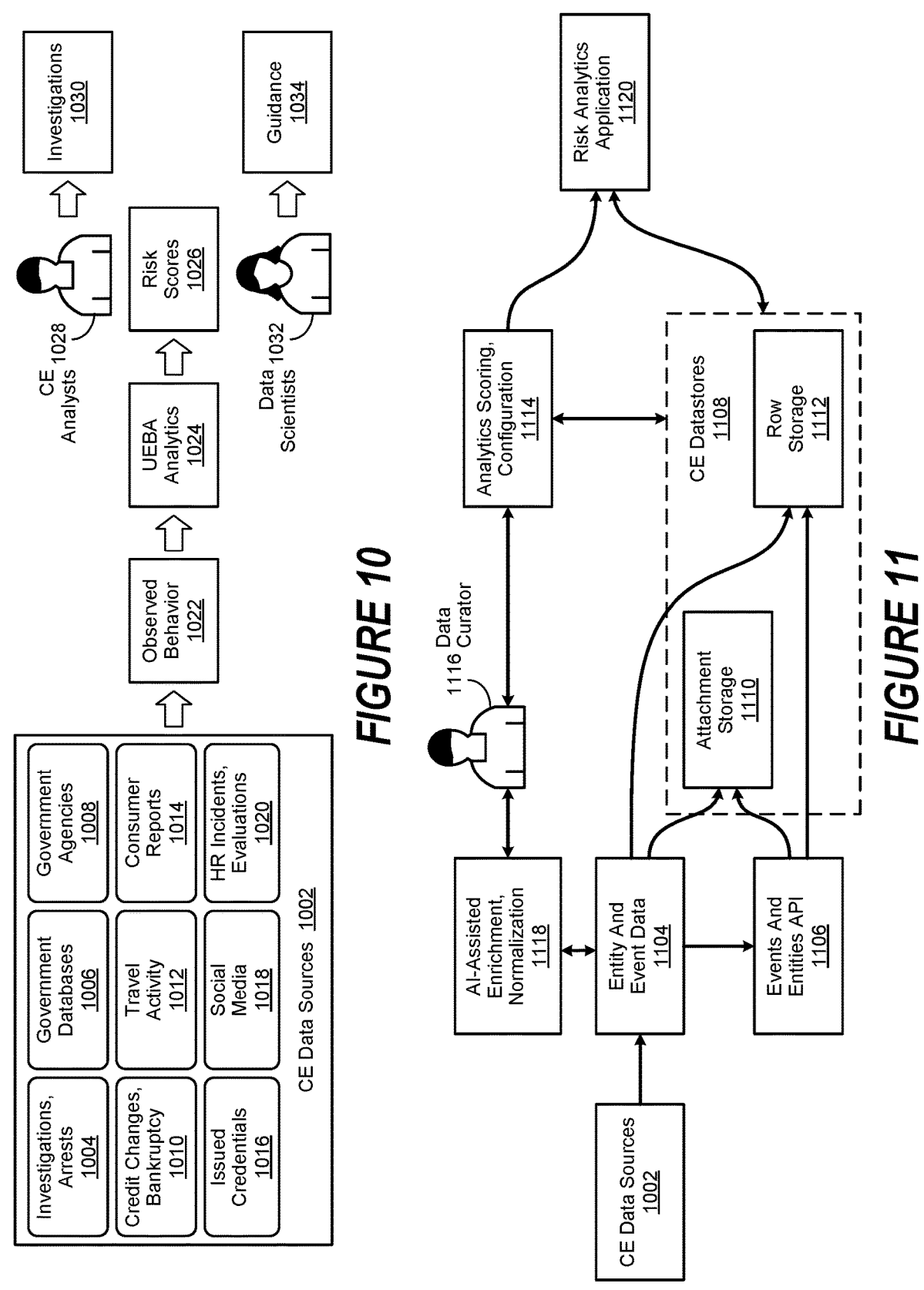
FIG. 10 is a simplified block diagram showing the performance of continuous evaluation (CE) operations.
FIG. 11 is a simplified process flow diagram showing the performance of CE operations.

FIG. 10 is a simplified block diagram showing the performance of continuous evaluation (CE) operations implemented in accordance with an embodiment of the invention. In certain embodiments, one or more CE data sources 1002 may be used, as described in greater detail herein, as input data for the observed behavior 1022 of a particular user entity, described in greater detail herein. In various embodiments, the CE data sources 1002 may include criminal investigations and arrests 1004, information gathered from certain government databases 1006, or government agencies 1008.

In various embodiments, the CE data sources 1002 may likewise include information associated with changes in credit ratings and bankruptcies 1010 associated with a particular user entity, their travel activity 1012, and certain consumer reports 1014. Likewise, in various embodiments, the CE data sources may include certain information associated with the issuance of certain credentials 1016, such as a government passport or visa, social media 1018 posts or other related activity, and human resource (HR) incidents and evaluations 1020. Skilled practitioners of the art will recognize that many such examples of CE data sources 1002 are possible. Accordingly, the foregoing is not intended to limit the spirit, scope, or intent of the invention.

In various embodiments, information associated with the observed behavior 1022 may then be used in the performance of one or more user entity behavior analytics (UEBA) operations 1024, familiar to those of skill in the art. In certain embodiments, the results of the one or more UEBA analytics 1024 operations may be processed, as described in greater detail herein, to generate one or more risk scores 1026. In various embodiments, the resulting risk scores 1026 may then be evaluated by one or more CE analysts 1028 to evaluate certain flagged events for evidence of illicit or negative behavior enacted by a particular user entity, associated life stressors, or indicators they may be compromised, or a malicious actor, or a combination thereof. In various embodiments, the results of the evaluations performed by the one or more CE analysts 1028 may then be used in the performance of certain investigations 1030 related to the behavior of a particular user entity. In various embodiments, the resulting risk scores 1026 may likewise be evaluated by one or more data scientists 1032 to identify certain patterns and trends in a particular population of use entities. In various embodiments, the results of the evaluations performed by the one or more data scientists 10328 may then be used to provide guidance 1034 to define new, or adapt existing, policies and procedures associated with certain observed user entity behaviors.

FIG. 11 is a simplified process flow diagram showing the performance of continuous evaluation (CE) operations implemented in accordance with an embodiment of the invention. In various embodiments, certain CE data sources 1002, described in greater detail herein, are processed to generate associated entity and event data 1104, likewise described in greater detail herein. In certain embodiments, one or more CE datastores 1108 may be implemented to include one or more attachment storage 1110 repositories, and one or more row storage 1112 repositories, or a combination thereof.

As used herein, an attachment storage 1110 repository broadly refers to any repository of data implemented to store data associated with an email, text, or social media message. As likewise used herein, a row storage 1112 repository broadly refers to an repository of data implemented to store data in row format. Examples of row format data include rows of data typically used in relational databases.

In various embodiments, certain entity and event data 1104 may be stored directly in the repositories of attachment storage 1110 and row storage 1112. In various embodiments, certain entity and event data 1104 may be provided to an events and entity Application Program Interface (API) 1106. In various embodiments, the event and entity API 1106 may be implemented to provide an interface to the repositories of attachment storage 1110 and row storage 1112. In various embodiments, the event and entity API 1106 may be implemented to store certain portions entity and event data 1104 in the repositories of attachment storage 1110 and row storage 1112. In these embodiments, the portions of entity and event data 1104 selected to be respectively stored directly in the repositories of attachment storage 1110 and row storage 112, and the method by which they are stored, is a matter of design choice.

In various embodiments, certain information stored in the CE datastores 1108 may be used to perform certain analytics scoring and configuration operations 1114, described in greater detail herein. In certain embodiments, one of more or the analytics scoring and configuration operations 1114 may be implemented to be performed automatically. In certain embodiments, one of more or the analytics scoring and configuration operations 1114 may be implemented to be performed manually, or semi-automatically, by a data curator 1116. In various embodiments, certain event and entity data 1104 may be enriched and normalized 1118 through the use of artificial intelligence (AI) approaches familiar to skilled practitioners of the art.

In certain embodiments, the enriched and normalized 1118 entity and event data 1104 may be used by the data curator 1116 to manually, or semi-automatically, perform one or more analytics scoring and configuration operations 1114. In certain embodiments, the results of the analytics scoring and configuration operations 1114 may be provided to one or more risk analytics applications 1120, as described in greater detail herein. In certain embodiments, the one or more risk analytics applications 1120 may be implemented to access the CE datastores 1108.

FIG. 12 is a table summarizing the difference between various aspects of user activity monitoring (UAM) and continuous evaluation (CE) operations implemented in accordance with an embodiment of the invention to detect risky user entity behavior. In various embodiments, the difference between UAM 1202 and CE 1204 operations can be distinguished by summarizing their respective aspects of purpose 1206, evaluation frequency 1208, source examples 1210, monitoring 1212, and data retention 1214. As an example, one or more UAM 1202 operations may be performed for the purpose 1206 of assessing the risk of a particular user entity based upon electronic observables, such as their cyber activity and behaviors. In contrast, one or more CE 1204 operations may be performed for the purpose of verifying the eligibility of the same user entity for sensitive positions, or access to sensitive or proprietary information, based upon their personal behavior and observed life events.

As another example, the evaluation frequency 1208 for certain UAM 1202 operations may involve the continuous processing of daily risk scores, with such operations being performed as often as thousands per minute. In contrast, the evaluation frequency 1208 for certain CE 1204 operations may be implemented in certain embodiments to occur on a monthly basis, with such operations being performed tens, hundreds, or thousands of times per month. As yet another example, the data retention 1214 period for certain high volume UAM 1202 operations may be implemented in certain embodiments to retain a 60 to 180 day window of data in an analytic cache. In contrast, the data retention 1214 for certain low volume CE 1204 operations may be implemented in certain embodiments to be retained for five years in order to observe a behavior profile based upon a particular user entity's life events.

FIG. 13 is a table showing a normalized risk score and a standardized risk score for a particular standardized risk factor associated with a continuous evaluation (CE) operation implemented in accordance with an embodiment of the invention. In various embodiments, one or more user activity monitoring (UAM) operations may be performed, as described in greater detail herein, to monitor and process one or more continuous, high volume streams of monitoring data (e.g., thousands of events per minute) to detect anomalous user entity behavior that may represent an insider threat. In various embodiments, one or more continuous evaluation (CE) operations may be performed, as likewise described in greater detail herein, to monitor and process low volumes of information related to certain personal behaviors, professional behaviors, or life events, or a combination thereof, associated with a particular user entity on a recurring basis (e.g., tens, hundreds, or thousands of times per month) to determine whether that entity meets certain prerequisites for accessing certain proprietary, confidential, or sensitive information.

In various embodiments, one or more UAM operations, or one or more CE operations, or a combination thereof, may be performed to generate a normalized risk score 1302 for a particular standardized risk factor 1318. In various embodiments, generation of the normalized risk score 1302 may involve the performance of certain data, or statistical, normalization operations familiar to those of skill in the art. In various embodiments, the normalized risk score 1302 may be generated by using such normalization operations to process certain monitoring data associated with a particular user entity, or a group of user entities with similar characteristics or attributes, or both. In certain of these embodiments, the normalization operations may be used to determine which behaviors of a particular user entity is normal, or typical, and those which are not, either for the user entity themselves, or for a group of user entities enacting similar behaviors, or both.

Certain embodiments of the invention reflect an appreciation that the generation of a normalized risk score 1302 resulting from the performance of a particular CE operation may not accurately reflect the risk of an associated standardized risk factor 1318. As an example, the behavior of user entity 'A' 1314 and user entity '13' 1316 may be monitored on Monday 1304, Tuesday 1306, Wednesday 1308, Thursday 1310, and Friday 1312. In this example, an employer may receive a credit report on Monday 1304 that indicates user entity 'A' 1314 is experiencing credit problems, which may lead to risky behavior due to financial vulnerability. Likewise, the user entity 'A' 1314 may enact a single routine security violation on Friday 1312.

To continue the example, the receipt of the credit report and the single routine security violation represent sparse events, and as such are given a default normalized risk score 1302 of '99', which may not accurately reflect the actual severity of the risky behavior. To continue the example further, user entity 13' 1316 may receive a human resource (HR) corrective action on Wednesday 1308. As before, the occurrence of such an event is rare, and as a result, it is likewise given a normalized risk score 1302 of '99', which may be excessively high.

In contrast, certain CE operations, as likewise described in greater detail herein, may be implemented to translate certain known standardized risk models, such as the Socio-technical and Organizational Factors for Insider Threat (SOFIT) model, into a one or more standardized risk factors 1318, described in greater detail herein. In continuance of the prior example, one or more CE operations may likewise be performed to process certain information, as likewise described in greater detail herein, associated with events related to users 'A' 1324 and 13' 1326. To continue the prior example further, information associated with one or more standardized risk factors 1318 may be used to generate, as described in greater detail herein, a standardized risk score 1322 for the events corresponding to the receipt of the credit report and the single routine security violation associated with user entity 'A' 1324. Likewise, information associated with one or more standardized risk factors 1318 may be used to generate a standardized risk score 1322 for the event corresponding to the HR corrective action associated with user entity 'A' 1324. Certain embodiments of the invention reflect an appreciation that the use of information associated with one or more standardized risk scores 1322 may facilitate assigning a risk score to a particular event that more accurately portrays its associated risk.

FIG. 14 is a table showing comparative and direct risk scoring options implemented in accordance with an embodiment of the invention to assess certain risks associated with the behavior of a particular user entity. In various embodiments, certain comparative 1404 risk scoring options 1402 may be used in one or more user activity monitoring (UAM) operations to assess the risk associated with the behavior of a particular user entity. In various embodiments, the comparative 1404 risk scoring options 1402 used in such UAM operations may include the use of certain event models and security vulnerability scenarios, described in greater detail herein.

In various embodiments, certain comparative 1404 and direct 1406 risk scoring options 1402 may be respectively used, individually or in combination, in one or more UAM, or in one or more continuous evaluation (CE) operations, or a combination thereof, to assess the risk associated with the behavior of a particular user entity. In various embodiments, the assessment of the risk associated with the behavior of a particular user entity may be expressed in the form of a behavioral risk score, described in greater detail herein. In various embodiments, the comparative 1404 and direct 1406 risk scoring options 1402 respectively used in such UAM and CE operations may include certain lexicon lists, features, and entity risk scores.

As used herein, a lexicon list broadly refers to a list of words, phrases, or acronyms, or a combination thereof. In certain embodiments, the lexicon list may be associated with a particular event, class of events, observable, class of observables, entity behavior, class of entity behaviors, security related activity, security related risk use case, or security vulnerability scenario, or a combination thereof, all of which are described in greater detail herein. In various embodiments, a particular lexicon list may be implemented to contain certain lexical information used to perform a UAM operation, or a CE operation, or both.

In various embodiments, the lexical information may include words ontologically related to certain features, described in greater detail herein, associated with a particular user entity behavior. As used herein, lexical information broadly refers to any information associated with a particular word, such as its definition, contextual meaning, synonyms, antonyms, denoted concepts, and so forth. In certain embodiments, the lexical information contained within a lexicon list may contain terms that can be used in the performance of a UAM operation, or a CE operation, or both, to assist in identifying anomalous, abnormal, unexpected, or malicious user entity behavior.

As used herein, ontologically related broadly refers to the way in which one object, such as a word, is related to another object in an ontology. In certain embodiments the ontological relationship may refer to the way in which one object is related to a class of objects, such as classes of words. In certain embodiments, the ontological relationship may be based upon one or more attributes shared by the objects or a class of objects. As likewise used herein, an object's attributes may broadly refer to an associated aspect, property, feature, characteristic, or parameter of the object.

As likewise used herein, an ontology broadly refers to any representation, formal naming, and definition of the categories, properties, and relations between the concepts, data, and entities that substantiate a particular domain of interest, such as security analytics. In various embodiments, the ontological relationship between certain words in a particular lexicon list, and certain features associated with a particular user entity behavior, may be advantageously used to achieve more accurate results when performing a UAM operation or a CE operation. In various embodiments, as described in greater detail herein, certain UAM operations, or CE operations, or both, may be implemented to use such ontological relationships to identify certain words in a particular lexicon list that may be used to detect a user entity behavior that may have otherwise not been detected.

In various embodiments, one or more comparative 1404 risk scoring options 1402 may be used in the performance of a UAM operation to detect anomalous user entity behavior that deviates from certain predominantly normal behavior of the user entity. In various embodiments, one or more direct 1406 risk scoring options 1402 may be used in the performance of a CE operation to translate certain known industry risk models, such as the Sociotechnical and Organizational Factors for Insider Threat (SOFIT) model, into a behavioral risk score. In various embodiments, one or more direct 1406 scoring options 1402 may be used in the performance of a CE operation to bypass normalization, weighting, event type comparison, and event model score comparison, or a combination thereof.

Figures 15, 16:
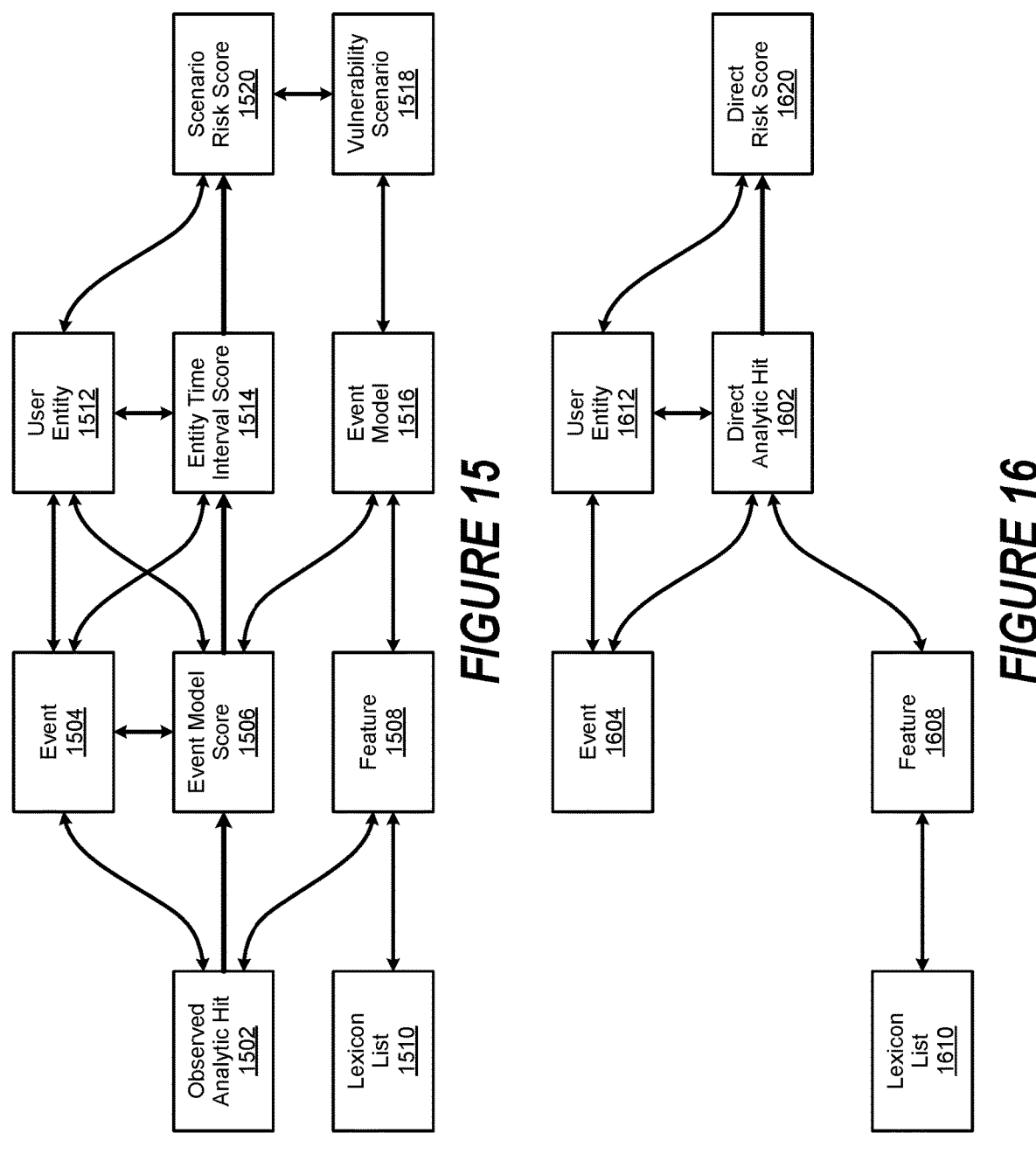
FIG. 15 is a simplified process flow showing the performance of certain behavioral risk analysis operations i to generate a scenario risk score.
FIG. 16 is a simplified process flow showing the performance of certain CE operations to generate a direct risk score.

FIG. 15 is a simplified process flow showing the performance of certain behavioral risk analysis operations implemented in accordance with an embodiment of the invention to generate a scenario risk score. In various embodiments, performance of one or more behavioral risk analysis operations may include the performance of certain user activity monitoring (UAM) operations, or certain continuous evaluation (CE) operations, or a combination thereof. In various embodiments, the scenario risk score 1520 may be implemented to provide an indication of certain user entity behavior that is anomalous to the user entity's typical behavior.

In various embodiments, a lexicon list 1510 may be implemented to include certain features 1508, that may be associated with events 1504 of analytic utility, described in greater detail herein. Examples of such features include words, phrases, or acronyms, such as "alcohol," "crash," "criminal mischief," "drugs," "DUI," "felony," "harassment," "leaving," and so forth. In various embodiments, a feature value may be assigned to each of the features 1508 included in a lexicon list 1510. In these embodiments, the method by which a feature value is assigned to particular feature 1508, and the method by which the feature value is quantified, is a matter of design choice.

In various embodiments, such features 1508 may be used to create an event model 1516. In various embodiments, certain features 1508 used to create an event model 1516 may be weighted. In these embodiments, the features 1508 selected to be weighted, the method by which they may be weighted, and weight assigned to each feature 1508, is a matter of design choice.

As an example, an event model 1516 named "Workplace Behavior" may be created. In this example, the Workplace Behavior event model 1516 may include features 1508 such as "Human Resources (HR) Level 1," "HR Level 2," "HR Any Level," and "Rule Violations." To continue the example, a feature weight of '75', '25', '25', and '50' may respectively be assigned to features 1508 "HR Level 1," "HR Level 2," "HR Any Level," and "Rule Violations."

In various embodiments, information associated with certain electronically-observed events 1504 may be collected, as likewise described in greater detail herein. In various embodiments, the collected event 1504 information may include certain information associated with a particular user entity 1512 associated with the electronically-observed event 1504. In various embodiments, the information associated with the one or more electronically-observed events 1504 may be processed with certain features 1508 to detect an observed analytic hit 1502.

In various embodiments, the event model 1516 may be used as a reference when processing certain information associated with an observed analytic hit 1502, and certain associated event 1504 information, and certain associated user entity 1512 information, or a combination thereof, to generate a event model score 1506. In various embodiments, the event model score 1506 may be implemented to provide a weighted score for a particular event, based upon certain tagged features 1508 associated with the event. In various embodiments, the feature weights of certain features 1508 may be used to generate a weighted score for a particular event.

As an example, an event model 1516 named "weekend use of profanity involving spreadsheets" may include the following features 1508:

Feature '1': matches the lexicon list 1510 "profanity"
Feature '2': time grouping by "day of week"
Feature '3': count of spreadsheet file attachments
In this example, the following two events 1504 occur:
Event 'A': on Sunday, user '1' sends user '2' an email that contains the text "I am SO tired of this #&$@!" along with one spreadsheet attachment
Event 'B': on Monday, user '2' responds with the text "Me too!" in the body of the email.

To continue the example, the feature 1508 scores may be generated as follows:

> Event 'A': profanity='1', day=Sunday, attachment='1'
> Event 'B': profanity='0', day=Monday, attachment='0'

Accordingly, in this example, event 'A' will receive a higher event model score 1506 than event 'B', as the probability of sending a work-related email on Monday is higher than sending it on Sunday.

In various embodiments, the resulting event model score 1506 may then be processed with certain event 1504 information, and certain user entity 1512 information, or a combination thereof, to generate an entity time interval score 1514. In various embodiments, the entity time interval score 1514 may be generated according to the frequency of certain events 1504 occurring within a particular interval of time. To provide statistical context for the prior example:

> The use of profanity in an email is '1' in 25 events out of 100, resulting in a probability of '0.25'
> (75% of events 1504 are less than '1'. They are '0', no profanity detected.)
> '3' events 1504 out of '100' occur on Sunday, resulting in a probability of '0.03'.
> (97% of events 1504 do not occur on Sunday, so such an occurrence is rare.)
> '15' events 1504 out of '100' occur on Monday, resulting in a probability of '0.15'
> (85% of events 1504 do not occur on Monday, so it is more common than an event 1504 occurring on Sunday.)
> '90' events 1504 out of '100' do not contain email attachments, so the probability of >='1' attachment is '0.10'
> (90% of events 1504 have fewer than '1' attachment.)

Accordingly, the previously-calculated probabilities can be combined into a joint probability to generate an event model score 1506, where probabilities of '0' are ignored and a negative natural log function ("nlog" or "−ln") is used to ensure that small probabilities become large scores, as follows:

> Event 'A': profanity='1' ('0.25'), day=Sunday ('0.03'), attachment='1' ('0.10')
> As a result: −(ln(0.25))+−(ln(0.03))+−(ln(0.10))=7.2
> Event 'B': profanity='0' ('0'), day=Monday ('0.15'), attachment='0' ('0')
> As a result: −(ln(0.15))=1.9

Accordingly, the event model score 1506 of '7.2' for event 'A' is higher than the event model score 1506 of '1.9' for event 'B', which signifies that the user entity behavior risk associated with event 'A' is higher than that associated with event 'B'.

In certain embodiments, one or more event models 1516 may be used to create a security vulnerability scenario 1518, described in greater detail herein. In various embodiments, the security vulnerability scenario 1518 may be used as a reference when processing the entity time interval score, and certain associated user entity 1512 information, or a combination thereof, to generate a scenario risk score 1520. In various embodiments, any event model scores 1506 that do not already fit within a '0' to '1' range may be normalized, as an event model 1516 that aggregates by event count, or model score, may produce a very large value (e.g., "1 billion"), or a very low value (e.g., '0').

Accordingly, in certain embodiments, a max-based approach may be used across multiple user entities 1512 for each time interval, such as:

$$\log_{10}(X+1)/\log_{10}(M+1), \text{ where:}$$

'X' is the model score for a particular user entity 1512 in a particular time interval, and 'M' is the maximum model score over a recent analytic window of time (e.g., days or weeks)

For example, a scenario risk score 1520 associated with an event model 1516 oriented to "number of print jobs per day" could be calculated as follows:

> On "May 16," the max score across all user entities 1512 for the "number of print jobs per day" event model 1516 is '24' and is associated with user entity '1' 1512
> Accordingly, the normalized "May 16" score for user entity '1' 1516 is $\log_{10}(24+1)/\log_{10}(24+1)=1.0$
> The "May 16" score for user entity '2' 1516 is '2', which when normalized is $\log_{10}(2+1)/\log_{10}(24+1)=0.34$
> Accordingly, the "May 16" score of '0.34' for user entity '2' 1516 is lower, and thus, less risky, than the "May 16" score of '1.0' for user entity '1' 1516
> However, the "May 17" score for user entity '1' 1516 is '10' and the "May 17" score for user entity '2' 1516 is '152'
> As a result, the normalized "May 17" score for user entity '2' 1516 is $\log_{10}(152+1)/\log_{10}(152+1)=1.0$
> Likewise, the normalized "May 17" score for user entity '1' 1516 is $\log_{10}(10+1)/\log_{10}(10+1)=0.47$
> Accordingly, the "May 17" score of '1.0' for user entity '2' 1516 is higher, and thus, more risky, than the "May 17" score of '0.47' for user entity '1' 1516

In various embodiments, average perplexity, which is the sum of log probabilities, may be used to combine scores across multiple models in the same window of time. Skilled practitioners of the art will be aware that average perplexity is computationally tractable and strikes a balance between average and max scores. For example, the following equation may be used to convert average perplexity into a probability:

> For 1 to N models, and each model score 'X':
>
> $$1-e\hat{}((\Sigma \ln(1-X))/N)$$
>
> With values of X=1 capped at '0.99'

Accordingly, this approach addresses those situations when natural log is not defined for '0' by creating an artificial upper bound on how much any individual model may contribute to the scenario risk score 1520.

In various embodiments, the maximum score for multiple vulnerability scenarios 1518 may be used to represent an overall risk score for a particular user entity 1512. For example, a user entity 1512 may have event model scores 1506 of '1.9' and '0.47'. In this example, the overall risk score for the user entity 1512 can be calculated as follows:

$$\text{Normalize '1.9' to } [0...1] \text{ range first: } \log_{10}(1.9+1)/\log_{10}(7.2+1) = 0.51$$

$$1 - e\hat{}((\ln(1-0.51) + \ln(1-0.47))/2)$$

$$1 - e\hat{}((-0.71 + -0.64)/2)$$

$$1 - (0.508) = 0.49$$

FIG. 16 is a simplified process flow showing the performance of certain continuous evaluation (CE) operations implemented in accordance with an embodiment of the invention to generate a direct risk score. In various embodiments, the direct risk score 1620 may be implemented to score the risk of certain CE-related user entity behavior, described in greater detail herein, according to a third party risk model, such as the Sociotechnical and Organizational Factors for Insider Threat (SOFIT) model. In various embodiments, a lexicon list 1610 may be implemented to include certain features 1608, as described in greater detail herein, that are typically associated with events 1604 of analytic utility, likewise described in greater detail herein. In various embodiments, information associated with certain CE-related events 1604 may be collected, as likewise described in greater detail herein.

In various embodiments, the collected CE-related event 1604 information may include certain information associated with a particular user entity 1612 associated with the CE-related event 1604. In various embodiments, certain CE-related event 1604 information, and certain user entity 1612 information, may be processed with certain features 1608 to determine whether a direct analytic hit 1602 has been detected. In various embodiments, information associated with the direct analytic hit 1602 may then be processed with certain user entity 1612 information to generate a direct risk score 1620.

FIG. 17 is a table showing the use of average perplexity to generate a scenario risk score implemented in accordance with an embodiment of the invention to assess certain risks associated with the behavior of a particular user entity. In various embodiments, the behavior of one or more user entities 1702 during one or more time intervals 1704. In certain of these embodiments, information associated with the observed user entity 1702 behavior may be processed, as described in greater detail herein, according to one or more event models, such as event models '1' 1706, '2' 1708, and '3' 1710, to generate a corresponding event model score, likewise described in greater detail herein. In various embodiments, average perplexity 1712 may then be applied to the resulting event model scores, as described in greater detail herein, to generate a scenario risk score.

For example, as shown in FIG. 17, the behavior of user entities 1702 '1' and '2' are observed during the time intervals 1704 of "May 16" and "May 17." Information associated with the observed user entity 1702 behavior within those time intervals 1704 is then processed according to event models '1' 1706, '2' 1708, and '3' 1710, to generate corresponding event model scores. In this example, event model '1' 1706 is "weekend use of profanity involving spreadsheets," event model '2' 1708 is "number of print jobs," and event model '3' 1710 is "background investigation findings."

To continue the example, user entity '1' 1702, during the time interval 1704 of May 16, has event model scores of '1.0', '0.34', and '0.45' respectively for event models '1' 1706, '2' 1708, and '3' 1710. Accordingly, average perplexity 1712 in the form of:

$$1-e^{((\Sigma \ln(1-X))/N)}$$

is then used to combine the event model scores corresponding to event models '1' 1706, '2' 1708, and '3' 1710 for the time interval 1704 of "May 16" as follows:

$$(\ln(1-0.99)+\ln(1-0.34)+\ln(1-0.45))/3=-1.87$$

The result of the average perplexity calculation is then used to generate an associated scenario risk score 1714 as follows:

$$(1-e^{-1.87})*100=85$$

FIG. 18 is a table showing the decay of example scenario risk scores implemented in accordance with an embodiment of the invention over an interval of time. In various embodiments, scenario risk scores 1804 associated with a particular user entity 1802 may be implemented to decay over a certain interval of time 1808 according to the occurrence 1806 of associated events. In various embodiments, the decay of scenario risk scores 1804 may be implemented to fill in gaps in the occurrence 1806 of associated events over a certain interval of time 1808. In certain of these embodiments, an interval value may be used to fill in such gaps. In these embodiments, the interval value used is a matter of design choice.

In various embodiments, the scenario risk score 1804 may be implemented to never decay below a certain minimum value. In these embodiments, the minimum value selected is a matter of design choice. In various embodiments, a coefficient may be used to multiply the decay of the scenario risk score 1804 over a certain interval of time 1808. In these embodiments, the coefficient value used is a matter of design choice.

Figure 19A:
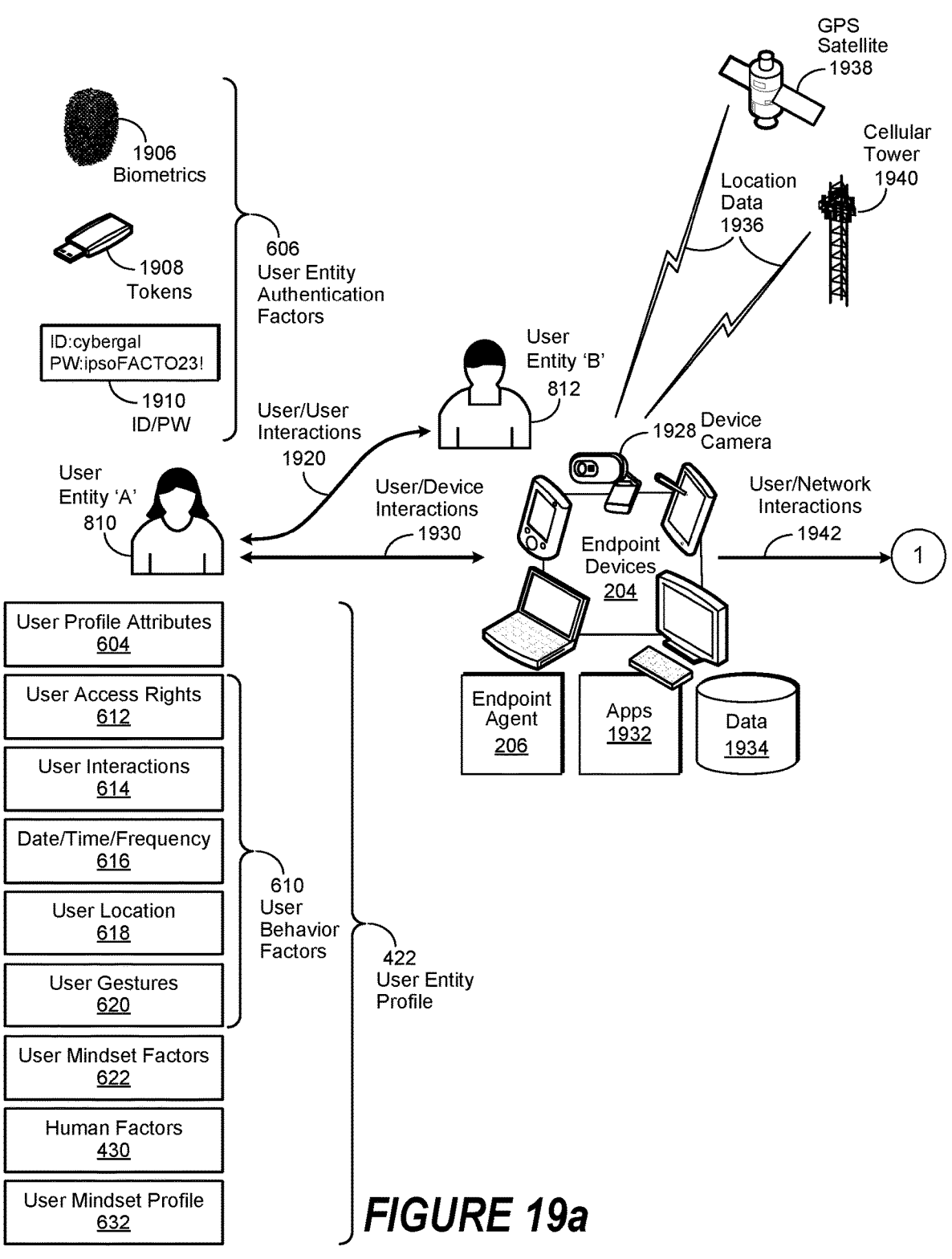
FIGS. 19a and 19b are a simplified block diagram of a security analytics environment.
Figure 19B:
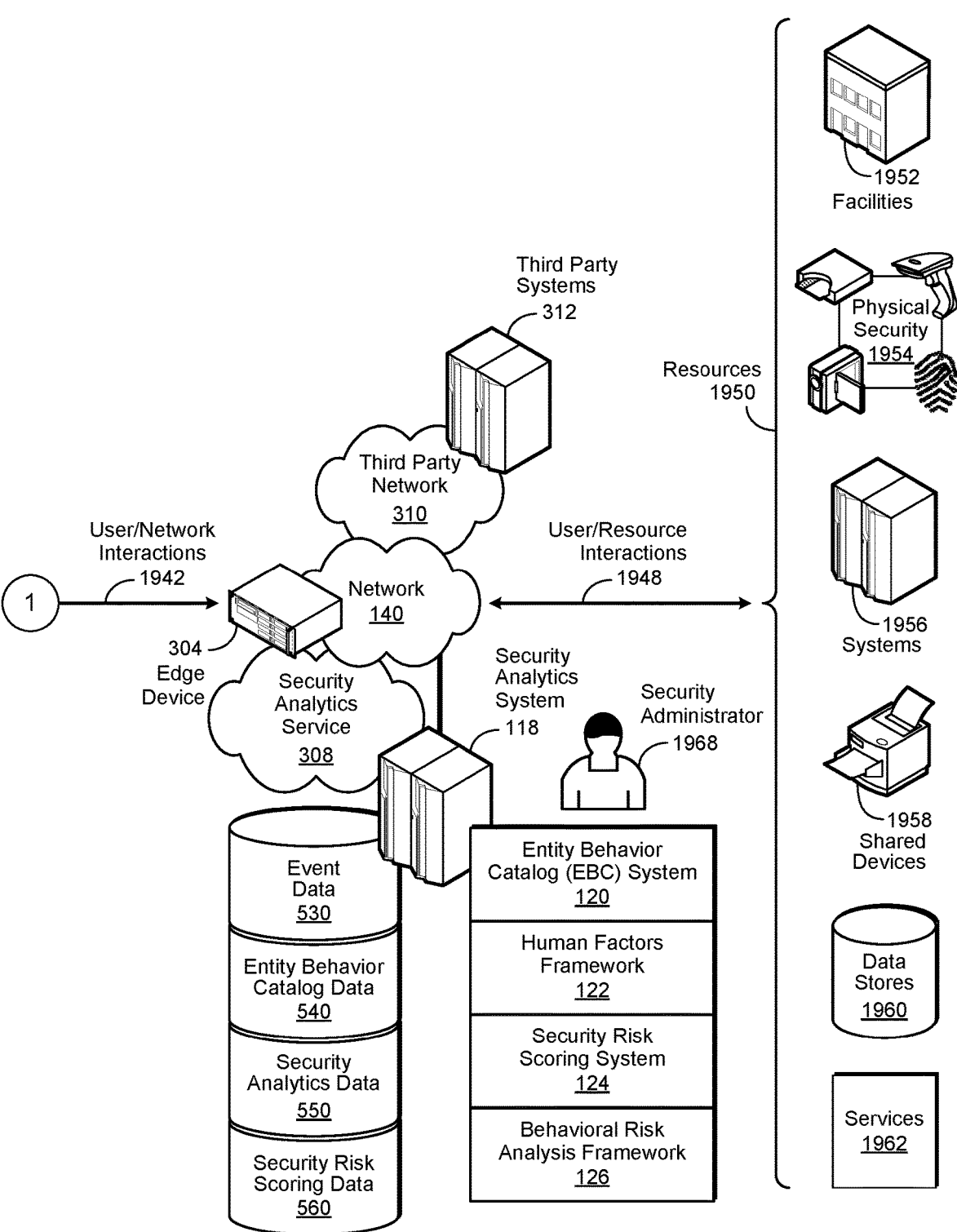

FIGS. 19a and 19b show a block diagram of a security analytics environment implemented in accordance with an embodiment of the invention. In certain embodiments, a security analytics system 118 may be implemented with an entity behavior catalog (EBC) system 120, a human factors framework 122, a security risk scoring system 124, and a behavioral risk analysis framework 126, or a combination thereof. In certain embodiments, analyses performed by the security analytics system 118 may be used to identify behavior associated with a particular entity that may be of analytic utility.

In certain embodiments, as likewise described in greater detail herein, the EBC system 120, the human factors framework 122, the security risk scoring system 124, and the behavioral risk analysis framework 126, or a combination thereof, may be used in combination with the security analytics system 118 to perform such analyses. In various embodiments, certain data stored in repositories of event 530, EBC catalog 540, security analytics 550, and security risk scoring 560 data, or a combination thereof, may be used by the security analytics system 118 to perform the analyses. As likewise described in greater detail herein, the security analytics system 118, the EBC system 120, the human factors framework 122, the security risk scoring system 124, and the behavioral risk analysis framework 126, or a combination thereof, may be used in combination with one another in certain embodiments to perform a behavioral risk analysis operation, described in greater detail herein. Likewise, certain data stored in the repositories of event 530, EBC catalog 540, security analytics 550, and security risk scoring 560 data, or a combination thereof, may be used in various embodiments to perform the behavioral risk analysis operation.

In certain embodiments, a user entity may be an individual user, such as user entity 'A' 810 or 'B' 812, a group, an organization, or a government. In certain embodiments, a non-user entity may likewise be an item, or a device, such as endpoint 204 and edge 304 devices, or a network, such as a network 140 or a third party network 306 network. In certain embodiments, a non-user entity may be a resource 1950, such as a geographical location or formation, a physical facility 1952, such as a venue, various physical security devices 1954, a system 1956, shared devices 1958, such as printer, scanner, or copier, a data store 1960, or a service 1962, such as a service operating in a cloud environment. In various embodiments, the information entity may be certain data 1934 stored on an endpoint device 204, such as a data element, a data file, or a data store known to those of skill in the art.

In various embodiments, certain user entity authentication factors 606 may be used to authenticate the identity of a user entity. In certain embodiments, the user entity authentication factors 606 may be used to ensure that a particular user entity, such as user entity 'A' 810 or 'B' 812, is associated with their corresponding user entity profile 422, rather than a user entity profile 422 associated with another user. In certain embodiments, the user entity authentication factors 606 may include a user's biometrics 1906 (e.g., a fingerprint or retinal scan), tokens 1908 (e.g., a dongle containing cryptographic keys), user identifiers and passwords (ID/PW) 1910, and personal identification numbers (PINs).

In certain embodiments, information associated with such user entity behavior may be stored in a user entity profile 422, described in greater detail herein. In certain embodiments, the user entity profile 422 may be stored in a repository of entity behavior catalog (EBC) data 540. In various embodiments, as likewise described in greater detail herein, the user entity profile 422 may include user entity profile attributes 604, user entity behavior factors 610, user entity mindset factors 622, certain human factors 430, and a user entity mindset profile 632, or a combination thereof. As used herein, a user entity profile attribute 604 broadly refers to data or metadata that can be used, individually or in combination with other user entity profile attributes 604, user entity behavior factors 610, or user entity mindset factors 622, to ascertain the identity of a user entity. In various embodiments, certain user entity profile attributes 604 may be uniquely associated with a particular user entity.

As likewise used herein, a user entity behavior factor 610 broadly refers to information associated with a user's behavior, whether the behavior occurs within a physical realm or cyberspace. In certain embodiments, the user entity behavior factors 610 may include the user entity's access rights 612, the user entity's interactions 614, and the date/time/frequency 616 of those interactions 614. In certain embodiments, the user entity behavior factors 610 may likewise include the user entity's location 618 when the interactions 614 are enacted, and the user entity gestures 620 used to enact the interactions 614.

In various embodiments, certain date/time/frequency 616 user entity behavior factors 610 may be implemented as ontological or societal time, or a combination thereof. As used herein, ontological time broadly refers to how one instant in time relates to another in a chronological sense. As an example, a first user entity behavior enacted at 12:00 noon on May 17, 2017 may occur prior to a second user behavior enacted at 6:39 PM on May 18, 2018. Skilled practitioners of the art will recognize one value of ontological time is to determine the order in which various entity behaviors have been enacted.

As likewise used herein, societal time broadly refers to the correlation of certain user entity profile attributes 604, user entity behavior factors 610, user entity mindset factors 622, or a combination thereof, to one or more instants in time. As an example, user entity 'A' 810 may access a particular system 1956 to download a customer list at 3:47 PM on Nov. 3, 2017. Analysis of their entity behavior profile indicates that it is not unusual for user entity 'A' 810 to download the customer list on a weekly basis. However, examination of their user behavior profile also indicates that user entity 'A' 810 forwarded the downloaded customer list in an email message to user entity 'B' 812 at 3:49 PM that same day. Furthermore, there is no record in their associated entity behavior profile that user entity 'A' 810 has ever communicated with user entity 'B' 812 in the past. Moreover, it may be determined that user entity 'B' 812 is employed by a competitor. Accordingly, the correlation of user entity 'A' 810 downloading the customer list at one point in time, and then forwarding the customer list to user entity 'B' 812 at a second point in time shortly thereafter, is an example of societal time.

In a variation of the prior example, user entity 'A' 810 may download the customer list at 3:47 PM on Nov. 3, 2017. However, instead of immediately forwarding the customer list to user entity 'B' 812, user entity 'A' 810 leaves for a two week vacation. Upon their return, they forward the previously-downloaded customer list to user entity 'B' 812 at 9:14 AM on Nov. 20, 2017. From an ontological time perspective, it has been two weeks since user entity 'A' 810 accessed the system 1956 to download the customer list. However, from a societal time perspective, they have still forwarded the customer list to user entity 'B' 812, despite two weeks having elapsed since the customer list was originally downloaded.

Accordingly, the correlation of user entity 'A' 810 downloading the customer list at one point in time, and then forwarding the customer list to user entity 'B' 812 at a much later point in time, is another example of societal time. More particularly, it may be inferred that the intent of user entity 'A' 810 did not change during the two weeks they were on vacation. Furthermore, user entity 'A' 810 may have attempted to mask an intended malicious act by letting some period of time elapse between the time they originally downloaded the customer list and when they eventually forwarded it to user entity 'B' 812. From the foregoing, those of skill in the art will recognize that the use of societal time may be advantageous in determining whether a particular entity behavior is of analytic utility. As used herein, user entity mindset factors 622 broadly refer to information used to infer the mental state of a user entity at a particular point in time, during the occurrence of an event, an enactment of a user entity behavior, or combination thereof.

In certain embodiments, the security analytics system 118 may be implemented to process certain entity attribute information, described in greater detail herein, associated with providing resolution of the identity of an entity at a particular point in time. In various embodiments, the security analytics system 118 may be implemented to use certain entity identifier information, likewise described in greater detail herein, to ascertain the identity of an associated entity at a particular point in time. In various embodiments, the entity identifier information may include certain temporal information, described in greater detail herein. In certain embodiments, the temporal information may be associated with an event associated with a particular point in time.

In certain embodiments, the security analytics system 118 may be implemented to use information associated with certain entity behavior elements to resolve the identity of an entity at a particular point in time. An entity behavior element, as used herein, broadly refers to a discrete element of an entity's behavior during the performance of a particular action, or operation, in a physical realm, cyberspace, or a combination thereof. In certain embodiments, such entity behavior elements may be associated with a user/device 1930, a user/network 1942, a user/resource 1948, a user/user 1920 interaction, or a combination thereof. In certain embodiments, a user/device 1930, user/network 1942, and user/resource 1948 interactions are all examples of a user entity-to-non-user entity interaction, described in greater detail herein. In certain embodiments, a user/user 1920 interaction is one example of a user entity-to-user entity interaction, likewise described in greater detail herein.

As an example, user entity 'A' 810 may use an endpoint device 204 to browse a particular web page on a news site on an external system 1976. In this example, the individual actions performed by user entity 'A' 810 to access the web page are entity behavior elements that constitute an entity behavior, described in greater detail herein. As another example, user entity 'A' 810 may use an endpoint device 204 to download a data file from a particular system 1956. In this example, the individual actions performed by user entity 'A' 810 to download the data file, including the use of one or more user entity authentication factors 606 for user authentication, are entity behavior elements that constitute an entity behavior. In certain embodiments, the user/device 1930 interactions may include an interaction between a user, such as user entity 'A' 810 or 'B' 812, and an endpoint device 204.

In certain embodiments, the user/device 1930 interaction may include interaction with an endpoint device 204 that is not connected to a network at the time the interaction occurs. As an example, user entity 'A' 810 or 'B' 812 may interact with an endpoint device 204 that is offline, using applications 1932, accessing data 1934, or a combination thereof, it may contain. Those user/device 1930 interactions, or their result, may be stored on the endpoint device 204 and then be accessed or retrieved at a later time once the endpoint device 204 is connected to the network 140 or third party network 310. In certain embodiments, an endpoint agent 206 may be implemented to store the user/device 1930 interactions when the user device 204 is offline.

In certain embodiments, an endpoint device 204 may be implemented with a device camera 1928. In certain embodiments, the device camera 1928 may be integrated into the endpoint device 204. In certain embodiments, the device camera 1928 may be implemented as a separate device configured to interoperate with the endpoint device 204. As an example, a webcam familiar to those of skill in the art may be implemented receive and communicate various image and audio signals to an endpoint device 204 via a Universal Serial Bus (USB) interface.

In certain embodiments, the device camera 1928 may be implemented to capture and provide user/device 1930 interaction information to an endpoint agent 206. In various embodiments, the device camera 1928 may be implemented to provide surveillance information related to certain user/device 1930 or user/user 1920 interactions. In certain embodiments, the surveillance information may be used by the security analytics system 118 to detect entity behavior associated with a user entity, such as user entity 'A' 810 or 'B' 812, that may be of analytic utility.

In certain embodiments, the endpoint device 204 may be used to communicate data through the use of a network 140, or a third party network 310, or a combination of the two. In certain embodiments, the network 140 and the third party network 310 may respectively include a public network, such as the Internet, a physical private network, a virtual private network (VPN), or any combination thereof. In certain embodiments, the network 140 and third party network 310 may likewise include a wireless network, including a personal area network (PAN), based upon technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G, and 5G technologies.

In certain embodiments, the user/user 1920 interactions may include interactions between two or more user entities, such as user entity 'A' 810 and 'B' 812. In certain embodiments, the user/user interactions 1920 may be physical, such as a face-to-face meeting, via a user/device 1930 interaction, a user/network 1942 interaction, a user/resource 1948 interaction, or some combination thereof. In certain embodiments, the user/user 1920 interaction may include a face-to-face verbal exchange. In certain embodiments, the user/user 1920 interaction may include a written exchange, such as text written on a sheet of paper. In certain embodiments, the user/user 1920 interaction may include a face-to-face exchange of gestures, such as a sign language exchange.

In certain embodiments, temporal event information associated with various user/device 1930, user/network 1942, user/resource 1948, or user/user 1920 interactions may be collected and used to provide real-time resolution of the identity of an entity at a particular point in time. Those of skill in the art will recognize that many such examples of user/device 1930, user/network 1942, user/resource 1948, and user/user 1920 interactions are possible. Accordingly, the foregoing is not intended to limit the spirit, scope or intent of the invention.

In various embodiments, the security analytics system 118 may be implemented to process certain contextual information in the performance of a particular security analytic operation. As used herein, contextual information broadly refers to any information, directly or indirectly, individually or in combination, related to a particular entity behavior. In certain embodiments, entity behavior may include a user entity's physical behavior, cyber behavior, or a combination thereof. As likewise used herein, a user entity's physical behavior broadly refers to any user behavior occurring within a physical realm, such as speaking, gesturing, facial patterns or expressions, walking, and so forth. More particularly, such physical behavior may include any action enacted by an entity user that can be objectively observed, or indirectly inferred, within a physical realm. In certain embodiments, the objective observation, or indirect inference, of the physical behavior may be performed electronically.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user entity that can be observed through the use of an electronic device (e.g., an electronic sensor), a computing device or system (e.g., an endpoint 204 or edge 304 device, a physical security device 1954, a system 1956, a shared device 1958, etc.), computer instructions (e.g., a software application), or a combination thereof.

In certain embodiments, the contextual information may include location data 1936. In certain embodiments, the endpoint device 204 may be configured to receive such location data 1936, which is used as a data source for determining the user entity's location 618. In certain embodiments, the location data 1936 may include Global Positioning System (GPS) data provided by a GPS satellite 1938. In certain embodiments, the location data 1936 may include location data 1936 provided by a wireless network, such as from a cellular network tower 1940. In certain embodiments (not shown), the location data 1936 may include various Internet Protocol (IP) or other network address information assigned to the endpoint 204 or edge 304 device. In certain embodiments (also not shown), the location data 1936 may include recognizable structures or physical addresses within a digital image or video recording.

In certain embodiments, the endpoint devices 204 may include an input device (not shown), such as a keypad, magnetic card reader, token interface, biometric sensor, and so forth. In certain embodiments, such endpoint devices 204 may be directly, or indirectly, connected to a particular facility 1952, physical security device 1954, system 1956, or shared device 1958. As an example, the endpoint device 204 may be directly connected to an ingress/egress system, such as an electronic lock on a door or an access gate of a parking garage. As another example, the endpoint device 204 may be indirectly connected to a physical security device 1954 through a dedicated security network (not shown).

In certain embodiments, the security analytics system 118 may be implemented to perform various risk-adaptive protection operations. Risk-adaptive, as used herein, broadly refers to adaptively responding to risks associated with an electronically-observable entity behavior. In various embodiments, the security analytics system 118 may be implemented to perform certain risk-adaptive protection operations by monitoring individual entity behaviors, assess the corresponding risk they may represent, individually or in combination, and respond with an associated response. In certain embodiments, such responses may be based upon contextual information, described in greater detail herein, associated with a particular entity behavior.

In various embodiments, certain information associated with a user entity profile 420, likewise described in greater detail herein, may be used to perform the risk-adaptive protection operations. In certain embodiments, the user entity profile 422 may include user entity profile attributes 604, user entity behavior factors 610, user entity mindset factors 622, or a combination thereof. In these embodiments, the information associated with a user entity profile 422 used to perform the risk-adaptive protection operations is a matter of design choice.

In certain embodiments, the security analytics system 118 may be implemented as a stand-alone system. In certain embodiments, the security analytics system 118 may be implemented as a distributed system. In certain embodiment, the security analytics system 118 may be implemented as a virtual system, such as an instantiation of one or more virtual machines (VMs). In certain embodiments, the security analytics system 118 may be implemented as a security analytics service 308. In certain embodiments, the security analytics service 308 may be implemented in a cloud environment familiar to those of skill in the art. In various embodiments, the security analytics system 118 may use data stored in a repository of event 530, entity behavior catalog 540, security analytics 550, or security risk 560 data, or a combination thereof, in the performance of certain security analytics operations, described in greater detail herein. Those of skill in the art will recognize that many such embodiments are possible. Accordingly, the foregoing is not intended to limit the spirit, scope or intent of the invention.

Figure 20:
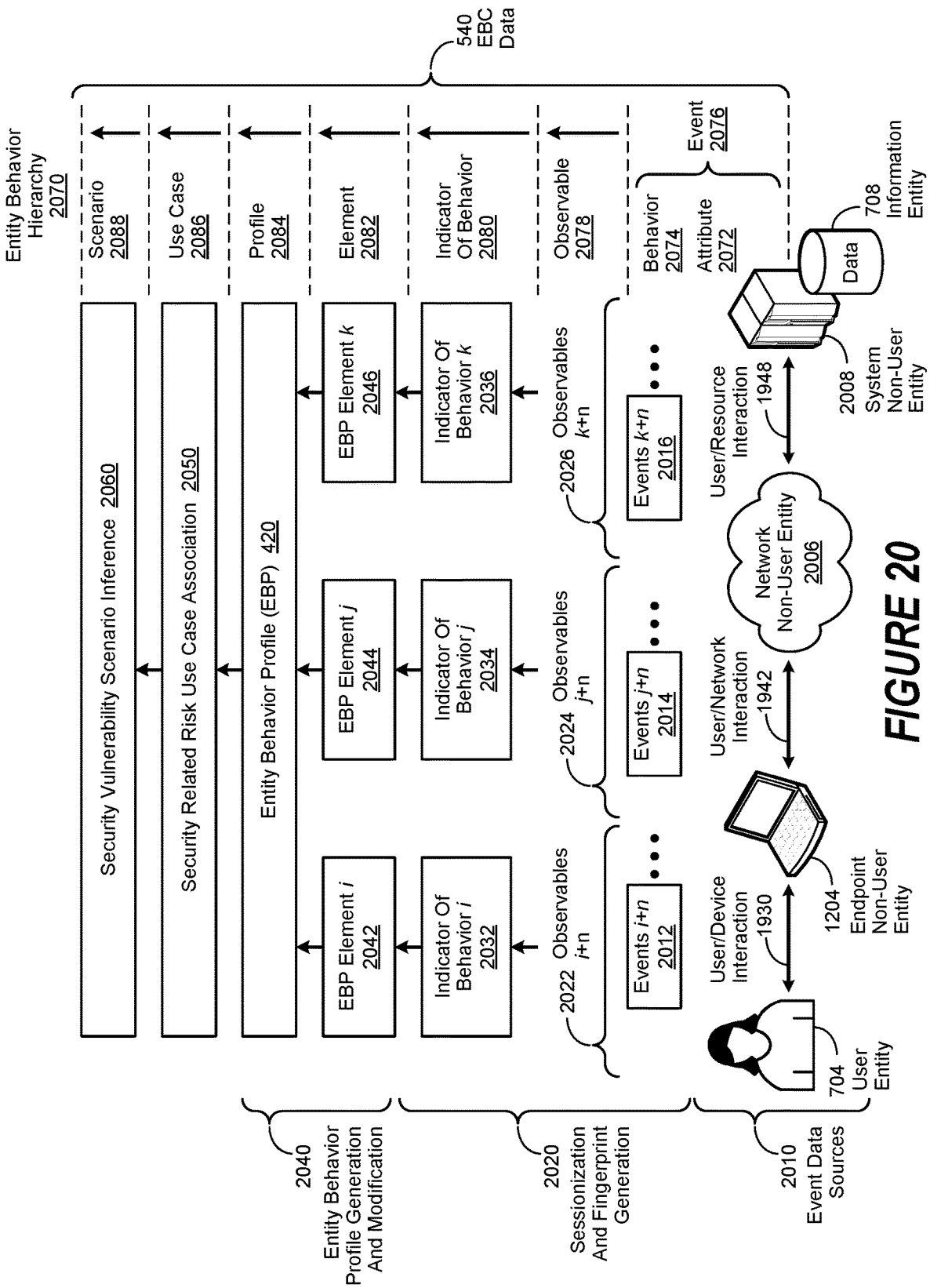
FIG. 20 is a simplified block diagram showing the mapping of an event to a security vulnerability scenario.

FIG. 20 is a simplified block diagram showing the mapping of an event to a security vulnerability scenario implemented in accordance with an embodiment of the invention. In certain embodiments, an entity behavior catalog (EBC) system may be implemented to identify an indicator of behavior (IOB), described in greater detail herein. In certain embodiments, the IOB may be based upon one or more observables, likewise described in greater detail herein. In certain embodiments, the observable may include event information corresponding to electronically-observable behavior enacted by an entity. In certain embodiments, the event information corresponding to electronically-observable behavior enacted by an entity may be received from an electronic data source, such as the event data sources 2010 shown in FIG. 20.

In certain embodiments, as likewise described in greater detail herein, the EBC system may be implemented to identify a particular event of analytic utility by analyzing an associated IOB. In certain embodiments, the EBC system may be implemented to generate entity behavior catalog data based upon an identified event of analytic utility associated with a particular IOB. In various embodiments, the EBC system may be implemented to associate certain entity behavior data it may generate with a predetermined abstraction level, described in greater detail herein.

In various embodiments, the EBC system 120 may be implemented to use certain EBC data and an associated abstraction level to generate a hierarchical set of entity behaviors 2070, described in greater detail herein. In certain embodiments, the hierarchical set of entity behaviors 2070 generated by the EBC system may represent an associated security risk, likewise described in greater detail herein. Likewise, as described in greater detail herein, the EBC system may be implemented in certain embodiments to store the hierarchical set of entity behaviors 2070 and associated abstraction level information within a repository of EBC data. In certain embodiments, the repository of EBC data 540 can be implemented to provide an inventory of entity behaviors for use when performing a security operation, likewise described in greater detail herein.

Referring now to FIG. 20, the EBC system may be implemented in various embodiments to receive certain event information, described in greater detail herein, corresponding to an event associated with an entity interaction, likewise described in greater detail herein. As used herein, event information broadly refers to any information directly or indirectly related to an event, described in greater detail herein.

In certain embodiments, information associated with an entity attribute, likewise described in greater detail herein, and an entity behavior may be respectively abstracted to an entity attribute 2072 and an entity behavior 2074 abstraction level. In certain embodiments, an entity attribute 2072 and an entity behavior 2074 abstraction level may then be associated with an event 2076 abstraction level. In certain embodiments, the entity attribute 2072, entity behavior 2074, and event 2076 abstraction levels may in turn be associated with a corresponding entity behavior hierarchy 2070, as described in greater detail herein.

In various embodiments, the event information may be received from certain event data sources 2010, such as a user entity 704, an endpoint 2004 non-user entity, a network 2006 non-user entity, a system 2008 non-user entity, or an information entity 708. In certain embodiments, one or more events may be associated with a particular entity interaction. As an example, as shown in FIG. 20, one or more events i+n 2012 may be associated with a user/device 1930 interaction between a user 704 entity and an endpoint 2004 non-user entity. Likewise, one or more events j+n 2014 may be associated with a user/network 2042 interaction between a user entity 704 and a network 2006 non-user entity. As likewise shown in FIG. 20, one or more events k+n 2016 may be associated with a user/resource 1948 interaction between a user entity 704 and a system 2008 non-user entity, or a data entity 708, or a combination of the two.

In certain embodiments, details of an event, such as events i+n 2012, j+n 2014, and k+n 2016, may be included in their associated event information. In various embodiments, as described in greater detail herein, analytic utility detection operations may be performed on such event information to identify events of analytic utility. In various embodiments, certain event information associated with an event determined to be of analytic utility may be used to derive a corresponding observable.

As an example, the details contained in the event information respectively corresponding to events i+n 2012, j+n 2014, and k+n 2016 may be used to derive observables i+n 2022, j+n 2024, and k+n 2026. In certain embodiments, the resulting observables i+n 2022, j+n 2024, and k+n 2026 may then be respectively associated with a corresponding observable 2078 abstraction level. In certain embodiments, the observable 2078 abstraction level may in turn be associated with a corresponding entity behavior hierarchy 2070, as described in greater detail herein.

In certain embodiments, the resulting observables may in turn be processed to generate an associated IOB. For example, observables i+n 2022, j+n 2024, and k+n 2026 may in turn be processed to generate corresponding IOBs i 2032, j 2034, and k 2036. In certain embodiments, the resulting IOBs, i 2032, j 2034, and k 2036 may then be respectively associated with a corresponding IOB 2080 abstraction level. In certain embodiments, the IOB 2080 abstraction level may in turn be associated with a corresponding entity behavior hierarchy 2070, as described in greater detail herein.

In various embodiments, sessionization and fingerprint generation operations 2020, described in greater detail herein, may be performed to associate certain events, observables, and security related activities, or a combination thereof, with a corresponding session, likewise described in greater detail herein. As an example, events i+n 2012, j+n 2014, k+n 2016, observables i+n 2022, j+n 2024, k+n 2026, and IOBs 2032, j 2034, k 2036 may be associated with corresponding sessions. In certain embodiments, an IOB may be processed with associated contextual information, described in greater detail herein, to generate a corresponding EBP element.

For example, IOBs i 2032, j 2034, and k 2036 may be processed with associated contextual information to generate corresponding EBP elements i 2042, j 2044, and k 2046. In various embodiments, the resulting EBP elements i 2042, j 2044, and k 2046 may then be associated with a corresponding EBP element 2082 abstraction level. In certain embodiments, the EBP element 2082 abstraction level may in turn be associated with a corresponding entity behavior hierarchy 2070, as described in greater detail herein.

In certain embodiments, EBP generation and management 2040 operations may be performed to associate one or more EBP elements with a particular EBP 420. As an example, EBP elements i 2042, j 2044, and k 2046 may be associated with a particular EBP 420, which may likewise be respectively associated with the various entities involved in the user/device 1930, user/network 1942, or user/resource 1948 interactions. In these embodiments, the method by which the resulting EBP elements i 2042, j 2044, and k 2046 are associated with a particular EBP 420 is a matter of design choice. In certain embodiments, the EBP 420 may likewise be associated with an EBP 2084 abstraction level. In certain embodiments, the EBP 2084 abstraction level may in turn be associated with a corresponding entity behavior hierarchy 2070, as described in greater detail herein.

In various embodiments, the resulting EBP 420 may be used in the performance of security risk use case association 2050 operations to identify one or more security risk use cases that match certain entity behavior information stored in the EBP 420. In certain of these embodiments, the entity behavior information may be stored within the EBP 420 in the form of an EBP element. In certain embodiments, identified security risk use cases may then be associated with a security risk use case 2086 abstraction level. In certain embodiments, the security risk use case 2086 abstraction level may in turn be associated with a corresponding entity behavior hierarchy 2070, as described in greater detail herein.

In certain embodiments, the results of the security risk use case association 2050 operations may in turn be used to perform security vulnerability scenario inference 2060 operations to associate one or more security risk use cases with one or more security vulnerability scenarios, described in greater detail herein. In certain embodiments, the associated security vulnerability scenarios may then be associated with a security vulnerability scenario 2088 abstraction level. In certain embodiments, the security vulnerability scenario 2088 abstraction level may in turn be associated with a corresponding entity behavior hierarchy 2070, as described in greater detail herein.

In various embodiments, certain event information associated with events i+n 2012, j+n 2014, and k+n 2016 and certain observable information associated with observables i+n 2022, j+n 2024, and k+n 2026 may be stored in a repository of EBC data. In various embodiments, certain IOB information associated with security related activities i 2032, j 2034, and k 2036 and EBP elements i 2042, j 2044, and k 2046 may likewise be stored in the repository of EBC data. Likewise, in various embodiments, certain security risk use case association and security vulnerability scenario association information respectively associated with the performance of security risk use case association 2050 and security vulnerability scenario inference 2060 operations may be stored in the repository of EBC data.

Figure 21:
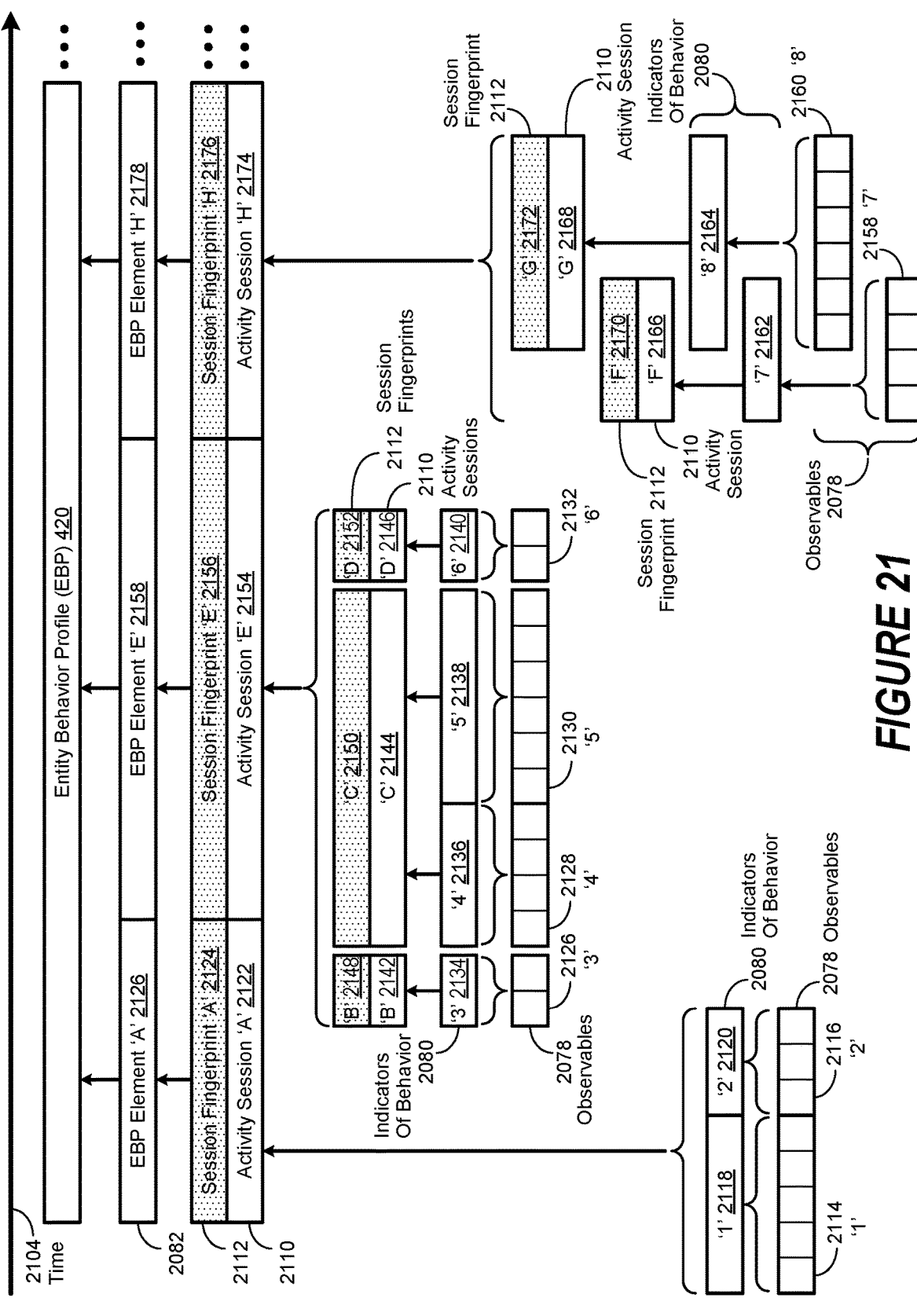
FIG. 21 is a simplified block diagram of the generation of a session and a corresponding session-based.

FIG. 21 is a simplified block diagram of the generation of a session and a corresponding session-based fingerprint implemented in accordance with an embodiment of the invention. In certain embodiments, an observable 2078 may be derived from an associated event, as described in greater detail herein. In certain embodiments, one or more observables 2078 may be processed to generate a corresponding indicator of behavior (IOB) 2080, as likewise described in greater detail herein.

In certain embodiments, one or more IOBs 2080 may then be respectively processed to generate a corresponding activity session 2110. In turn, the session 2110 may be processed in certain embodiments to generate a corresponding session fingerprint 2112. In certain embodiments, the resulting activity session 2110 and its corresponding session fingerprint 2112, individually or in combination, may then be associated with a particular entity behavior profile (EBP) element 2082. In certain embodiments the EBP element 2082 may in turn be associated with an EBP 420.

In certain embodiments, intervals in time 2104 respectively associated with various IOBs 2080 may be contiguous. For example, as shown in FIG. 21, the intervals in time 1204 associated with observables 2078 '1' 2114 and '2' 2116 may be contiguous. Accordingly, the intervals in time 2104 associated with IOBs 2080 '1' 2118 and '2' 2120 respectively generated from observables 2078 '1' 2114 and '2' 2116 would likewise be contiguous.

As likewise shown in FIG. 21, the resulting IOBs 2080 '1' 2118 and '2' 2120 may be processed to generate an associated activity session 'A' 2122, which then may be processed to generate a corresponding session fingerprint 'A' 2124. In certain embodiments, activity session 'A' 2122 and its corresponding session fingerprint 'A' 2124 may be used to generate a new entity behavior profile (EBP) element 2082 'A' 2126. In certain embodiments, EBP element 2082 'A' 2126 generated from activity session 2110 'A' 2122 and its corresponding session fingerprint 2112 'A' 2125 may be associated with an existing EBP 420.

To provide an example, a user may enact various observables 2078 '1' 2114 to update sales forecast files, followed by the enactment of various observables 2078 '2' 2116 to attach the updated sales forecast files to an email, which is then sent to various co-workers. In this example, the enactment of observables 2078 '1' 2114 and '2' 2116 result in the generation of IOBs 2080 '1' 2118 and '2' 2120, which in turn are used to generate activity session 2110 'A' 2122. In turn, the resulting activity session 2110 'A' 2122 is then used to generate its corresponding session-based fingerprint 2112 'A' 2124. To continue the example, activity session 2110 'A' 2122 is associated with security related activities 2080 '1' 2118 and '2' 2120, whose associated intervals in time 2104 are contiguous, as they are oriented to the updating and distribution of sales forecast files via email.

Various aspects of the invention reflect an appreciation that a user may enact certain entity behaviors on a recurring basis. To continue the preceding example, a user may typically update sales forecast files and distribute them to various co-workers every morning between 8:00 AM and 10:00 AM. Accordingly, the activity session 2110 associated with such a recurring activity may result in a substantively similar session fingerprint 2112 week-by-week. However, a session fingerprint 2112 for the same session 2110 may be substantively different should the user happen to send an email with an attached sales forecast file to a recipient outside of their organization. Consequently, a session fingerprint 2112 that is inconsistent with session fingerprints 2112 associated with past activity sessions 2110 may indicate anomalous, abnormal, unexpected or suspicious behavior.

In certain embodiments, two or more activity sessions 2110 may be noncontiguous, but associated. In certain embodiments, an activity session 2110 may be associated with two or more sessions 2110. In certain embodiments, an activity session 2110 may be a subset of another activity session 2110. As an example, as shown in FIG. 21, the intervals in time 2104 respectively associated with observables 2078 '3' 2114 and '6' 2132 may be contiguous. Likewise, the intervals in time 2104 associated with observables 2078 '4' 2136 and '5' 2138 may be contiguous.

Accordingly, the intervals in time 904 associated with the IOBs 2080 '4' 2136 and '5' 2138 respectively generated from observables 2078 '4' 2128 and '5' 2130 would likewise be contiguous. However, the intervals in time 2104 associated with IOBs 2080 '4' 2136 and '5' 2138 would not be contiguous with the intervals in time respectively associated with IOBs 2080 '3' 2134 and '6' 2140.

As likewise shown in FIG. 21, the resulting IOBs 2080 '3' 2134 and '6' 2140 may be respectively processed to generate corresponding sessions 'B' 2142 and 'D' 2146, while IOBs 2080 '4' 2136 and '5' 2138 may be processed to generate activity session 2110 'C' 2144. In turn, activity sessions 2110 'B' 2142, 'C' 2144, and 'D' 2146 are then respectively processed to generate corresponding session-based fingerprints 2112 'B' 2148, 'C' 2150 and D' 2152.

Accordingly, the intervals of time 2104 respectively associated with activity sessions 2110 'B' 2142, 'C' 2144, and 'D' 2146, and their corresponding session fingerprints 2112 'B' 2148, 'C' 2150 and 'D' 2152, are not contiguous. Furthermore, in this example activity sessions 2110 'B' 2142, 'C' 2144, and 'D' 2146, and their corresponding session fingerprints 2112 'B' 2148, 'C' 2150 and 'D' 2152, are not associated with the EBP 420. Instead, as shown in FIG. 21, activity sessions 2110 'B' 2142, 'C' 2144, and 'D' 2146 are processed to generate activity session 2110 'E' 2154 and session fingerprints 2112 'B' 2148, 'C' 2150 and 'D' 2152 are processed to generate session fingerprint 2112 'E' 2156. In certain embodiments, activity session 'E' 2154 and its corresponding session fingerprint 'E' 2156 may be used to generate a new EBP element 2082 'E' 2158. In certain embodiments, EBP element 2082 'E' 2158 generated from activity session 2110 'E' 2154 and its corresponding session fingerprint 2112 'E' 2156 may be associated with an existing EBP 420.

Accordingly, activity session 2110 'E' 2154 is associated with activity sessions 2110 'B' 2142, 'C' 2144, and 'D' 2146. Likewise, activity sessions 2110 'B' 2142, 'C' 2144, and 'D' 2146 are subsets of activity session 2110 'E' 2154. Consequently, while the intervals of time respectively associated with activity sessions 2110 'B' 2142, 'C' 2144, and 'D' 2146, and their corresponding session fingerprints 2112 'B' 2148, 'C' 2150 and 'D' 2152 may not be contiguous, they are associated as they are respectively used to generate activity session 2110 'E' 2154 and its corresponding session fingerprint 2112 'E' 2156.

To provide an example, a user plans to attend a meeting scheduled for 10:00 AM at a secure facility owned by their organization to review a project plan with associates. However, the user wishes to arrive early to prepare for the meeting. Accordingly, they arrive at 9:00 AM and use their security badge to authenticate themselves and enter the facility. In this example, the enactment of observables 2078 '3' 2126 may correspond to authenticating themselves with their security badge and gaining access to the facility. As before, observables 2078 '3' 2126 may be used to generate a corresponding IOB 2080 '3' 2134. In turn, the IOB 2080 '3' 2134 may then be used to generate session 2110 'B' 2142, which is likewise used in turn to generate a corresponding session fingerprint 2112 'B' 2148.

The user then proceeds to a conference room reserved for the meeting scheduled for 10:00 AM and uses their time alone to prepare for the upcoming meeting. Then, at 10:00 AM, the scheduled meeting begins, followed by the user downloading the current version of the project plan, which is then discussed by the user and their associate for a half hour. At the end of the discussion, the user remains in the conference room and spends the next half hour making revisions to the project plan, after which it is uploaded to a datastore for access by others.

In this example, observables 2078 '4' 2128 may be associated with the user downloading and reviewing the project plan and observables 2078 '5' 2130 may be associated with the user making revisions to the project plan and then uploading the revised project plan to a datastore. Accordingly, observables 2078 '4' 2128 and '5' 2130 may be respectively used to generate IOBs 2080 '4' 2136 and '5' 2138. In turn, IOBs 2080 '4' 2136 and '5' 2138 may then be used to generate activity session 2110 'C' 2144, which may likewise be used in turn to generate its corresponding session fingerprint 2112 'C' 2150.

To continue the example, the user may spend the next half hour discussing the revisions to the project plan with a co-worker. Thereafter, the user uses their security badge to exit the facility. In continuance of this example, observable 2078 '6' 2132 may be associated with the user using their security badge to leave the secure facility. Accordingly, observable 2078 '6' 2132 may be used to generate a corresponding IOB 2080 '6' 2140, which in turn may be used to generate a corresponding activity session 2110 'D' 2146, which likewise may be used in turn to generate a corresponding session fingerprint 2112 'D' 2152.

In this example, the intervals of time 2104 respectively associated with activity sessions 2110 'B' 2142, 'C' 2144, and 'D' 2146, and their corresponding session fingerprints 2112 'B' 2148, 'C' 2150, and 'D' 2152, are not contiguous. However they may be considered to be associated as their corresponding observables 2078 '3' 2126, '4' 2128, '5' 2130, and '6' 2132 all have the common attribute of having been enacted within the secure facility. Furthermore, security related activities 2080 '4' 2126 and '5' 2138 may be considered to be associated as their corresponding observables 2078 have the common attribute of being associated with the project plan.

Accordingly, while the intervals of time 2104 respectively associated with activity sessions 2110 'B' 2142, 'C' 2144, and 'D' 2146, and their corresponding session fingerprints 2112 'B' 2148, 'C' 2150, and 'D' 2152, may not be contiguous, they may be considered to be associated. Consequently, activity sessions 2110 'B' 2142, 'C' 2144, and 'D' 2146 may be considered to be a subset of activity session 2110 'E' 2154 and session fingerprints 2112 'B' 2148, 'C' 2150, and 'D' 2152 may be considered to be a subset of session fingerprint 2112 'E' 2156.

In certain embodiments, the interval of time 2104 corresponding to a first activity session 2110 may overlap an interval of time 2104 corresponding to a second activity session 2110. For example, observables 2078 '7' 2158 and '8' 2160 may be respectively processed to generate IOBs 2080 '7' 2162 and '8' 2164. In turn, the resulting IOBs 2080 '7' 2162 and '8' 2164 are respectively processed to generate corresponding activity sessions 2110 'F' 2166 and 'G' 2168. The resulting activity sessions 2110 'F' 2166 and 'G' 2168 are then respectively processed to generate corresponding session fingerprints 2112 'F' 2170 and 'G' 2172.

However, in this example activity sessions 2110 'F' 2166 and 'G' 2168, and their corresponding session fingerprints 2112 'F' 2170 and 'G' 2172, are not associated with the EBP 420. Instead, as shown in FIG. 21, activity sessions 2110 'F' 2166 and 'G' 2168 are processed to generate activity session 2110 'E' 2154 and session fingerprints 2112 'F' 2170 and 'G' 2172 are processed to generate session fingerprint 2112 'H' 2176. In certain embodiments, activity session 'H' 2174 and its corresponding session fingerprint 'H' 2176 may be used to generate a new EBP element 2082 'H' 2178. In certain embodiments, EBP element 2082 'H' 2178 generated from activity session 2110 'E' 2174 and its corresponding session fingerprint 2112 'E' 2176 may be associated with an existing EBP 420.

Accordingly, the time 2104 interval associated with activity session 2110 'F' 2166 and its corresponding session fingerprint 2112 'F' 2170 overlaps with the time interval 2104 associated with activity session 2110 'G' 2168 and its corresponding session fingerprint 2112 'G' 2172. As a result, activity sessions 2110 'F' 2166 and 'G' 2168 are subsets of activity session 2110 'H' 2174. Consequently, while the intervals of time respectively associated with activity sessions 2110 'F' 2166 and 'G' 2168, and their corresponding session fingerprints 2112 'F' 2170 and 'G' 2172 may overlap, they are associated as they are respectively used to generate activity session 2110 'H' 2174 and its corresponding session fingerprint 2112 'H' 2176.

To provide an example, a user may decide to download various images for placement in an online publication. In this example, observables 2078 '7' 2158 may be associated with the user iteratively searching for, and downloading, the images they wish to use in the online publication. However, the user may not begin placing the images into the online publication until they have selected and downloaded the first few images they wish to use.

To continue the example, observables 2078 '8' 2164 may be associated with the user placing the downloaded images in the online publication. Furthermore, the placement of the downloaded images into the online publication may begin a point in time 2104 subsequent to when the user began to download the images. Moreover, the downloading of the images may end at a point in time 2104 sooner than when the user completes the placement of the images in the online publication.

In continuance of the example, observables 2078 '7' 2158 and '8' 2160 may be respectively processed to generate IOBs 2078 '7' 2162 and '8' 2164, whose associated intervals of time 2104 overlap one another. Accordingly, the intervals in time 2104 associated with activity sessions 2110 'F' 2166 and 'G' 2168 will likewise overlap one another as they are respectively generated from IOBs 2080 '7' 2162 and '8' 2164.

Consequently, while the intervals of time 2104 respectively associated with activity sessions 2110 'F' 2166 and 'G' 2168, and their corresponding session fingerprints 2112 'F' 2170 and 'G' 2172, may overlap, they may be considered to be associated as they both relate to the use of images for the online publication. Accordingly, activity sessions 2110 'F' 2166 and 'G' 2168 may be considered to be a subset of activity session 2110 'H' 2174 and session fingerprints 2112 'F' 2170 and 'G' 2172 may be considered to be a subset of session fingerprint 2112 'H' 2176.

Figure 22:
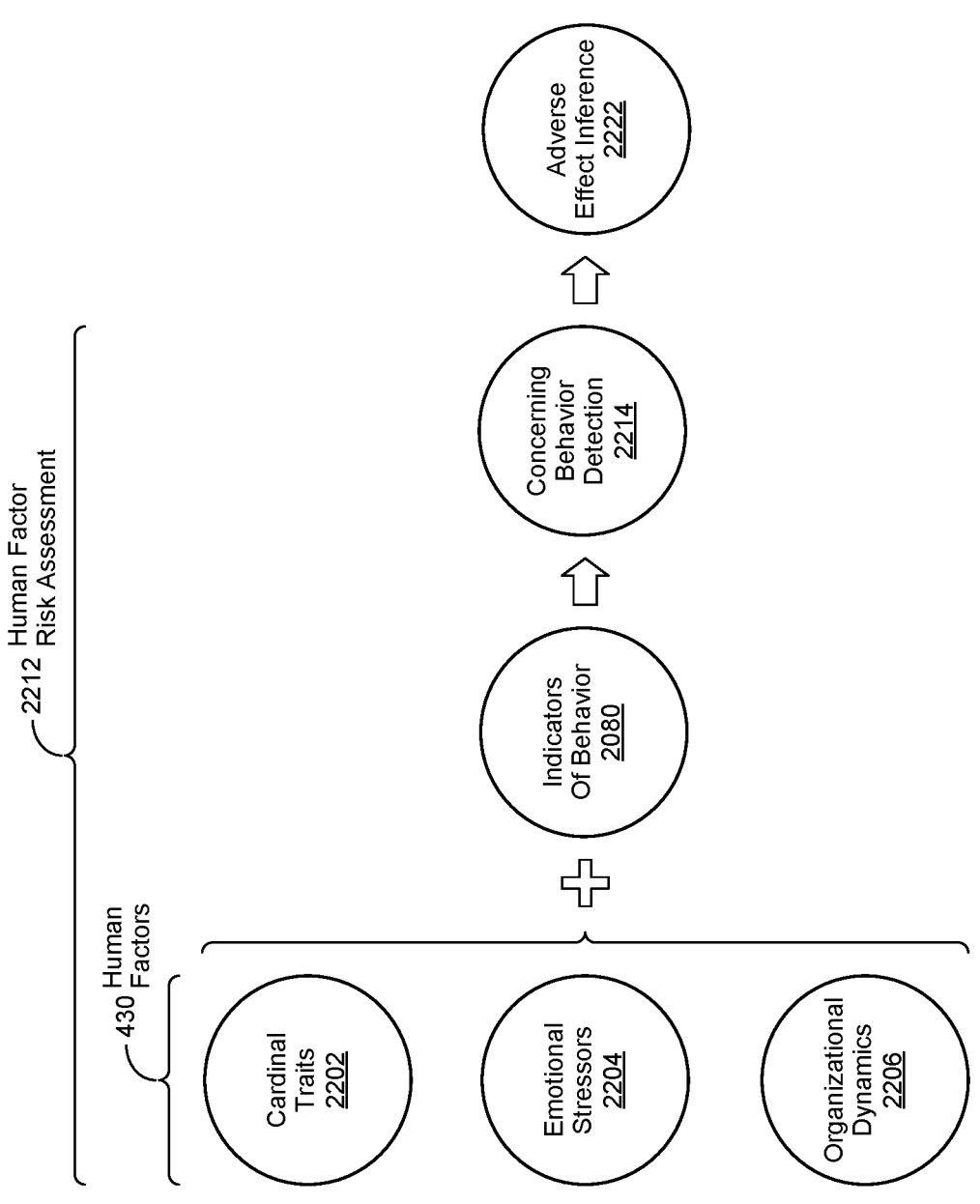
FIG. 22 is a simplified block diagram of the performance of a human factors risk operation.

FIG. 22 is a simplified block diagram of the performance of a human factors risk operation implemented in accordance with an embodiment of the invention. In various embodiments, information associated with certain human factors 430, described in greater detail herein, may be processed with information associated with certain indicators of behavior (IOBs) 2080 to detect a corresponding concerning behavior 2214. As used herein, a concerning behavior 2214 broadly refers to an IOB 2080 whose associated enactment of entity behavior may be considered a potential security risk. In certain embodiments, the entity behavior associated with an IOB 2080 may be enacted by a user entity, a non-user entity, or an information entity, or a combination thereof.

In certain embodiments, the human factors 430 may include cardinal traits 2202, emotional stressors 2204, and organizational dynamics 2206, or a combination thereof, likewise described in greater detail herein. In certain embodiments, as likewise described in greater detail herein, one or more entity behaviors associated with an IOB 2080 may be determined to be anomalous, abnormal, unexpected, suspicious, or some combination thereof. In these embodiments, the method by which a user entity behavior associated with an IOB 2080 is determined to be anomalous, abnormal, unexpected, suspicious, or some combination thereof, is a matter of design choice.

In various embodiments, certain information associated with a detected concerning behavior 2214 may be used in the performance of a human factors risk 2212 operation, described in greater detail herein, to infer an associated adverse effect 2216. As used herein, an adverse effect 2216 broadly refers to an unfavorable consequence resulting from the enactment of a concerning behavior 2214 by an entity. In certain embodiments, the enactment of a concerning behavior 2214 by a user entity may be characterized by a security risk persona, described in greater detail herein. In certain embodiments, an adverse effect 2216 may be described by a security risk use case, or a security vulnerability scenario, or a combination of the two, likewise described in greater detail herein.

Certain embodiments of the invention reflect an appreciation that the occurrence of an adverse effect 2216 may result in a corresponding adverse outcome. As an example, an employee may attempt to access certain proprietary corporate data from their home computer on a weekend. While the employee may access such data on a regular basis from their place of employment during normal work hours, it is unusual for them to do so otherwise. In this example, the employee may be experiencing certain emotional stressors 2204, described in greater detail herein.

Those emotional stressors 2204, combined with anomalous entity behavior associated with an IOB 2080 related to attempting to access proprietary data from their home computer during non-work hours, may indicate enactment of a concerning behavior 2214. To continue the example, information associated with the detected concerning behavior 2214 may be used in the performance of a human factor risk operation 2212 to infer whether the employee's concerning behavior 2214 might result in an adverse effect 2216. To complete the example, it may be inferred that the employee's concerning behavior 2014 may correspond to a data exfiltration security vulnerability scenario, described in greater detail herein, which if successfully executed may result in the adverse outcome of proprietary corporate data being exfiltrated.

Figure 23:
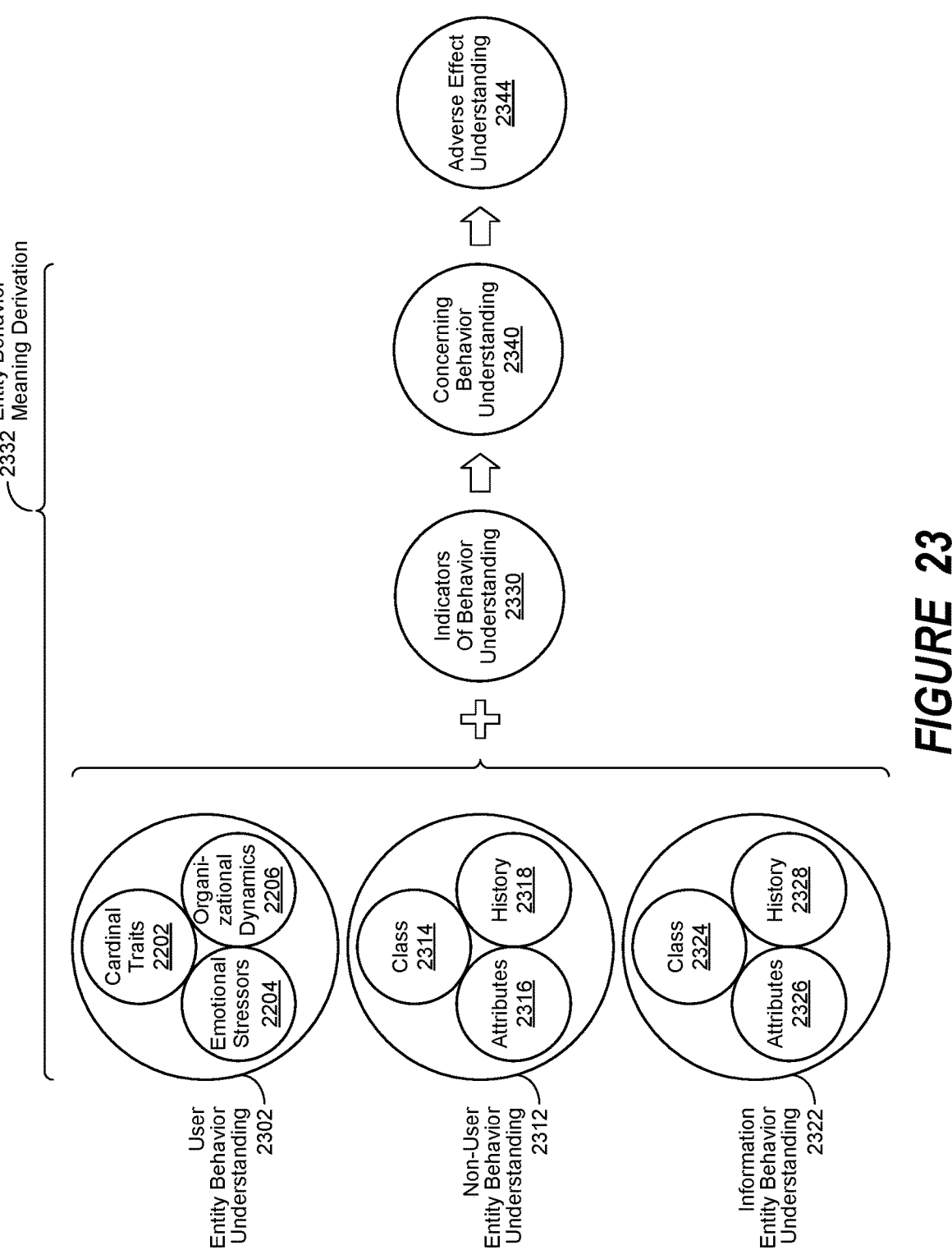
FIG. 23 is a simplified block diagram of the performance of an entity behavior meaning derivation.

FIG. 23 is a simplified block diagram of the performance of an entity behavior meaning derivation operation implemented in accordance with an embodiment of the invention. In certain embodiments, one or more entity behavior meaning derivation 2332 operations may be performed to achieve a literal, inferential, and evaluative, or a combination thereof, understanding 2302, 2312, 2322, 2330, 2340 of the meaning of a particular entity's associated entity behavior. In certain embodiments, information associated with the result of the entity behavior meaning derivation 2332 operation may be used to achieve an understanding of the risk corresponding to an associated adverse effect 2344.

In various embodiments, information associated with certain human factors, such as cardinal traits 2202, emotional stressors 2204, and organizational dynamics 2206, described in greater detail herein, or a combination thereof, may be used in an entity behavior meaning derivation 2332 operation to achieve an understanding 2302 of a user entity's behavior. In various embodiments, information associated with certain non-user entity classes 2314, attributes 2316, and entity behavior history 2318, or a combination thereof, may likewise be used in an entity behavior meaning derivation 2332 operation to achieve an understanding 2312 of a non-user entity's behavior. Likewise, in certain embodiments, information associated with certain information entity classes 2324, attributes 2326, and entity behavior history 2328, or a combination thereof, in an entity behavior meaning derivation 2332 operation to achieve an understanding 2322 of an information entity's behavior.

Figure 24:
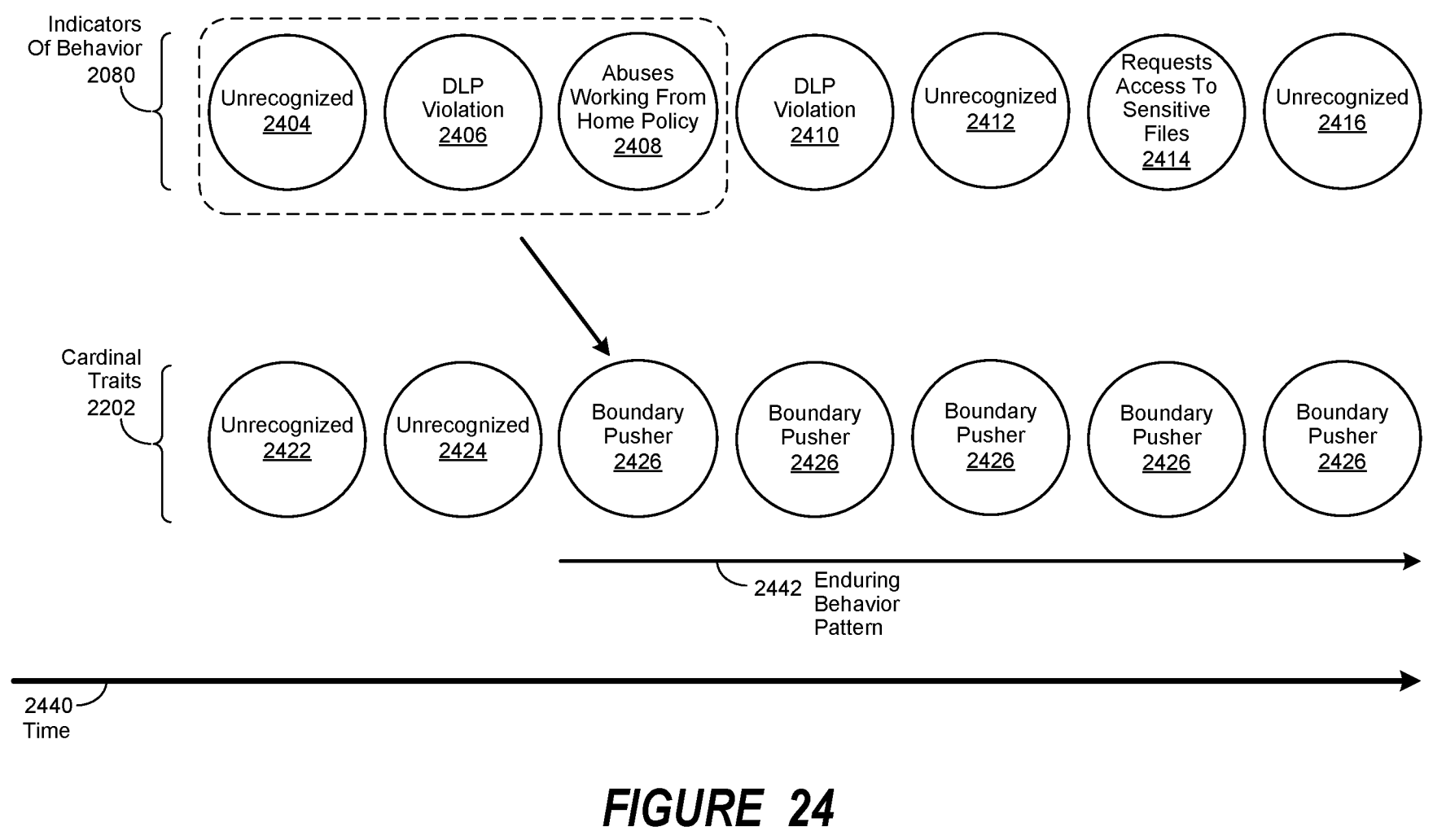

FIG. 24 is a simplified block diagram of the performance of operations implemented in accordance with an embodiment of the invention to identify an enduring behavioral pattern corresponding to a particular user entity. In various embodiments, a user entity may enact certain entity behaviors associated with an indicator of behavior (IOB) 2080 over a particular period of time 2440. In certain embodiments, a human factors risk association operation, described in greater detail herein, may be performed to identify a particular cardinal trait 1602 corresponding to the enactment of one or more such IOBs 2080. In certain embodiments, an identified cardinal trait 1602, such as "boundary pusher" 2426 may be persisted over time 2440 to reflect a particular enduring behavior pattern 2442 corresponding to the user entity.

For example, as shown in FIG. 24, a user entity may enact an "unrecognized" 2404 indicator of behavior (IOB) 2080 at a particular point in time 2440, which results in a corresponding "unrecognized" 2422 cardinal trait 1602. At some point in time 2440 thereafter, the same user entity may enact a "data loss prevention (DLP) violation" 2406 IOB 2080, which likewise results in a corresponding "unrecognized" 2424 cardinal trait 2202. At some later point in time 2440 thereafter, the same user entity may enact an "abuses working from home policy" 2408 IOB 2080. In this example, information associated with the enactment of the "unrecognized" 2404, "DLP violation" 2406, and "abuses working from home policy" 2408 IOBs 2080 may be used in the performance of a human factors risk association operation to determine the user entity personifies the cardinal trait 1602 of "boundary pusher" 2426.

To continue the example, the user entity may enact IOBs 2080 at later points in time 2440, including "DLP violation" 2410, "unrecognized" 2412, "requests access to sensitive files" 2414, and "unrecognized" 2416. However, the user entity's identified cardinal trait 1602 of "boundary pusher" 2428 is persisted as an enduring behavior pattern 2442. Those of skill in the art will recognize that many such embodiments and examples of cardinal traits 2202 being used to establish an enduring behavior pattern 2442 are possible. Accordingly, the foregoing is not intended to limit the spirit, scope, or intent of the invention.

Figure 25:
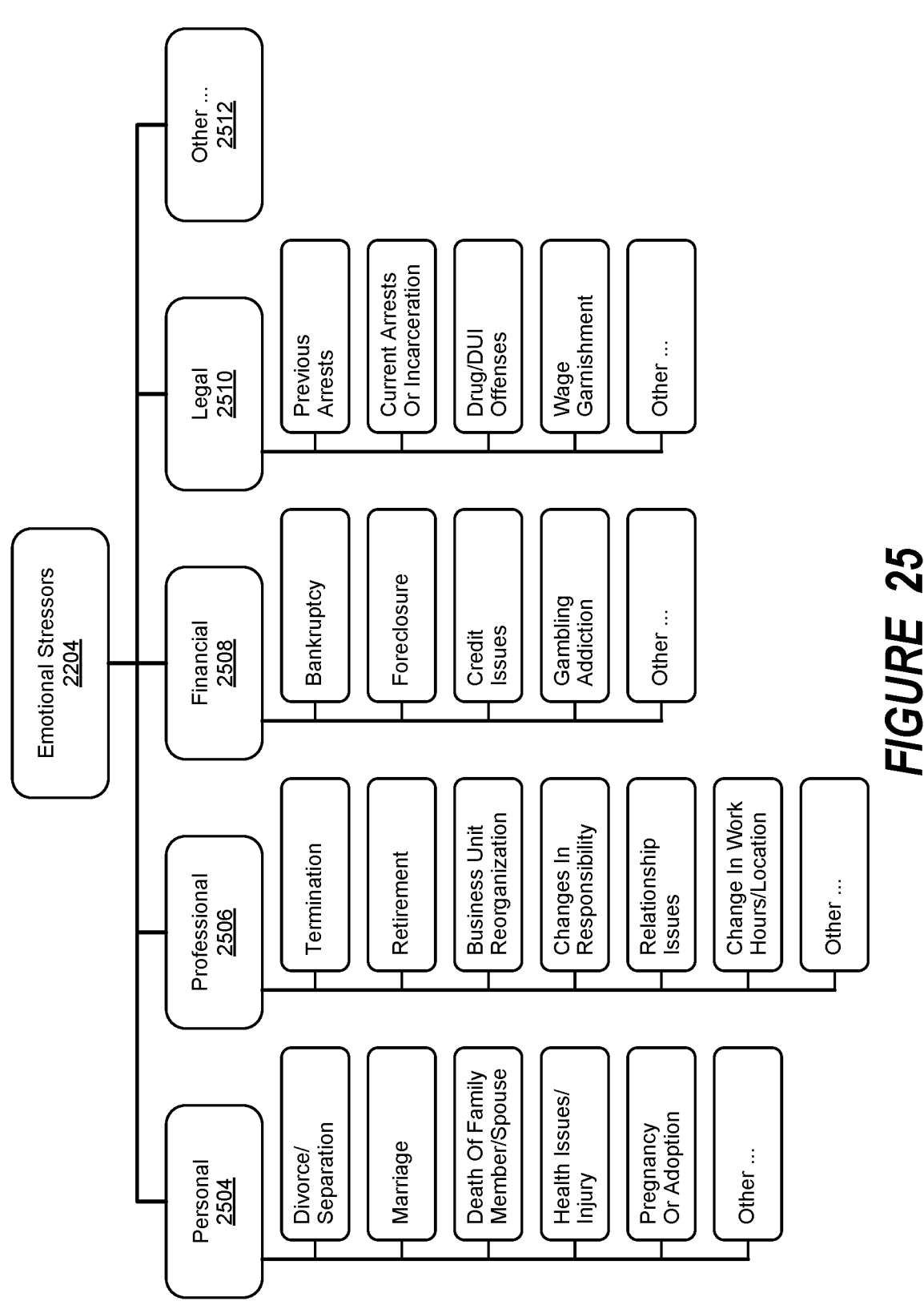
FIG. 25 is a graphical representation of an ontology showing example emotional stressors used as a human factor.

FIG. 25 is a graphical representation of an ontology showing example emotional stressors implemented in accordance with an embodiment of the invention as a human factor. As described in greater detail herein, an emotional stressor 2204, in combination with one or more other human factors, and one or more indicators of behavior (IOBs), may result in the occurrence of a concerning behavior. In certain embodiments, emotional stressors 2204 may be used in certain embodiments as a contextual modifier to provide meaningful context for detecting a concerning behavior, identifying an associated security risk case, or inferring a security risk vulnerability scenario, or a combination thereof. As used herein, a contextual modifier broadly refers to a circumstance, aspect, dynamic, attribute, or other consideration used to clarify, mitigate, exacerbate, or otherwise affect the perception, meaning, understanding, or assessment of a security risk associated with a particular JOB.

In certain embodiments, classes of emotional stressors 2204 may include personal 2504, professional 2506, financial 2508, and legal 2510. Certain embodiments of the invention reflect an appreciation that the effect of one or more emotional stressors 2204 on an associated user entity may result in the occurrence of a concerning behavior, described in greater detail herein, that may not represent a security risk. However, certain embodiments of the invention likewise reflect an appreciation that user entities engaging in both intentionally malicious and accidentally risky behaviors are frequently enduring personal 2504, professional 2506, financial 2508, and legal 2510 emotional stressors 2204.

As shown in FIG. 25, examples of personal 2504 emotional stressors 2204 may include certain life changes, such as separation or divorce, marriage, the birth, death, or sickness of a family member or friend, health issues or injuries, pregnancy or adoption, and so forth. Likewise, examples of professional 2506 emotional stressors 2204 may include termination or unsatisfactory performance reviews, retirement, business unit reorganization, changes in responsibility or compensation, co-worker friction, changes in work hours or location, and so forth.

Examples of financial 2508 emotional stressors 2204 may likewise include bankruptcy, foreclosure, credit issues, gambling addition, and so forth. Likewise, examples of legal 2510 emotional stressors 2204 contextual modifiers may include previous arrests, current arrests or incarceration, drug or driving under the influence (DUI) offenses, wage garnishment, and so forth. Skilled practitioners of the art will recognize that other 2512 classes of emotional stressors 2204 are possible. Accordingly, the foregoing is not intended to limit the spirit, scope, or intent of the invention.

Figure 26:
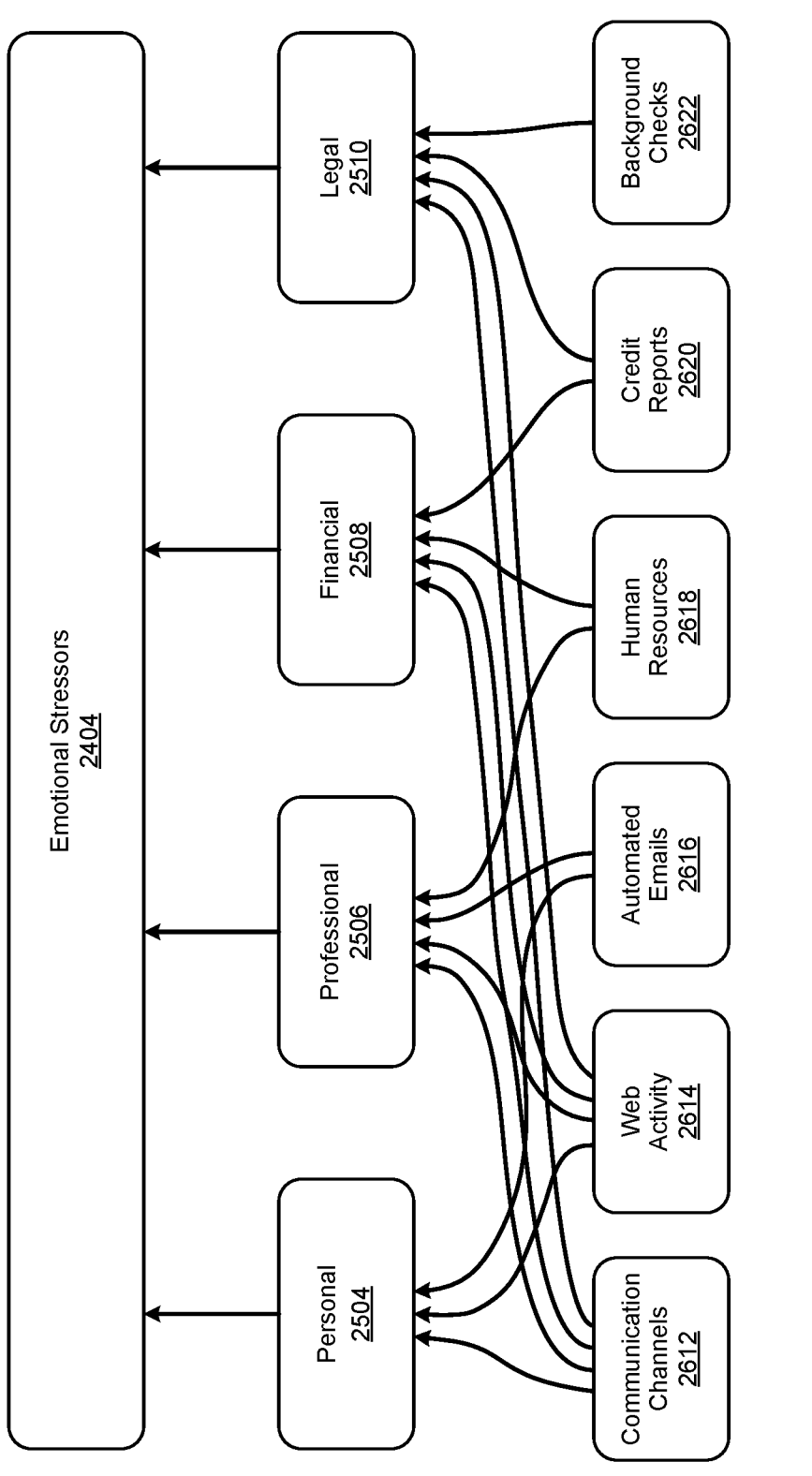
FIG. 26 shows a mapping of data sources to emotional stressors used as a human factor.

FIG. 26 shows a mapping of data sources to emotional stressors implemented in accordance with an embodiment of the invention as a human factor. In various embodiments, individual emotional stressors 2204 may be implemented to receive input data from certain data sources. In certain embodiments, these data sources may include communication channels 2612 of various kinds, web activity 2614, automated emails 2616, human resources 2618 communications, credit reports 2620, and background checks 2622. Skilled practitioners of the art will recognize that individual emotional stressors 2204 may be implemented to receive input data from other data sources as well. Accordingly, the foregoing is not intended to limit the spirit, scope, or intent of the invention.

In certain embodiments, communication channels 2612 may include emails, chat (e.g., Slack®), phone conversations (e.g., telephone, Skype®, etc.), and so forth. In various embodiments, natural language processing (NLP) approaches familiar to those of skill in the art may be implemented to identify certain emotional stressors 2204 within a particular communication channel 2612 exchange. In various embodiments, web activity 2614 may be monitored and processed to identify certain emotional stressors 2204. In various embodiments, web activity 2614 may likewise be monitored and processed to identify certain web-related data fields, such as search terms, time stamps, domain classification, and domain risk class. In certain embodiments, auto-generated emails, especially from Human Capital Management (HCM) or Human Resource (HR) systems may be implemented to assist an organization identify and understand emotional stressors 2204 related to a user entity's professional and life events. Likewise, data received for human resources 2618, credit reports 2620, and background checks 2622 may be implemented in certain embodiments to assist in identifying and understanding additional emotional stressors 2204 related to a particular user entity.

In certain embodiments, more than one data source may provide input data to a particular emotional stressor 2204. For example, as shown in FIG. 26, a professional 2506 emotional stressor may be implemented to receive input data from certain communication channels 2612, web activity 2614, automated emails 2616, and human resources 2618 communications. Those of skill in the art will recognize that many such embodiments and examples are possible. Accordingly, the foregoing is not intended to limit the spirit, scope or intent of the invention.

Figure 27:
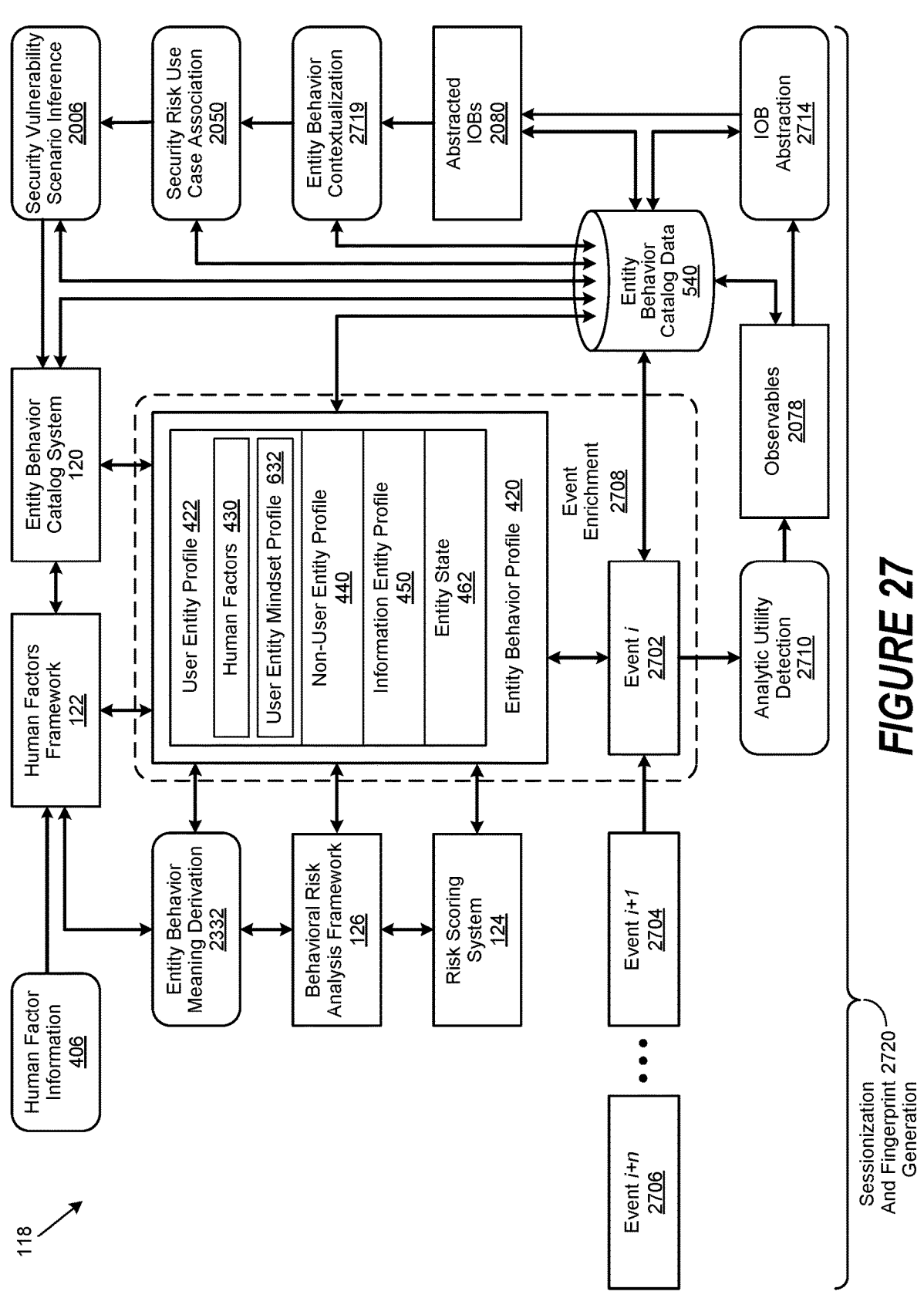
FIG. 27 shows a functional block diagram of process flows associated with the operation of a security analytics system.

FIG. 27 shows a functional block diagram of process flows associated with the operation of security analytics system implemented in accordance with an embodiment of the invention. In certain embodiments, a security analytics system 118, described in greater detail herein, may be implemented with an EBC system 120, a human factors framework 122, a risk scoring system 124, and a behavioral risk analysis framework 126, or a combination thereof, as likewise described in greater detail herein. In certain embodiments, the EBC system 120 may be implemented to define and manage an entity behavior profile (EBP) 420, as described in greater detail herein. In certain embodiments, the EBP 420 may be implemented to include a user entity profile 422, a non-user entity profile 440, an information entity profile 450, and an entity state 462, or a combination thereof, as likewise described in greater detail herein. In certain embodiments, the user entity profile 422 may be implemented to include certain human factors 430 and user entity mindset profile 632 information, as described in greater detail herein.

In certain embodiments, EBC system 120 operations are begun with the receipt of information associated with an initial event i 2702. In various embodiments, information associated with an initial event i 2702 may include user entity profile 422 attributes, user entity behavior factor information, user entity mindset profile 632 information, entity state 462 information, certain contextual and temporal information, all described in greater detail herein, or a combination thereof. In various embodiments, certain user entity profile 422 data, user entity mindset profile 632 data, non-user entity profile 440 data, entity state 462 data, contextual information, and temporal information stored in a repository of EBC data 540 may be retrieved and then used to perform event enrichment 2708 operations to enrich the information associated with event i 2702.

Analytic utility detection 2710 operations are then performed on the resulting enriched event i 2702 to determine whether it is of analytic utility. If so, then it is derived as an observable 2078, described in greater detail herein. In certain embodiments, event i+1 2704 through event i+n 2706, may in turn be received by the EBC system 120 and be enriched 2708. Analytic utility detection 2710 operations are then performed on the resulting enriched event i+1 2704 through event i+n 2706 to determine whether they are of analytic utility. Observables 2078 are then derived from those that are.

In various embodiments, certain indicator of behavior (JOB) abstraction 2714 operations may be performed on the resulting observables 2078 corresponding to events i 2702, i+1 2704, and i+n 2706 to generate an associated IOB 2080, described in greater detail herein. In various embodiments, an IOB 2080 may be expressed in a Subject Action Object format and associated with observables 2078 resulting from event information provided by various received from certain EBC data sources, likewise described in greater detail herein. In certain embodiments, an IOB abstraction 2714 operation may be performed to abstract away EBC data source-specific knowledge and details when expressing an entity behavior. For example, rather than providing the details associated with a "Windows:4624" non-user entity event, its details may be abstracted to a "User Login To Device" IOB 2080.

In various embodiments, sessionization and fingerprint 2720 operations, described in greater detail herein, may be performed on event information corresponding to events i 2702, i+1 2704, i+n 2706, their corresponding observables 2080, and their associated IOBs 2080, or a combination thereof, to generate session information. In various embodiments, the resulting session information may be used to associate certain events i 2702, i+1 2704, i+n 2706, or their corresponding observables 2078, or their corresponding IOBs 2080, or a combination thereof, with a particular session.

In certain embodiments, as likewise described in greater detail herein, one or more IOBs 2080 may in turn be associated with a corresponding EBP element. In various embodiments, the previously-generated session information may be used to associate the one or more IOBs 2080 with a particular EBP element. In certain embodiments, the one or more IOBs 2080 may be associated with its corresponding EBP element through the performance of an EBP management operation performed by the EBC system 120. Likewise, in certain embodiments, one or more EBP elements may in turn be associated with the EBP 420 through the performance of an EBP management operation performed by the EBC system 120.

In various embodiments, certain contextualization information stored in the repository of EBC data 540 may be retrieved and then used to perform entity behavior contextualization 2718 operations to provide entity behavior context, based upon the entity's user entity profile 422, or a non-user entity profile 440, or an information entity profile 450, and their respectively associated entity state 462, or a combination thereof. In various embodiments, certain security risk use case association 2050 operations may be performed to associate an EBP 420 with a particular security risk use case, described in greater detail herein. In certain embodiments, the results of the previously-performed entity behavior contextualization 2718 operations may be used to perform the security risk use case association 2050 operations.

In various embodiments, security vulnerability scenario inference 1360 operations may be performed to associate a security risk use case with a particular security vulnerability scenario, described in greater detail herein. In various embodiments, certain observables 2078 derived from events of analytic utility may be used to perform the security vulnerability scenario inference 2060 operations. In various embodiments, certain entity behavior contexts resulting from the performance of the entity behavior contextualization 2718 operations may be used to perform the security vulnerability scenario inference 2060 operations.

In certain embodiments, entity behavior meaning derivation 2332 operations may be performed on the security vulnerability behavior scenario selected as a result of the performance of the security vulnerability scenario inference 2060 operations to derive meaning from the behavior of the entity. In certain embodiments, the entity behavior meaning derivation 2332 operations may be performed by the human factors framework 122. In certain embodiments, the human factors framework 122 may be implemented to receive a stream of human factors information 406, as described in greater detail herein. In certain embodiments, the human factors framework 122 may be implemented to process the stream of human factors information 406 to derive certain human factors 430, and once derived, store them in an associated user entity profile 422. In certain embodiments, the human factors framework 122 may be implemented to perform the entity behavior meaning derivation 2332 operation in combination with the EBC system 120.

In certain embodiments, the entity behavior meaning derivation 3232 operations may be performed by analyzing the contents of the EBP 420 in the context of the security vulnerability behavior scenario selected as a result of the performance of the security vulnerability scenario inference 2060 operations. In certain embodiments, the human factors framework 122 may be implemented to perform the entity behavior meaning derivation 2332 operations by analyzing certain information contained in the EBP 420. In certain embodiments, the human factors framework 122 may be implemented to perform the entity behavior meaning derivation 2332 operations by analyzing certain human factors 430 and user entity mindset profile 632 information stored in the user entity profile 422 to derive the intent of a particular user entity behavior. In certain embodiments, the derivation of entity behavior meaning may include inferring the intent of an entity associated with event i 2702 and event i+1 2704 through event i+n 2706. In certain embodiments, the entity behavior meaning derivation 2332 operations may be performed by using the results of certain behavioral risk analysis operations, described in greater detail herein, performed by using a behavioral risk analysis system 126, likewise described in greater detail herein.

In various embodiments, performance of the entity behavior meaning derivation 2332 operations may result in the performance of a security risk assessment operation, described in greater detail herein. In certain embodiments, the security risk assessment operation may be performed to assess the security risk associated with the enactment of a particular user entity behavior. In certain embodiments, the security risk assessment operation may be implemented as a human factors 430 risk assessment operation, described in greater detail herein.

In various embodiments, the risk scoring system 124 may be implemented to perform the security risk assessment operation. In certain embodiments, the risk scoring system 124 may be implemented to use certain security risk assessment information resulting from the performance of a security risk assessment operation to generate a security risk score. In certain embodiments, the risk scoring system 124 may be implemented to use the results of certain behavioral risk analysis operations performed by using behavioral risk analysis framework 126. In certain embodiments, a security risk score meeting certain security risk parameters may result in the performance of an associated entity interaction security risk operation described in greater detail herein.

In certain embodiments, meaning derivation information associated with event i 2702 may be used to update the user entity profile 420, non-user entity profile 440, or information entity profile 450 corresponding to the entity associated with event i 2702. In certain embodiments, the process is iteratively repeated, proceeding with meaning derivation information associated with event i+1 2704 through event i+n 2706. From the foregoing, skilled practitioners of the art will recognize that a user entity profile 420, non-user entity profile 440, or information entity profile 450, or some combination thereof, as implemented in certain embodiments, not only allows the identification of events associated with a particular entity that may be of analytic utility, but also provides higher-level data that allows for the contextualization of observed events. Accordingly, by viewing individual sets of events both in context and with a view to how they may be of analytic utility, it is possible to achieve a more nuanced and higher-level comprehension of an entity's intent.

Figure 28A:
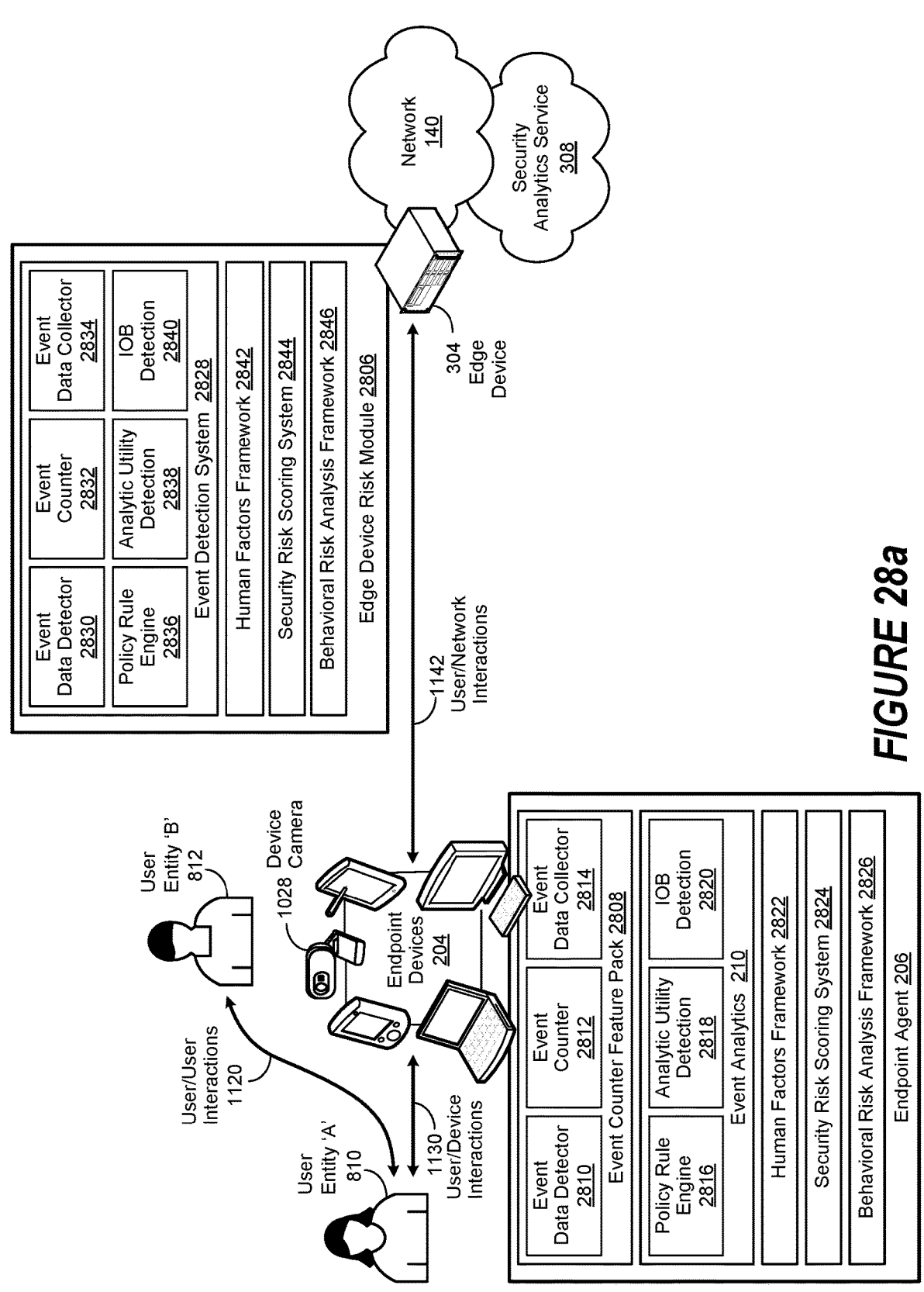
FIGS. 28*a* and 28*b* show a simplified block diagram of a distributed security analytics system environment.
Figure 28B:
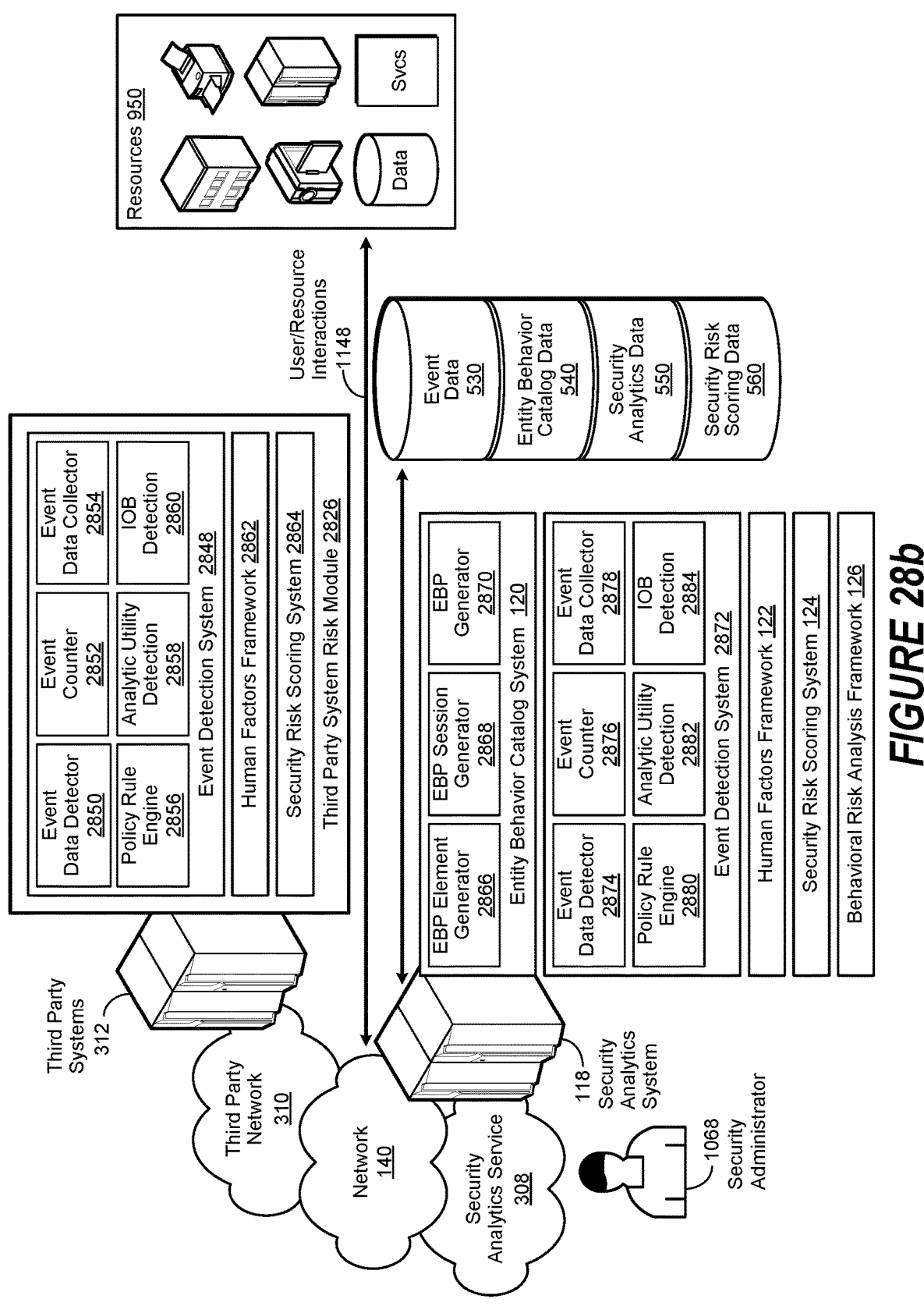

FIGS. 28*a* and 28*b* show a simplified block diagram of a distributed security analytics system environment implemented in accordance with an embodiment of the invention. In various embodiments, the distributed security analytics system environment may be implemented to perform certain human factors risk operations, as described in greater detail herein. In various embodiments, the distributed security analytics system environment may be implemented to use certain human factors information to assess the security risk corresponding to a particular indicator of behavior (IOB), as likewise described in greater detail herein. In certain embodiments, the distributed security analytics mapping system environment may be implemented to include a security analytics system 118, described in greater detail herein. In certain embodiments, the security analytics system 118 may be implemented to include an entity behavior catalog (EBC) system 120, a human factors framework 122, a security risk scoring system 124, and a behavioral risk analysis framework 126, or a combination thereof.

In various embodiments, the human factors framework 122 may be implemented to provide certain human factors information, described in greater detail herein, to the security analytics system 118. In various embodiments, the security analytics system 118 may be implemented to use such human factors information to perform certain human factors risk operations, likewise described in greater detail herein. In various embodiments, certain human factors risk operations performed by the security analytics system 118 may be used to assess the security risk associated with a corresponding IOB, as described in greater detail herein. In certain embodiments, the security risk corresponding to a particular IOB may be associated with one or more user entities, likewise as described in greater detail herein.

In certain embodiments, as likewise described in greater detail herein, the EBC system 120, the human factors framework 122, the security risk scoring system 124, and the behavioral risk analysis framework 126, or a combination thereof, may be used in combination with the security analytics system 118 to perform such behavioral risk analysis operations. In various embodiments, certain data stored in a repository of event data 530, EBC data 540, security analytics 550 data, or a repository of security risk scoring data 560, or a combination thereof, may be used by the security analytics system 118, the EBC system 120, the human factors framework 122, the risk scoring system 124, and the behavioral risk analysis framework 126, or some combination thereof, to perform the behavioral risk analysis operation.

In various embodiments, the EBC system 120, as described in greater detail herein, may be implemented to use certain entity behavior information and associated event data, to generate an entity behavior profile (EBP), as described in greater detail herein. In various embodiments, the security analytics system 118 may be implemented to use one or more session-based fingerprints to perform security analytics operations to detect certain user, non-user, or information entity behavior, as likewise described in greater detail herein. In certain embodiments, the security analytics system 118 may be implemented to monitor entity behavior associated with a user entity, such as a user entity 'A' 810 or 'B' 812. In certain embodiments, the user, non-user, or information entity behavior, or a combination thereof, may be monitored during user/device 930, user/network 942, user/resource 948, and user/user 920 interactions. In certain embodiments, the user/user 920 interactions may occur between a first user entity, such as user entity 'A' 810 and a second user entity, such as user entity 'B' 812.

In certain embodiments, the human factors framework 122 may be implemented to perform a human factors risk operation, described in greater detail herein. In various embodiments, as likewise described in greater detail herein, the human factors framework 122 may be implemented to use certain associated event information to perform the human factors risk operation. In certain embodiments, the event information may be stored in a repository of event 530 data. In various embodiments, the security risk scoring system 124 may be implemented to provide certain security risk scoring information stored in the repository of security risk scoring 560 data to the security analytics system 118 for use by the human factors framework 122.

In various embodiments, the human factors framework 122 may be implemented, as described in greater detail herein, to manage certain human factors information relevant to the occurrence of an IOB. In various embodiments, as likewise described in greater detail herein, the human factors framework 122 may be implemented to provide certain human factors information relevant to the occurrence of a particular IOB to the EBC system 120, or the risk scoring system 124, or both. In certain embodiments, the human factors information provided by the human factors framework 122 to the EBC system 120, or the security risk scoring system 124, or both, may be used to assess the security risk associated with the occurrence of a particular indicator of behavior.

In certain embodiments, as described in greater detail herein, an endpoint agent 206 may be implemented on an endpoint device 204 to perform user, non-user, or information entity behavior monitoring. In certain embodiments, the user, non-user, or information entity behavior may be monitored by the endpoint agent 206 during user/device 1930 interactions between a user entity, such as user entity 'A' 810, and an endpoint device 204. In certain embodiments, the user, non-user, or information entity behavior may be monitored by the endpoint agent 206 during user/network 1942 interactions between user entity 'A' 810 and a network 140 or third party 310 network. In certain embodiments, the user, non-user, or information entity behavior may be monitored by the endpoint agent 206 during user/resource 1948 interactions between user entity 'A' 810 and a resource 1950, such as a facility, printer, surveillance camera, system, datastore, service, and so forth.

In certain embodiments, the monitoring of user or non-user entity behavior by the endpoint agent 206 may include the monitoring of electronically-observable actions, or associated behavior, respectively enacted by a particular user, non-user, or information entity. In certain embodiments, the endpoint agent 206 may be implemented in combination with the security analytics system 118, the EBC system 120, the human factors framework 122, and the security risk scoring system 124, or a combination thereof, to detect an IOB, assess its associated risk, and perform a security operation to mitigate risk, or a combination thereof.

In certain embodiments, the endpoint agent 206 may be implemented to include an event counter feature pack 2808, an event analytics 210 module, a human factors framework 2822 module, a security risk scoring 2824 module, and a behavioral risk analysis framework 2826, or a combination thereof. In certain embodiments, the event counter feature pack 2808 may be further implemented to include an event data detector 2810 module, an event counter 2812 module, and an event data collector 2814 module, or a combination thereof. In certain embodiments, the event analytics 210 module may be implemented to include a security policy rule 2816 engine, an event of analytic utility 2818 module, and an IOB detection 2820 module, or a combination thereof.

In certain embodiments, the event data detector 2810 module may be implemented to detect event data associated with a particular endpoint device 204, as described in greater detail herein, resulting from user/device 1930, user/network 1942, user/resource 1948, and user/user 1920 interactions. In various embodiments, the event counter 2812 module may be implemented to collect, or otherwise track, the occurrence of certain events, or classes of events, resulting from user/device 1930, user/network 1942, user/resource 1948, and user/user 1920 interactions.

In various embodiments, the event data collector 2814 module may be implemented to collect certain event data associated with the user/device 1930, user/network 1942, user/resource 1948, and user/user 1920 interactions. In certain embodiments, the security policy rule 2816 engine may be implemented to manage security policy information relevant to determining whether a particular event is of analytic utility, anomalous, or both. In certain embodiments, the event of analytic utility detection 2818 module may be implemented to detect an event of analytic utility associated with events corresponding to the user/device 1930, user/network 1942, user/resource 1948, and user/user 1920 interactions.

In various embodiments, the event of analytic utility detection 2818 module may be implemented to use certain security policy information provided by the security policy rule 2816 engine to determine whether a particular event associated with an endpoint device 204 is of analytic utility. In certain embodiments, the security policy rule 2816 engine may be implemented to determine whether a particular event of analytic utility associated with an endpoint device 204 is anomalous.

In various embodiments, the IOB detection 2820 module may be implemented to perform certain IOB detection operations associated with events of analytic utility corresponding to the user/device 1930, user/network 1942, user/resource 1948, and user/user 1920 interactions. In various embodiments, the event of analytic utility detection 2818 module may be implemented to provide certain information associated with one or more events of analytic utility to the IOB 2820 module. In certain embodiments, the event of analytic utility detection 2818 module may be implemented to determine whether the one or more events of analytic utility are associated with one another.

In various embodiments, the IOB detection 2820 module may be implemented to use such information in the performance of certain IOB detection operations, which in turn may result in the detection of an IOB. In certain embodiments, the endpoint agent 206 may be implemented to communicate the event and associated event counter data collected by the event data collector 2814 module, data associated with the events of analytic utility detected by the event of analytic utility detection 2818 module, and information associated with the IOBs detected by the IOB detection 2820 module, or a combination thereof, to the security analytics 118 system or another component of the distributed security analytics system environment.

In certain embodiments, the human factors framework 2822 module may be implemented to perform a human factors risk operation, as described in greater detail herein. In various embodiments, the human factors framework 2822 module may be implemented to provide certain human factors information to one or more other components of the distributed security analytics system environment. In certain embodiments, the security risk scoring system 2824 may be implemented to generate a security risk score, likewise described in greater detail, for an IOB corresponding to one or more events detected by the IOB detection 2820 module.

In certain embodiments, the security risk scoring system 2824 may be implemented to generate a security risk score corresponding to a particular IOB when it is first detected. In certain embodiments, the event risk severity score corresponding to a particular IOB may be used as a component in the generation of a security risk score for an associated user entity. In certain embodiments, the behavioral risk analysis framework 2026 may be implemented to perform certain behavioral risk analysis operations, described in greater detail herein. In certain embodiments, the results of the behavioral risk analysis operations may be used by the security risk scoring system 2824 to generate a security risk score. In certain embodiments, the endpoint agent 206 may be implemented to provide one or more security risk scores to one or more other components of the distributed security analytics system environment.

In certain embodiments, an edge device 304 may be implemented to include an edge device risk module 2806. In certain embodiments, the edge device risk module 2806 may be implemented to include an event detection 2848 system, a human factors framework 2842 module, a security risk scoring system 2844, or a combination thereof. In certain embodiments, the event detection 2848 system may be implemented to include an event data detector 2830 module, an event counter 2832 module, an event data collector 2834 module, a security policy rule 2836 engine, an event of analytic utility 2838 module, and an IOB detection 2840 module, or a combination thereof.

In certain embodiments, the event data detector 2830 module may be implemented to detect event data associated with a particular edge device 204, as described in greater detail herein, resulting from user/device 1130, user/network 1142, user/resource 1148, and user/user 1120 interactions. In various embodiments, the event counter 2832 module may be implemented to collect, or otherwise track, the occurrence of certain events, or classes of events, resulting from user/device 1130, user/network 1142, user/resource 1148, and user/user 1120 interactions.

In various embodiments, the event data collector 2830 module may be implemented to collect certain event data associated with the user/device 1130, user/network 1142, user/resource 1148, and user/user 1120 interactions. In certain embodiments, the security policy 2836 engine may be implemented to manage security policy information relevant to determining whether a particular event is of analytic utility, anomalous, or both. In certain embodiments, the event of analytic utility detection 2838 module may be implemented to detect an event of analytic utility associated with events corresponding to the user/device 1130, user/network 1142, user/resource 1148, and user/user 1120 interactions.

In various embodiments, the event of analytic utility detection 2838 module may be implemented to use certain security policy information provided by the security policy rule 2836 engine to determine whether a particular event associated with an edge device 304 is of analytic utility. In certain embodiments, the security policy rule 2836 engine may be implemented to determine whether a particular event of analytic utility associated with an edge device 304 is anomalous.

In various embodiments, the IOB detection 2840 module may be implemented to perform certain IOB detection operations, described in greater detail herein, associated with events of analytic utility corresponding to the user/device 1130, user/network 1142, user/resource 1148, and user/user 1120 interactions. In various embodiments, the event of analytic utility detection 2838 module may be implemented to provide certain information associated with one or more events of analytic utility to the IOB detection 2840 module. In certain embodiments, the event of analytic utility detection 2838 module may be implemented to determine whether the one or more events of analytic utility are associated with one another.

In various embodiments, the IOB detection 2840 module may be implemented to use such information in the performance of certain IOB detection operations, which in turn may result in the detection of an JOB. In certain embodiments, the edge device risk module 2806 may be implemented to communicate the event and associated event counter data collected by the event data collector 2834 module, data associated with the events of analytic utility detected by the event of analytic utility detection 2838 module, and information associated with the IOBs detected by the IOB detection 2840 module, or a combination thereof, to the security analytics 118 system or another component of the distributed security analytics system environment.

In certain embodiments, the human factors framework 2842 module may be implemented to perform a human factors risk operation, as described in greater detail herein. In various embodiments, the human factors framework 2842 may be implemented to provide certain human factors information to one or more other components of the distributed security analytics system environment. In certain embodiments, the behavioral risk analysis framework 2846 may be implemented to perform certain behavioral risk analysis operations, described in greater detail herein. In certain embodiments, the results of the behavioral risk analysis operations may be used by the security risk scoring system 2044 to generate a security risk score. In certain embodiments, the security risk scoring system 2844 may be implemented to generate a security risk score, likewise described in greater detail, for an IOB corresponding to one or more events detected by the IOB detection 2844 module.

In certain embodiments, the security risk scoring system 2844 may be implemented to generate a security risk score corresponding to a particular IOB when it is first detected. In certain embodiments, the event risk severity score corresponding to a particular IOB may be used as a component in the generation of a security risk score for an associated user entity. In certain embodiments, the edge device risk module 2806 may be implemented to provide one or more security risk scores to one or more other components of the distributed security analytics system environment.

In certain embodiments, a third party system 312 may be implemented to include a third party system risk module 2826. In certain embodiments, the third party system risk module 2826 may be implemented to include an event detection 2848 system, a human factors framework 2862 module, and a security risk scoring system 2864, or a combination thereof. In certain embodiments, the event detection 2848 system may be implemented to include an event data detector 2850 module, an event counter 2852 module, an event data collector 2854 module, a security policy rule 2856 engine, an event of analytic utility 2858 module, and an IOB detection 2860 module, or a combination thereof.

In certain embodiments, the event data detector 2850 module may be implemented to detect event data associated with a particular third party system 312 resulting from user/device 1130, user/network 1142, user/resource 1148, and user/user 1120 interactions. In various embodiments, the event counter 2852 module may be implemented to collect, or otherwise track, the occurrence of certain events, or classes of events, as described in greater detail herein, resulting from user/device 1130, user/network 1142, user/resource 1148, and user/user 1120 interactions.

In various embodiments, the event data collector 2850 module may be implemented to collect certain event data associated with the user/device 1130, user/network 1142, user/resource 1148, and user/user 1120 interactions. In certain embodiments, the security policy rule 2856 engine may be implemented to manage security policy information relevant to determining whether a particular event is of analytic utility, anomalous, or both. In certain embodiments, the event of analytic utility detection 2858 module may be implemented to detect an event of analytic utility associated with events corresponding to the user/device 1130, user/network 1142, user/resource 1148, and user/user 1120 interactions.

In various embodiments, the event of analytic utility detection 2858 module may be implemented to use certain security policy information provided by the security policy rule 2856 engine to determine whether a particular event associated with a third party system 312 is of analytic utility. In certain embodiments, the security policy rule 2856 engine may be implemented to determine whether a particular event of analytic utility associated with a third party system 312 is anomalous.

In various embodiments, the IOB detection 2860 module may be implemented to perform certain IOB detection operations associated with events of analytic utility corresponding to the user/device 1130, user/network 1142, user/resource 1148, and user/user 1120 interactions. In various embodiments, the event of analytic utility detection 2858 module may be implemented to provide certain information associated with one or more events of analytic utility to the IOB detection 2860 module. In certain embodiments, the event of analytic utility detection 2858 module may be implemented to determine whether the one or more events of analytic utility are associated with one another.

In various embodiments, the IOB detection 2860 module may be implemented to use such information in the performance of certain IOB detection operations, which in turn may result in the detection of an JOB. In certain embodiments, the third party system risk module 2826 may be implemented to communicate the event and associated event counter data collected by the event data collector 2854 module, data associated with the events of analytic utility detected by the event of analytic utility detection 2858 module, and information associated with the IOBs detected by the IOB detection 2860 module, or a combination thereof, to the security analytics 118 system or another component of the distributed security analytics mapping system environment.

In certain embodiments, the human factors framework 2862 module may be implemented to perform a human factors risk operation, as described in greater detail herein. In various embodiments, human factors framework 2862 module may be implemented to provide certain human factors information to one or more other components of the distributed security analytics system environment. In certain embodiments, the security risk scoring system 2864 may be implemented to generate a security risk score, likewise described in greater detail, for an IOB corresponding to one or more events detected by the IOB detection 2864 module.

In certain embodiments, the security risk scoring system 2864 may be implemented to generate a security risk score corresponding to a particular IOB when it is first detected, as likewise described in greater detail herein. In certain embodiments, the event risk severity score corresponding to a particular IOB may be used as a component in the generation of a security risk score for an associated user entity. In certain embodiments, the third party system risk module 2826 may be implemented to provide one or more security risk scores to one or more other components of the distributed security analytics environment.

In certain embodiments, the security analytics system 118 may be implemented to receive the event data, the event counter data, the data associated with the detected events of analytic utility and IOBs, or a combination thereof, provided by the endpoint agent 206, the edge device risk module 2806, and the third party system risk module 2806, or a combination thereof. In certain embodiments, the security analytics system 118 may be implemented to provide the event data and event counter data, the data associated with the detected endpoint events of analytic utility and events, or a combination thereof, to the EBC system 120, the human factors framework 122, the security risk scoring system 124, and the behavioral risk analysis framework 126, or a combination thereof, for processing.

In certain embodiments, the EBC system 120 may be implemented to include an EBP element generator 2866 module, an EBP session generator 2868 module, an EBP generator 2870 module, or a combination thereof. In various embodiments, the EBP element generator 2866 module may be implemented to process event and event counter data, along with data associated with events of analytic utility and anomalous events, provided by the endpoint agent 206 to generate EBP elements, described in greater detail herein. In certain embodiments, the EBP session generator 2868 may be implemented to use the event and endpoint event counter, data associated with events of analytic utility and anomalous events provided by the endpoint agent 206, to generate session information. In certain embodiments, the EBP session generator 2868 may be implemented to use the resulting session information to generate an activity session, described in greater detail herein. In various embodiments, as likewise described in greater detail herein, certain EBP management operations may be performed to associate EBP elements generated by the EBP element generator 2868 module with a corresponding EBP. Likewise, certain EBP management operations may be performed to use the session information generated by the EBP session generator 2870 module to associate a particular EBP element with a particular EBP.

In certain embodiments, the event detection system 2872 may be implemented to include an event data detector 2874 module, an event counter 2876 module, an event data collector 2878 module, a security policy rule 2880 engine, an event of analytic utility 2882 module, and an IOB detection 2884 module, or a combination thereof. In certain embodiments, the event data detector 2874 module may be implemented to detect event data associated with a particular endpoint device 204, edge device 304, or third party system 312, as described in greater detail herein, resulting from user/device 1130, user/network 1142, user/resource 1148, and user/user 1120 interactions. In various embodiments, the event counter 2876 module may be implemented to collect, or otherwise track, the occurrence of certain events, or classes of events, as described in greater detail herein, resulting from user/device 1130, user/network 1142, user/resource 1148, and user/user 120 interactions.

In various embodiments, the event data collector 2874 module may be implemented to collect certain event data associated with the user/device 1130, user/network 1142, user/resource 1148, and user/user 1120 interactions. In certain embodiments, the security policy rule 2880 engine may be implemented to manage security policy information relevant to determining whether a particular event is of analytic utility, anomalous, or both. In certain embodiments, the event of analytic utility detection 2882 module may be implemented to detect an event of analytic utility associated with events corresponding to the user/device 1130, user/network 1142, user/resource 1148, and user/user 1120 interactions.

In various embodiments, the event of analytic utility detection 2882 module may be implemented to use certain security policy information provided by the security policy rule 2880 engine to determine whether a particular event associated with a particular endpoint device 204, edge device 304, or third party system 312 is of analytic utility. In certain embodiments, the security policy rule 2880 engine may be implemented to determine whether a particular event of analytic utility associated with an endpoint device 204, edge device 304, or third party system 312 is anomalous.

In various embodiments, the IOB detection 2884 module may be implemented to perform certain IOB detection operations associated with events of analytic utility corresponding to the user/device 1130, user/network 1142, user/resource 1148, and user/user 1120 interactions. In various embodiments, the event of analytic utility detection 2882 module may be implemented to provide certain information associated with one or more events of analytic utility to the IOB detection 2884 module. In certain embodiments, the event of analytic utility detection 2882 module may be implemented to determine whether the one or more events of analytic utility are associated with one another.

In various embodiments, the IOB detection 2884 module may be implemented to use such information in the performance of certain IOB detection operations, which in turn may result in the detection of an JOB. In certain embodiments, the event detection system 2872 may be implemented to communicate the event and associated event counter data collected by the event data collector 2878 module, data associated with the events of analytic utility detected by the event of analytic utility detection 2882 module, and information associated with the IOBs detected by the IOB detection 2884 module, or a combination thereof, to another component of the distributed security analytics system environment.

In certain embodiments, the human factors framework 122 may be implemented to perform a human factors risk operation, as described in greater detail herein. In various embodiments, the human factors framework 122 may be implemented to provide certain human factors information to one or more other components of the distributed security analytics mapping system environment. In certain embodiments, the behavioral risk analysis framework 126 may be implemented to perform certain behavioral risk analysis operations, described in greater detail herein. In certain embodiments, the results of the behavioral risk analysis operations may be used by the security risk scoring system 124 to generate a security risk score. In certain embodiments, the security risk scoring system 124 may be implemented to generate a security risk score, likewise described in greater detail, for an IOB corresponding to one or more events detected by the IOB detection 2884 module.

In certain embodiments, the security risk scoring system 124 may be implemented to generate a security risk score corresponding to a particular IOB when it is first detected, as likewise described in greater detail herein. In certain embodiments, the event risk severity score corresponding to a particular IOB may be used as a component in the generation of a security risk score for an associated user entity. In certain embodiments, the security risk scoring system 124 may be implemented to provide one or more security risk scores to one or more other components of the distributed security analytics system environment. Those of skill in the art will recognize that many such implementations are possible. Accordingly, the foregoing is not intended to limit the spirit, scope, or intent of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing behavioral risk analysis operation, comprising:

monitoring an entity, the monitoring observing an electronically-observable data source; observing a behavior of the entity based upon the monitoring;

identifying a security related activity associated with the entity based upon the behavior;

identifying a standardized risk factor associated with the entity, the standardized risk factor facilitating accurately portraying a risk associated with the behavior of the entity, the standardized risk factor being based upon a standardized risk model, the standardized risk model comprising a Sociotechnical and Organizational Factors for Insider Threat (SOFIT) model, the SOFIT model providing a machine computable automated risk factor;

creating an event model based upon a feature, the feature having an associated feature value;

generating a standardized risk score based upon the standardized risk factor and the event model;

analyzing the behavior, the security related activity, and the standardized risk factor associated with the entity and the standardized risk score, the analyzing identifying an insider threat associated with the security related activity based upon the standardized risk factor associated with the entity; and, performing a security operation in response to the analyzing the behavior, the security related activity, the standardized risk factor and the standardized risk score, the security operation being performed by at least one of an endpoint device and a security analytics system.

2. The method of claim 1, further comprising:

generating a standardized risk score based upon the standardized risk factor; and, using the standardized risk score when generating the risk score; and wherein, the security operation uses the standardized risk score when performing the security operation.

3. The method of claim 2, wherein:

the standardized risk score is based upon the standardized risk model.

4. The method of claim 2, further comprising:

generating a normalized risk score based upon the standardized risk factor, the normalized risk score being generated using a normalization operation, the normalization operation determining whether the behavior is normal or not normal based upon a group of user entities with similar characteristics enacting similar behaviors; and wherein, the security operation uses the normalized risk score when performing the security operation.

5. The method of claim 1, wherein:

the security operation includes a continuous evaluation operation, the continuous evaluation operation providing ongoing assessment of a security risk of the entity.

6. The method of claim 5, wherein:

the continuous evaluation operation is performed on a recurring basis.

7. A system comprising:

a processor;

a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for:

monitoring an entity, the monitoring observing an electronically-observable data source;

observing a behavior of the entity based upon the monitoring;

identifying a security related activity associated with the entity based upon the behavior;

identifying a standardized risk factor associated with the entity, the standardized risk factor facilitating accurately portraying a risk associated with the behavior of the entity, the standardized risk factor being based upon a standardized risk model, the standardized risk model comprising a Sociotechnical and Organizational Factors for Insider Threat (SOFIT) model, the SOFIT model providing a machine computable automated risk factor;

creating an event model based upon a feature, the feature having an associated feature value;

generating a standardized risk score based upon the standardized risk factor and the event model;

analyzing the behavior, the security related activity, the standardized risk factor associated with the entity and the standardized risk score, the analyzing identifying an insider threat associated with the security related activity based upon the standardized risk factor associated with the entity; and, performing a security operation in response to the analyzing the behavior, the security related activity, the standardized risk factor and the standardized risk score, the security operation being performed by at least one of an endpoint device and a security analytics system.

8. The system of claim 7, wherein the instructions executable by the processor are further configured for:

generating a standardized risk score based upon the standardized risk factor; and, using the standardized risk score when generating the risk score; and wherein, the security operation uses the standardized risk score when performing the security operation.

9. The system of claim 8, wherein:

the standardized risk score is based upon the standardized risk model.

10. The system of claim 8, wherein the instructions executable by the processor are further configured for:

generating a normalized risk score based upon the standardized risk factor, the normalized risk score being generated using a normalization operation, the normalization operation determining whether the behavior is normal or not normal based upon a group of user entities with similar characteristics enacting similar behaviors; and wherein, the security operation uses the normalized risk score when performing the security operation.

11. The system of claim 7, wherein:

the security operation includes a continuous evaluation operation, the continuous evaluation operation providing ongoing assessment of a security risk of the entity.

12. The system of claim 11, wherein:

the continuous evaluation operation is performed on a recurring basis.

13. A non-transitory, computer-readable storage medium embodying computer program code, the computer program code comprising computer executable instructions configured for:

monitoring an entity, the monitoring observing an electronically-observable data source; observing a behavior of the entity based upon the monitoring;

identifying a security related activity associated with the entity based upon the behavior;

identifying a standardized risk factor associated with the entity, the standardized risk factor facilitating accurately portraying a risk associated with the behavior of the entity, the standardized risk factor being based upon a standardized risk model, the standardized risk model comprising a Sociotechnical and Organizational Factors for Insider Threat (SOFIT) model, the SOFIT model providing a machine computable automated risk factor;

creating an event model based upon a feature, the feature having an associated feature value;

generating a standardized risk score based upon the standardized risk factor and the event model;

analyzing the behavior, the security related activity, the standardized risk factor associated with the entity and the standardized risk score, the analyzing identifying an insider threat associated with the security related activity based upon the standardized risk factor associated with the entity; and, performing a security operation in response to the analyzing the behavior, the security related activity, the standardized risk factor and the standardized risk score, the security operation being performed by at least one of an endpoint device and a security analytics system.

14. The non-transitory, computer-readable storage medium of claim 13, wherein the computer executable instructions are further configured for:

generating a standardized risk score based upon the standardized risk factor; and, using the standardized risk score when generating the risk score; and wherein, the security operation uses the standardized risk score when performing the security operation.

15. The non-transitory, computer-readable storage medium of claim 14, wherein:

the standardized risk score is based upon the standardized risk model.

16. The non-transitory, computer-readable storage medium of claim 14, wherein:

generating a normalized risk score based upon the standardized risk factor, the normalized risk score being generated using a normalization operation, the normalization operation determining whether the behavior is normal or not normal based upon a group of user entities with similar characteristics enacting similar behaviors; and wherein, the security operation uses the normalized risk score when performing the security operation.

17. The non-transitory, computer-readable storage medium of claim 13, wherein:

the security operation includes a continuous evaluation operation, the continuous evaluation operation providing ongoing assessment of a security risk of the entity.

18. The non-transitory, computer-readable storage medium of claim 17, wherein:

the continuous evaluation operation is performed on a recurring basis.

19. The non-transitory, computer-readable storage medium of claim 13, wherein:

the computer executable instructions are deployable to a client system from a server system at a remote location.

20. The non-transitory, computer-readable storage medium of claim 13, wherein:

the computer executable instructions are provided by a service provider to a user on an on-demand basis.

\* \* \* \* \*